(12) United States Patent
Lim et al.

(10) Patent No.: US 10,041,001 B2
(45) Date of Patent: Aug. 7, 2018

(54) LIQUID CRYSTAL COMPOSITION, LIQUID CRYSTAL DISPLAY DEVICE INCLUDING THE SAME, AND METHOD OF MANUFACTURING LIQUID CRYSTAL DISPLAY DEVICE

(71) Applicant: Samsung Display Co. Ltd., Yongin-si, Gyeonggi-do (KR)

(72) Inventors: Ho Lim, Suwon-si (KR); Hyun Ku Ahn, Hwaseong-si (KR); Jae Jin Lyu, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/204,290

(22) Filed: Jul. 7, 2016

(65) Prior Publication Data

US 2017/0210993 A1    Jul. 27, 2017

(30) Foreign Application Priority Data

Jan. 21, 2016 (KR) .................. 10-2016-0007512

(51) Int. Cl.
| | | |
|---|---|---|
| *G02F 1/1333* | (2006.01) | |
| *C09K 19/56* | (2006.01) | |
| *C09K 19/32* | (2006.01) | |
| *C09K 19/34* | (2006.01) | |
| *C09K 19/40* | (2006.01) | |
| *C09K 19/04* | (2006.01) | |

(52) U.S. Cl.
CPC .............. *C09K 19/56* (2013.01); *C09K 19/32* (2013.01); *C09K 19/348* (2013.01); *C09K 19/3444* (2013.01); *C09K 19/3475* (2013.01); *C09K 19/404* (2013.01); *C09K 2019/0448* (2013.01)

(58) Field of Classification Search
CPC .... C09K 19/56; C09K 19/32; C09K 19/3444; C09K 19/3475; C09K 19/348; C09K 19/404; C09K 2019/0448; G02F 1/1333
USPC ........................................ 252/299.4; 428/1.1
See application file for complete search history.

(56) References Cited

U.S. PATENT DOCUMENTS

| | | | |
|---|---|---|---|
| 2016/0342029 A1 | 11/2016 | Lim | |
| 2017/0210994 A1* | 7/2017 | Lim | ....................... C09K 19/56 |

FOREIGN PATENT DOCUMENTS

| | | | |
|---|---|---|---|
| JP | 20044329 A | 1/2004 |
| KR | 10-2013-0096456 A | 8/2013 |
| KR | 10-2013-0110172 A | 10/2013 |
| KR | 10-2014-0045535 A | 4/2014 |
| KR | 10-2016-0137871 A | 12/2016 |
| KR | 10-2017-0019544 A | 2/2017 |
| KR | 10-2017-0029038 A | 3/2017 |
| KR | 10-2017-0032907 A | 3/2017 |

* cited by examiner

*Primary Examiner* — Geraldina Visconti

(74) *Attorney, Agent, or Firm* — Cantor Colburn LLP

(57) ABSTRACT

A liquid crystal composition including: a liquid crystal compound and a liquid crystal aligning agent containing at least one compound represented by Formula 1:

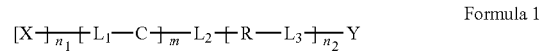

Formula 1 wherein in the Formula 1, X—*, *-$L_1$-*, *-$L_2$-*, *-$L_3$-*, *—C—*, *—R—*, Y—*, $n_1$, $n_2$, and m is the same as defined in the specification.

14 Claims, 11 Drawing Sheets

LIQUID CRYSTAL COMPOSITION, LIQUID CRYSTAL DISPLAY DEVICE INCLUDING THE SAME, AND METHOD OF MANUFACTURING LIQUID CRYSTAL DISPLAY DEVICE

This application claims priority to Korean Patent Application No. 10-2016-0007512 filed on Jan. 21, 2016, and all the benefits accruing therefrom under 35 U.S.C. § 119, the disclosure of which in its entirety is herein incorporated by reference.

BACKGROUND

1. Field

The present disclosure relates to a liquid crystal composition, a liquid crystal display device including the same, and a method of manufacturing a liquid crystal display device.

2. Description of the Related Art

A liquid crystal display device, which is one of the most widely used display devices, generally includes a display substrate containing a pixel electrode, a counter display substrate including a common electrode, a liquid crystal layer disposed between the display substrate and the counter display substrate, and a liquid crystal alignment film disposed between the liquid crystal layer and one of the display substrate and the counter display substrate.

An example of a method of arranging liquid crystal compounds in a direction perpendicular to a display substrate or a counter display substrate is a technology of using a liquid crystal alignment film, which is manufactured by coating the surface of at least one of a display substrate and a counter display substrate with an organic polymer compound or an inorganic compound such as silicon oxide to form a thin film, and subsequently drying and sintering the thin film.

Generally, a vertically aligned polyimide thin film is used as a polymer-based liquid crystal alignment film. In order to manufacture such a polymer-based liquid crystal alignment film, a series of processes of coating the surface of at least one of a display substrate and a counter display substrate with an alignment solution containing an organic polymer compound and an environmentally hazardous organic solvent, followed by drying and high-temperature sintering the coated alignment solution is required. Such a long series of processes may decrease productivity, cause harmful effects to humans and environment, and therefore, are disadvantageous. Thus, there remains a need in superior manufacturing methods of the liquid crystal display devices, which are devoid of the above shortcomings.

SUMMARY

Aspects of the present disclosure provide a method of manufacturing a liquid crystal display device, characterized by improved processability and productivity by omitting a conventional process of forming a liquid crystal alignment film, a liquid crystal composition used in the method, and a liquid crystal display device manufactured by the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an exemplary embodiment, a liquid crystal composition is provided. The liquid crystal composition, including:

a liquid crystal compound; and a liquid crystal aligning agent containing at least one compound represented by Formula 1:

Formula 1

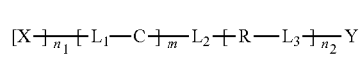

wherein in Formula 1,

X—* is $C_{1-20}$-alkyl-*,

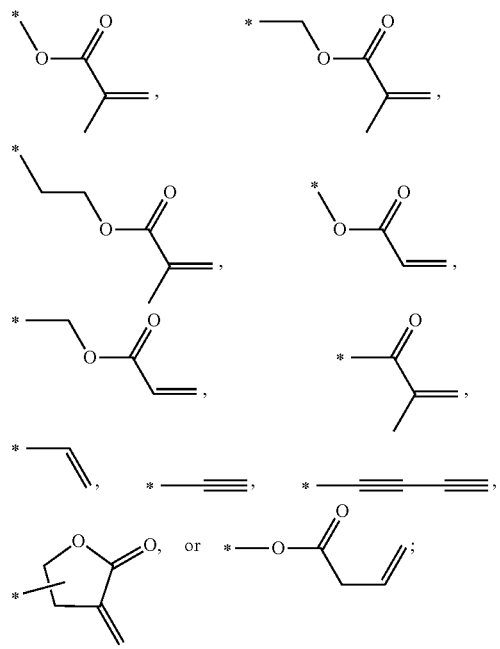

*-$L_1$-* is a single bond, *—$(CH_2)_{p1}$—*, *—$O(CH_2)_{p1}$—*, *—O—*,

*—CH=CH—*, *—C≡C—* (wherein p1 is an integer of 1 to 10), or a combination thereof;

*-$L_2$-* is a single bond, *—$(CH_2)_{p2}$—*, *—$O(CH_2)_{p2}$—*, *—O—*,

*—CH=CH—*, *—C≡C—* (wherein p2 is an integer of 1 to 10), or a combination thereof;

*-$L_3$-* is a single bond, *—$(CH_2)_{p3}$—*, *—$O(CH_2)_{p3}$—*, *—O—*,

*—CH=CH—*, *—C≡C—* (wherein p3 is an integer of 1 to 10), or a combination thereof;

*-L$_1$-*, *-L$_2$-*, and *-L$_3$-* are identical to or different from one another;

*—C—* is a substituted or unsubstituted cyclic linking group selected from substituted or unsubstituted

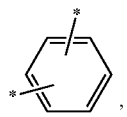

substituted or unsubstituted

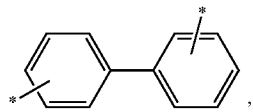

substituted or unsubstituted

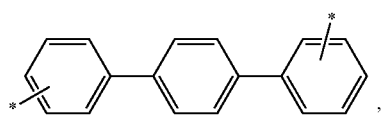

substituted or unsubstituted

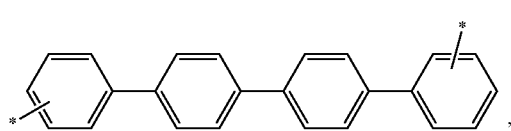

substituted or unsubstituted

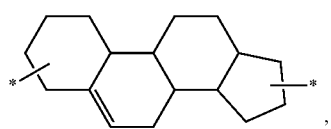

substituted or unsubstituted

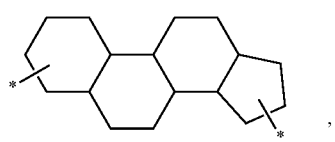

substituted or unsubstituted

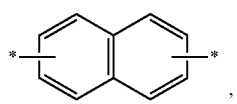

substituted or unsubstituted

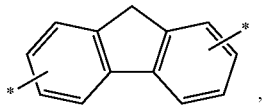

substituted or unsubstituted

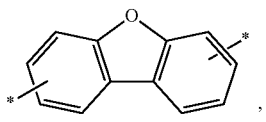

substituted or unsubstituted

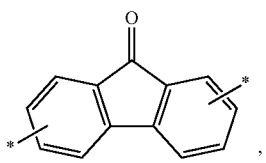

substituted or unsubstituted

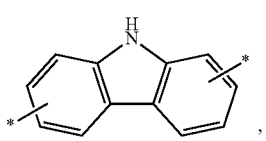

substituted or unsubstituted

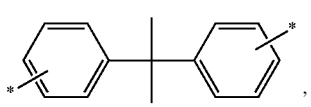

substituted or unsubstituted

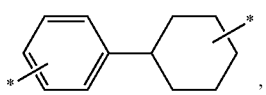

substituted or unsubstituted

substituted or unsubstituted

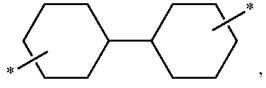

substituted or unsubstituted

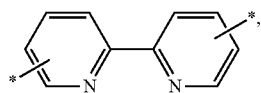

substituted or unsubstituted

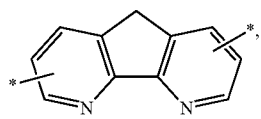

substituted or unsubstituted

substituted or unsubstituted

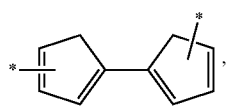

substituted or unsubstituted

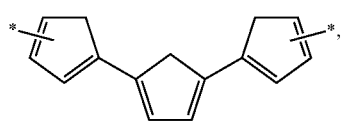

substituted or unsubstituted

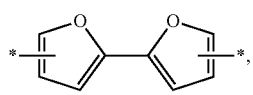

and substituted or unsubstituted

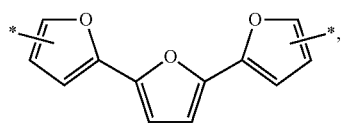

wherein at least one hydrogen in the substituted cyclic linking group is substituted with $C_{1-10}$-alkyl-*, F—*, Br—*, I—*, *—OH, *—NH$_2$, or (meth)acryloxy-$C_{1-10}$-alkyl-*;

*—R—* is *—(CH$_2$)$_q$—*, *—O(CH$_2$)$_q$—*, *—(CH$_2$)$_q$Arn-*, or *—O(CH$_2$)$_q$Arn-* (wherein Arn is a substituted or unsubstituted $C_{6-30}$ arylene, and q is an integer of 1 to 10), wherein at least one hydrogen in the substituted $C_{6-30}$ arylene is substituted with $C_{1-10}$-alkyl-*, F—*, Br—*, I—*, *—OH, *—NH$_2$, or (meth)acryloxy-$C_{1-10}$-alkyl-*;

Y—* is

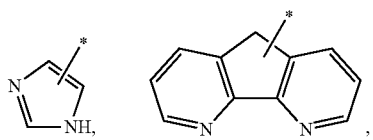

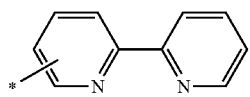

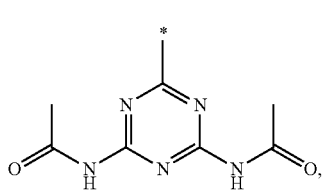

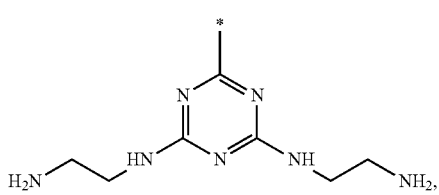

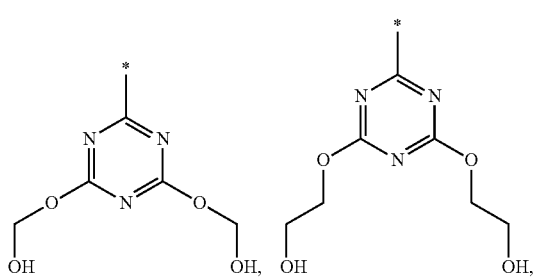

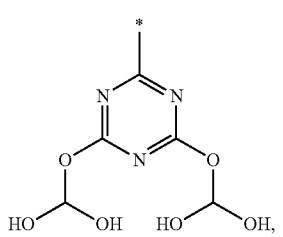

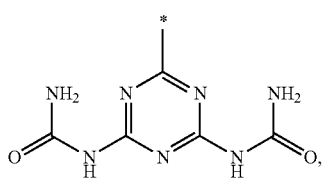

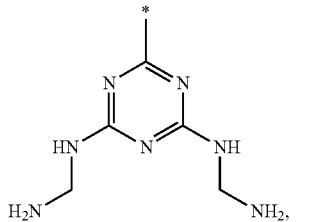

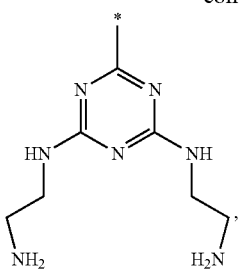

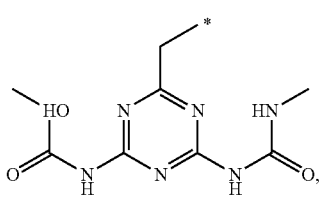

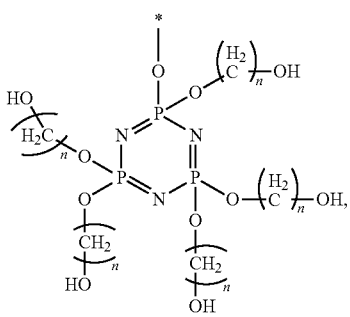

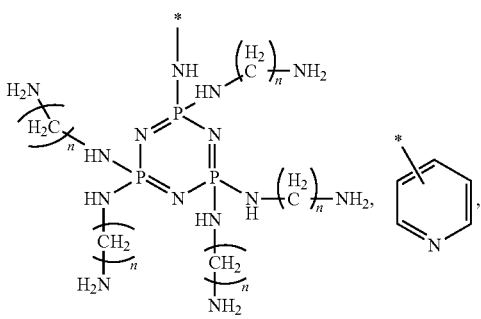

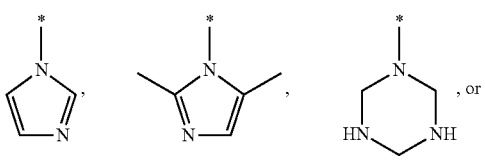

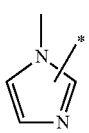

(wherein n is an integer of 0 to 5);

$n_1$ is an integer of 1 to 3, and $n_2$ and m are each independently 0 or 1.

In an exemplary embodiment,

X—* may be $C_{1-20}$-alkyl-*, and the liquid crystal composition may further include a reactive mesogen containing at least one compound represented by Formula 2:

P1-SP1-MG-SP2-P2      Formula 2 wherein in Formula 2,

P1-* and P2-* are each independently

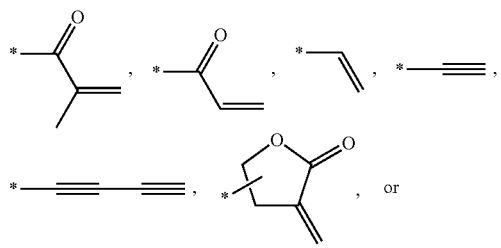

*—SP1-* is

*—(L—Z—L—Ar)$_a$—L—*

(wherein a is an integer of 0 to 2) and *—SP2-* is

*—L—(Ar—L—Z—L)$_b$—*

(wherein b is an integer of 0 to 2), in each of which *-L-* is *—$(CH_2)_c$—*, *—$O(CH_2)_c$—*,

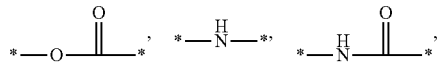

*—CH=CH—*, or *—C≡C—* (wherein c is an integer of 1 to 10), *—Z—* is *—$(CH_2)_d$—* (wherein d is an integer of 0 to 12), and

*—Ar—* is

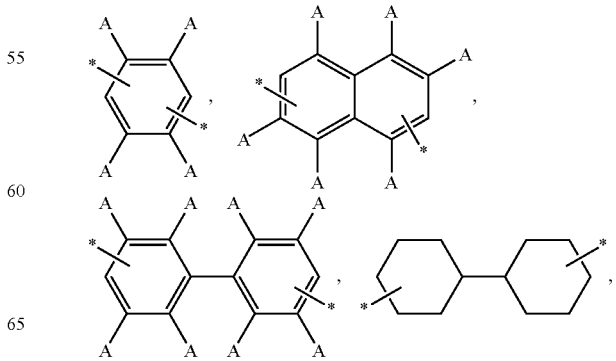

-continued
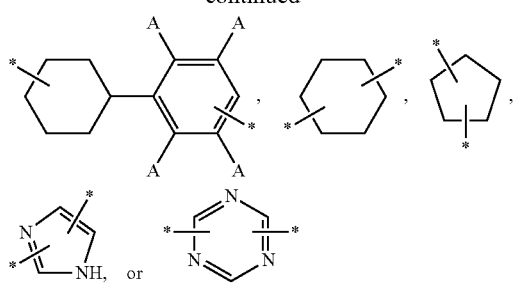
(wherein each A-* is H—*, $C_{1-10}$-alkyl-*, F—*, Br—*, I—*, *—OH, *—$NH_2$, or CN—*); and
*-MG-* is
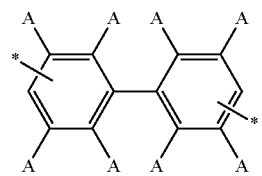
(wherein each A-* is H—*, $C_{1-10}$-alkyl-*, F—*, Br—*, I—*, *—OH, *—$NH_2$, or CN—*).
In an exemplary embodiment, the liquid crystal aligning agent may contain at least one compound represented by Formulae SA 1-1 to SA 1-8:
Formula SA 1-1
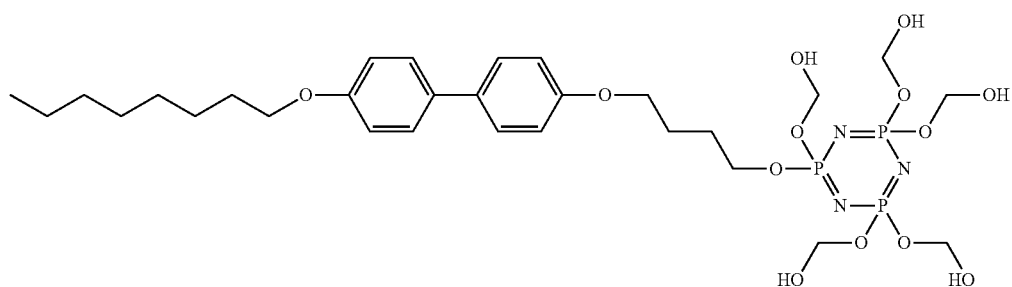
Formula SA 1-2
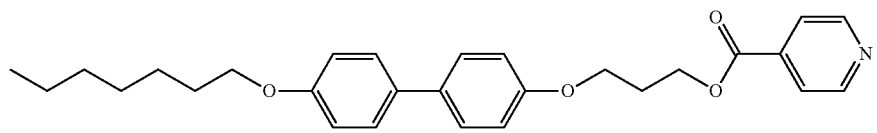
Formula SA 1-3
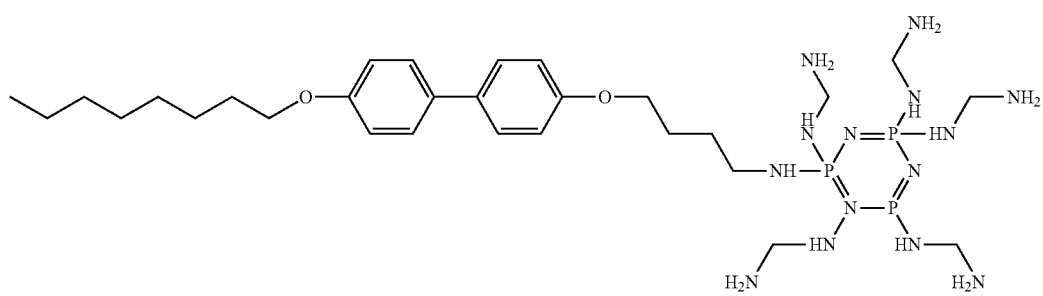
Formula SA 1-4
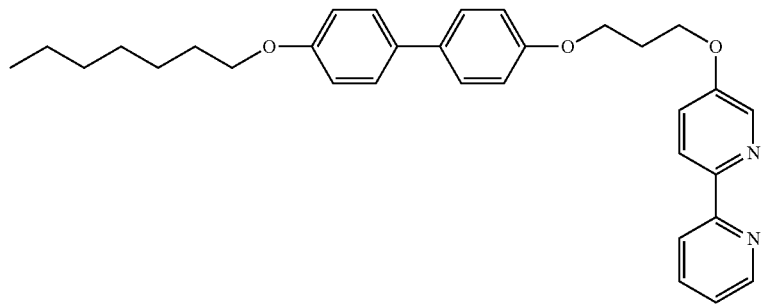

Formula SA 1-5
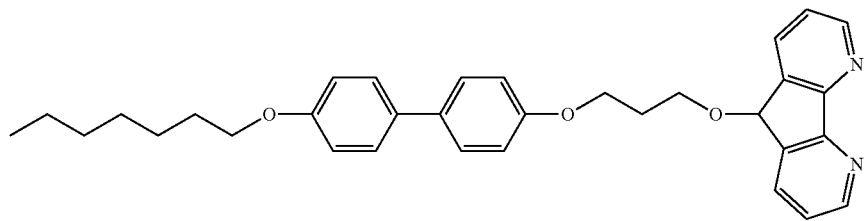
Formula SA 1-6
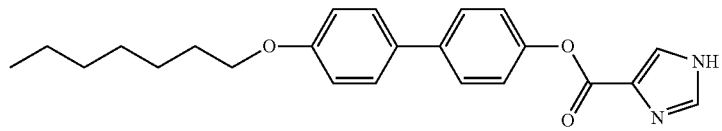
Formula SA 1-7
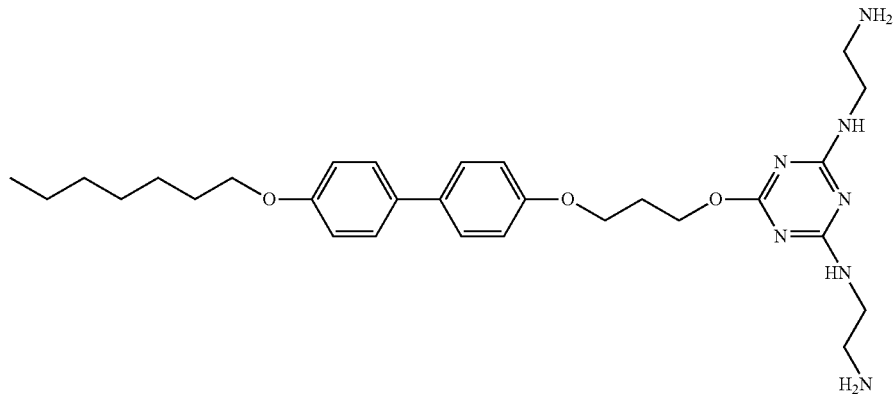
Formula SA 1-8
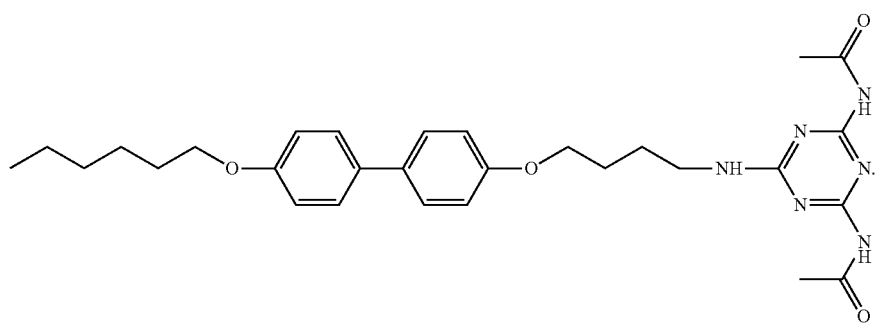
In an exemplary embodiment, the liquid crystal aligning agent may contain the compound represented by Formula 1, wherein X—* is
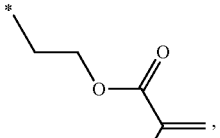
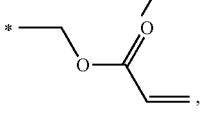
-continued
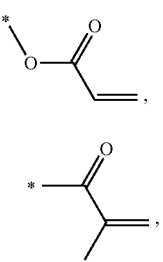

-continued

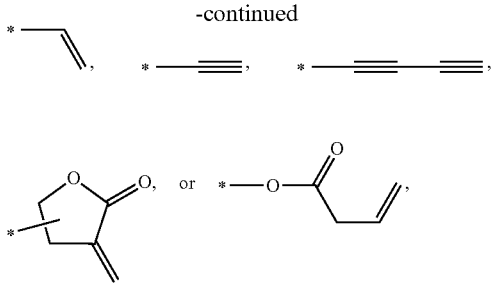

and
wherein a content of the reactive mesogen containing at least one compound represented by Formula 2 may be 0 percent by weight:

P1-SP1-MG-SP2-P2    Formula 2 wherein in Formula 2,
P1-* and P2-* are each independently

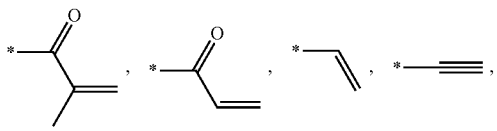

*—SP1-* is

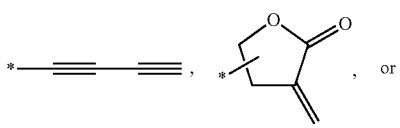

(wherein a is an integer of 0 to 2) and *—SP2-* is

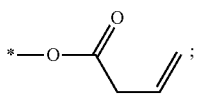

(wherein b is an integer of 0 to 2), in each of which *-L-* is *—(CH$_2$)$_c$—*, *—O(CH$_2$)$_c$—*,

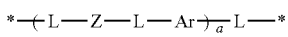

*—CH=CH—*, or *—C≡C—* (wherein c is an integer of 1 to 10), *—Z—* is *—(CH$_2$)$_d$—* (wherein d is an integer of 0 to 12), and *—Ar—*

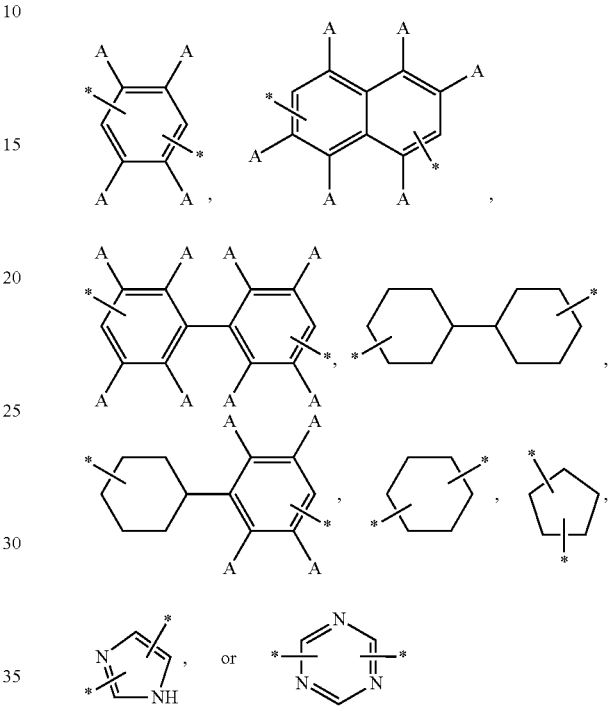

(wherein each A-* is H—*, C$_{1-10}$-alkyl-*, F—*, Br—*, I—*, *—OH, *—NH$_2$, or CN—*); and
*-MG-* is

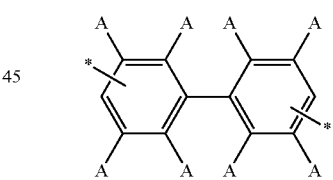

(wherein A-* is H—*, C$_{1-10}$-alkyl-*, F—*, Br—*, I—*, *—OH, *—NH$_2$, or CN—*).

In an exemplary embodiment, the liquid crystal aligning agent may contain at least one compound represented by Formulae SA 2-1 to SA 2-14:

Chemical Formula SA 2-1

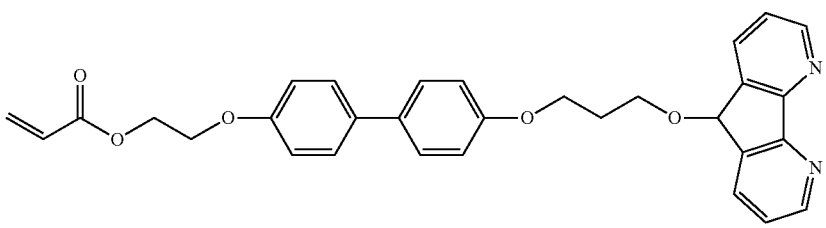

Chemical Formula SA 2-2
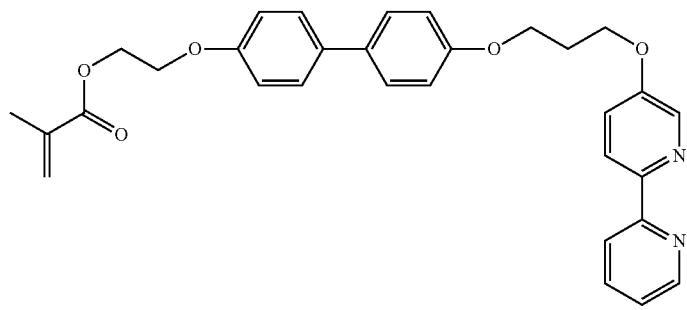
Chemical Formula SA 2-3
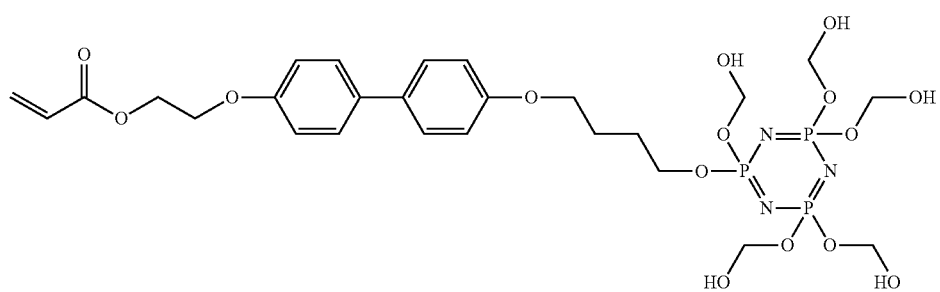
Chemical Formula SA 2-4
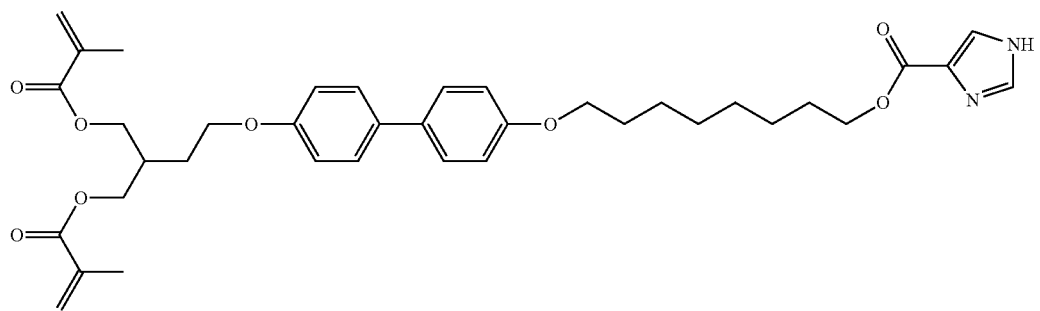
Chemical Formula SA 2-5
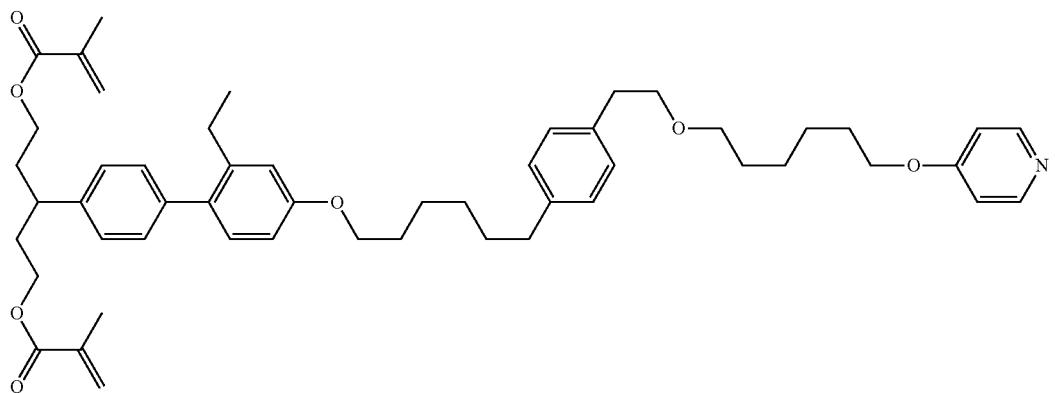

Chemical Formula SA 2-6
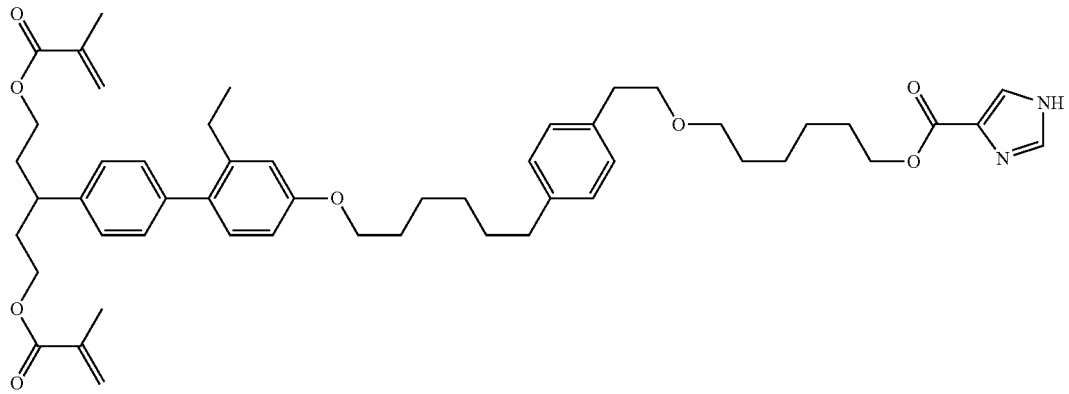
Chemical Formula SA 2-7
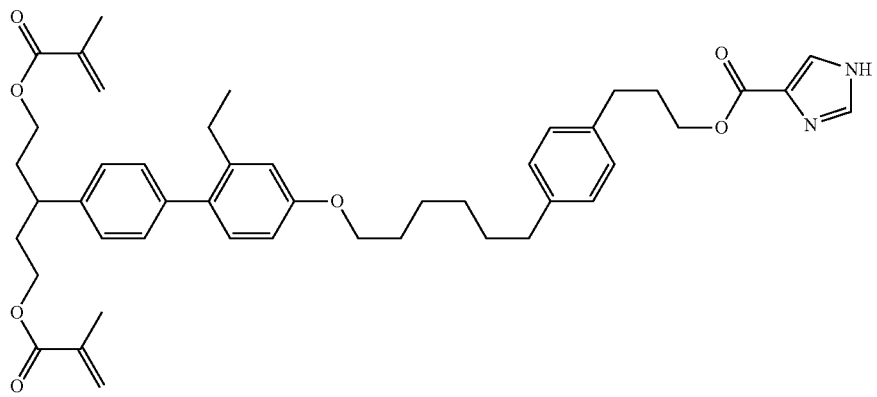
Chemical Formula SA 2-8
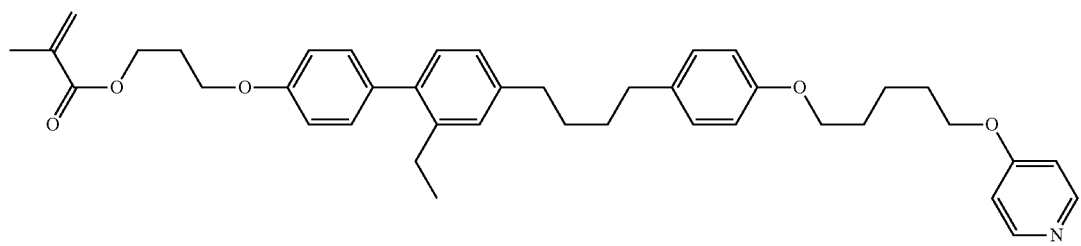
Chemical Formula SA 2-9
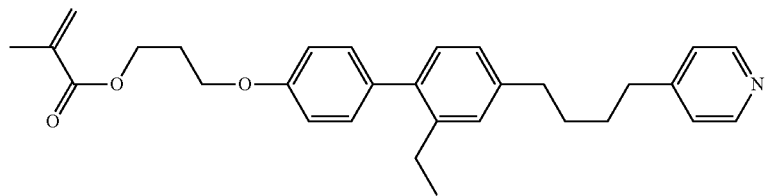

-continued
Chemical Formula SA 2-10
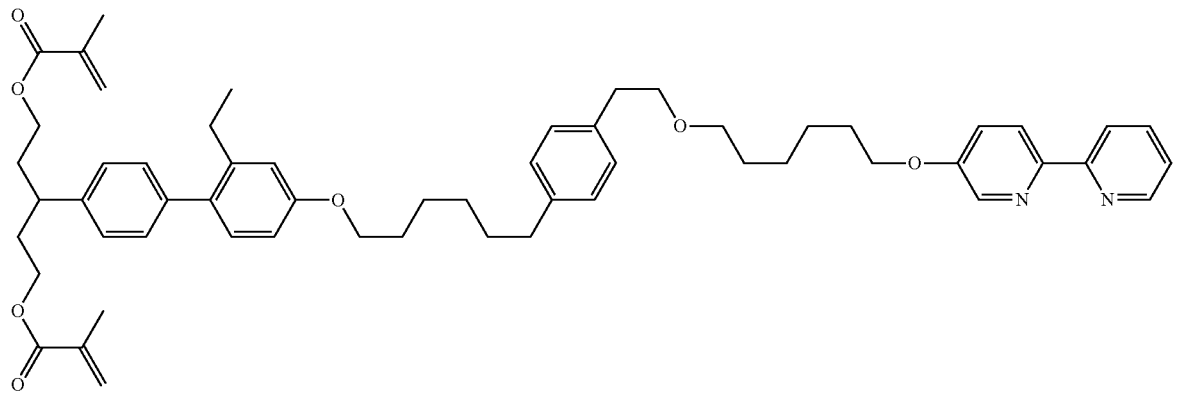
Chemical Formula SA 2-11
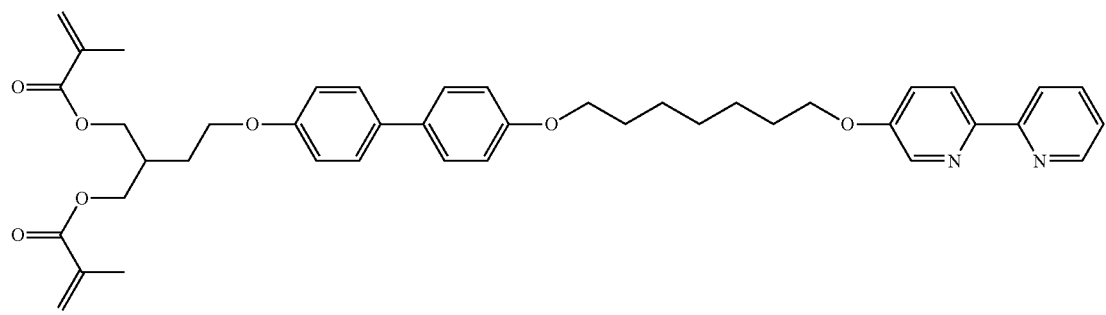
Chemical Formula SA 2-12
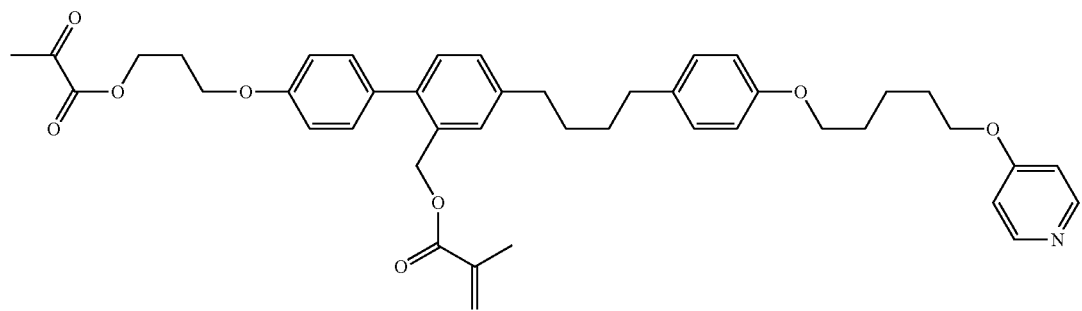
Chemical Formula SA 2-13
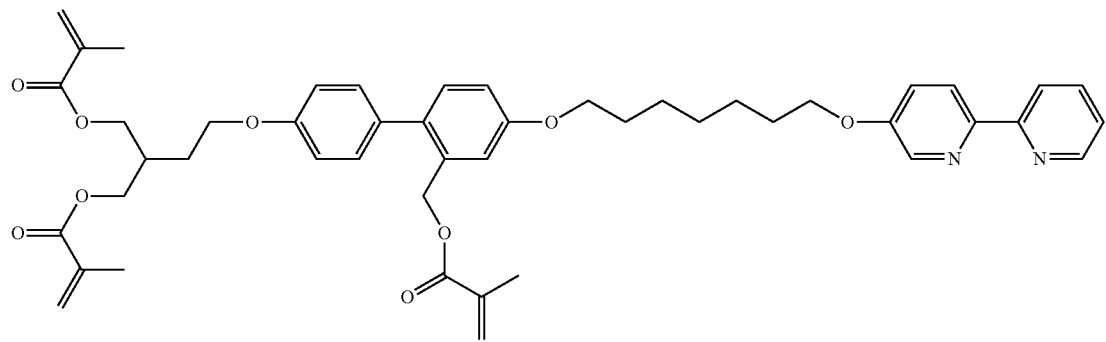

Chemical Formula SA 2-14

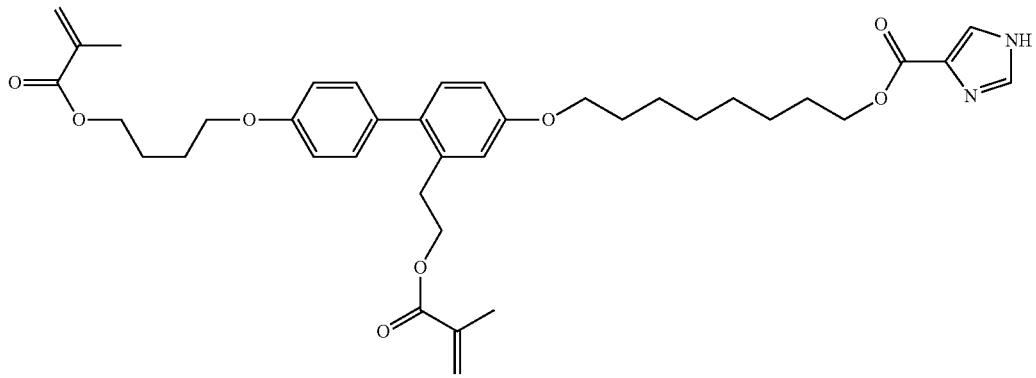

According to an exemplary embodiment, a liquid crystal display device is provided. The liquid crystal display device includes:

a first electrode;

a second electrode facing the first electrode;

a liquid crystal layer containing a liquid crystal compound, wherein the liquid crystal layer is disposed between the first electrode and the second electrode;

a liquid crystal aligning agent including at least one compound represented by Formula 1-1, wherein the liquid crystal layer is adsorbed on a surface of at least one of the first electrode and the second electrode to align the liquid crystal compound; and a polymer of reactive mesogens including two or more compounds represented by Formula 2, which is adsorbed on the surface of at least one of the first electrode and the second electrode to align the liquid crystal compound:

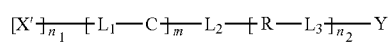  Formula 1-1 wherein in Formula 1-1, $X'$—* is $C_{1-20}$-alkyl-*;

*-$L_1$-* is a single bond, *—$(CH_2)_{p1}$—*, *—$O(CH_2)_{p1}$—*, *—O—*,

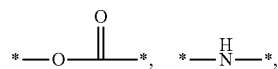

*—CH=CH—*, *—C≡C—* (wherein p1 is an integer of 1 to 10), or a combination thereof;

*-$L_2$-* is a single bond, *—$(CH_2)_{p2}$—*, *—$O(CH_2)_{p2}$—*, *—O—*,

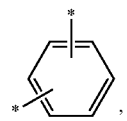

*—CH=CH—*, *—C≡C—* (wherein p2 is an integer of 1 to 10), or a combination thereof;

*-$L_3$-* is a single bond, *—$(CH_2)_{p3}$—*, *—$O(CH_2)_{p3}$—*, *—O—*,

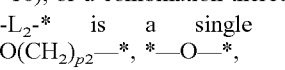

*—CH=CH—*, *—C≡C—* (wherein p3 is an integer of 1 to 10), or a combination thereof;

*-$L_1$-*, *-$L_2$-*, and *-$L_3$-* are identical to or different from one another;

*—C—* is a substituted or unsubstituted cyclic linking group selected from substituted or unsubstituted

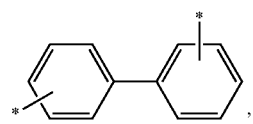

substituted or unsubstituted

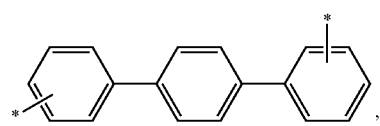

substituted or unsubstituted

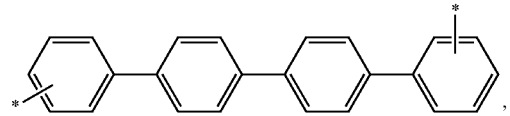

substituted or unsubstituted substituted or unsubstituted

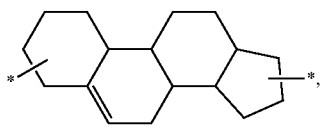

substituted or unsubstituted

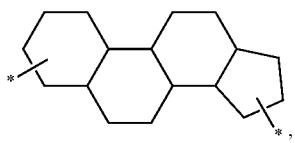

substituted or unsubstituted

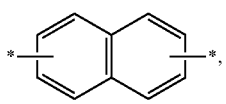

substituted or unsubstituted

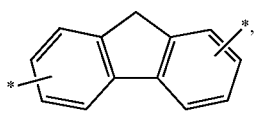

substituted or unsubstituted

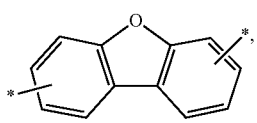

substituted or unsubstituted

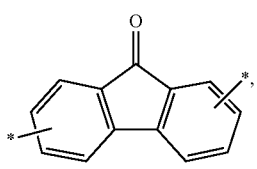

substituted or unsubstituted

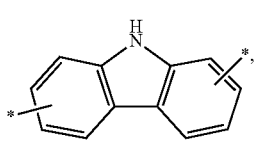

substituted or unsubstituted

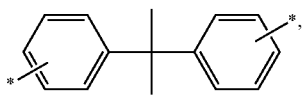

substituted or unsubstituted

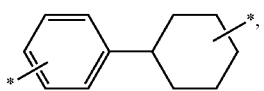

substituted or unsubstituted

substituted or unsubstituted

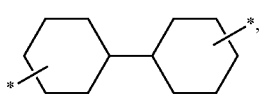

substituted or unsubstituted

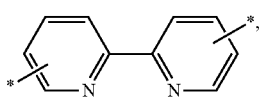

substituted or unsubstituted

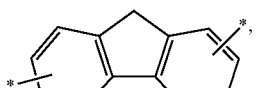

substituted or unsubstituted

substituted or unsubstituted

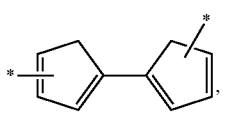

substituted or unsubstituted

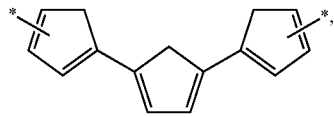

substituted or unsubstituted

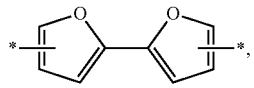

and substituted or unsubstituted

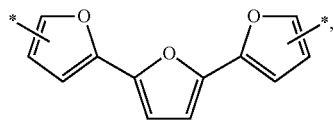

wherein at least one hydrogen in the substituted cyclic linking group is substituted with $C_{1-10}$-alkyl-*, F—*, Br—*, I—*, *—OH, *—NH$_2$, or (meth)acryloxy-$C_{1-10}$-alkyl-*; *—R—* is *—(CH$_2$)$_q$—*, *—O(CH$_2$)$_q$—*, *—(CH$_2$)$_q$Arn-*, or *—O(CH$_2$)$_q$Arn-* (wherein Arn is a substituted or unsubstituted $C_{6-30}$ arylene, and q is an integer of 1 to 10), wherein at least one hydrogen in the substituted $C_{6-30}$ arylene is substituted with $C_{1-10}$-alkyl-*, F—*, Br—*, I—*, *—OH, *—NH$_2$, or (meth)acryloxy-$C_{1-10}$-alkyl-*;

Y—* is

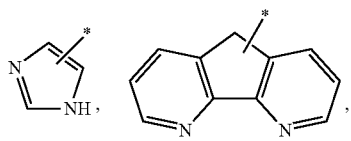

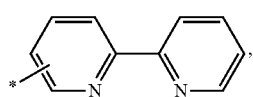

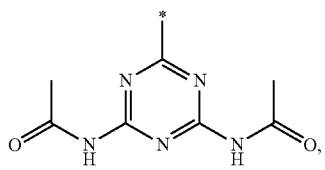

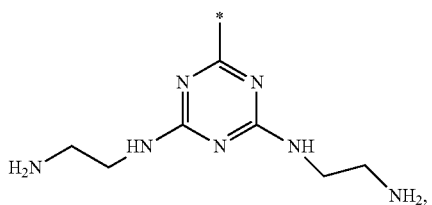

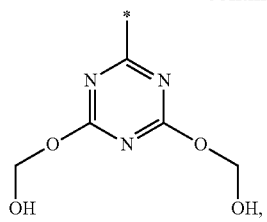

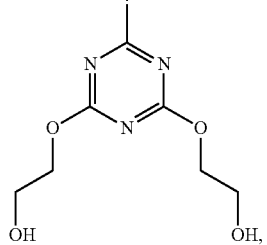

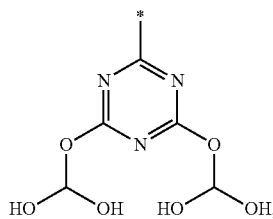

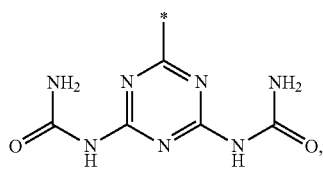

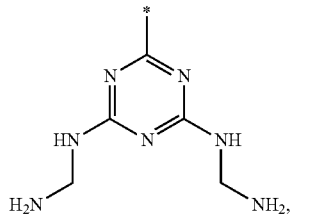

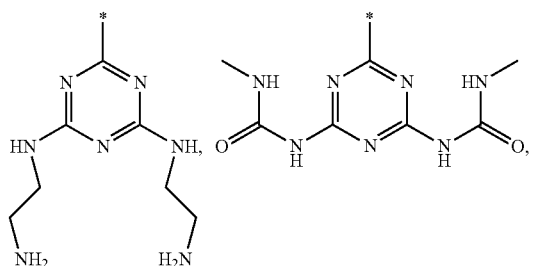

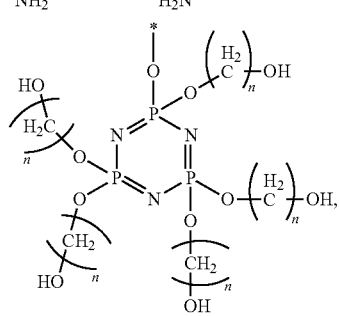

-continued

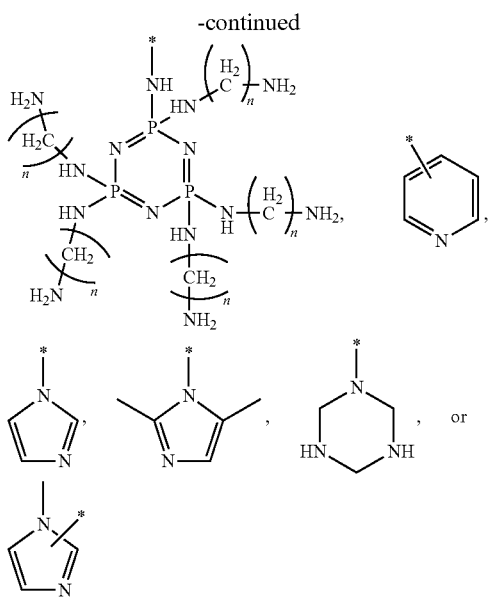

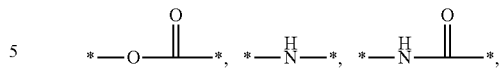

(wherein n is an integer of 0 to 5);
$n_1$ is 1, and
$n_2$ and m are each independently 0 or 1, P1-SP1-MG-SP2-P2     Formula 2 wherein in Formula 2,
P1-* and P2-* are each independently

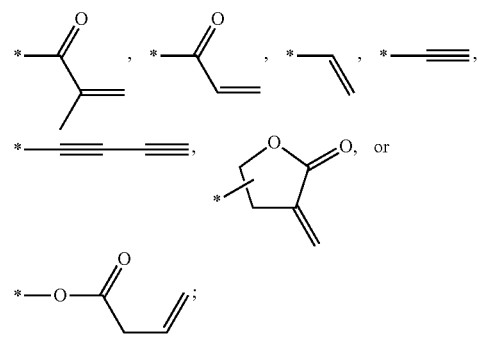

*—SP1-* is

*—(L—Z—L—Ar)$_a$—L—*

(wherein a is an integer of 0 to 2) and *—SP2-* is

*—L—(Ar—L—Z—L)$_b$—*

(wherein b is an integer of 0 to 2), in each of which *-L-* is *—(CH$_2$)$_c$—*, *—O(CH$_2$)$_c$—*,

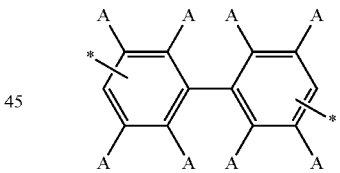

*—CH═CH—*, or *—C≡C—* (wherein c is an integer of 1 to 10), *—Z—* is *—(CH$_2$)$_d$—* (wherein d is an integer of 0 to 12), or *—Ar—* is

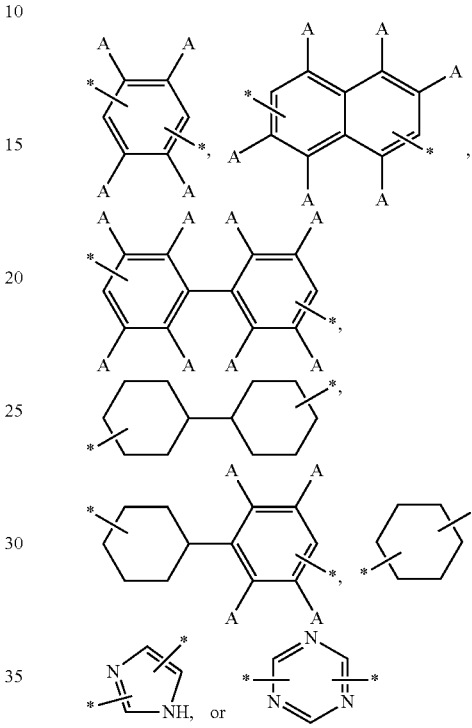

(wherein each A-* is H—*, $C_{1-10}$-alkyl-*, F—*, Br—*, I—*, *—OH, *—NH$_2$, or CN—*); and
*-MG-* is (wherein each A-* is H—*, F—*, Br—*, I—*, *—OH, *—NH$_2$, or CN—*).

In an exemplary embodiment, the liquid crystal aligning agent may contain at least one compound represented by Formulae SA 1-1 to SA 1-8:

Formula SA 1-1

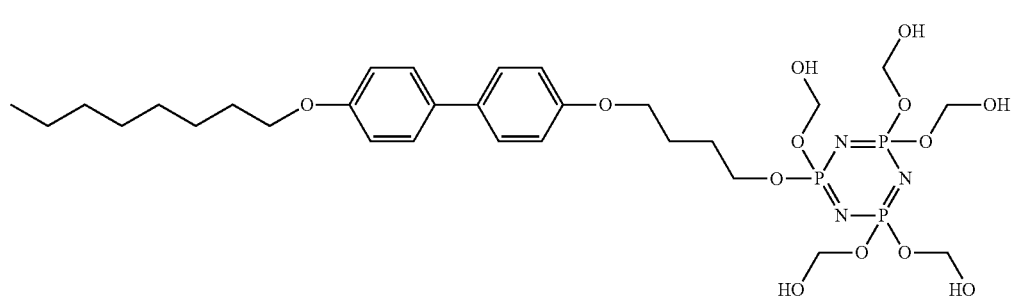

Formula SA 1-2
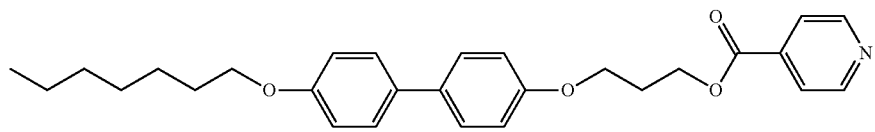
Formula SA 1-3
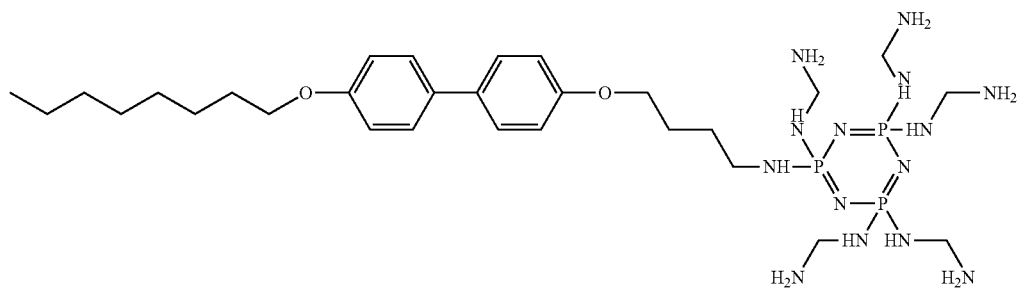
Formula SA 1-4
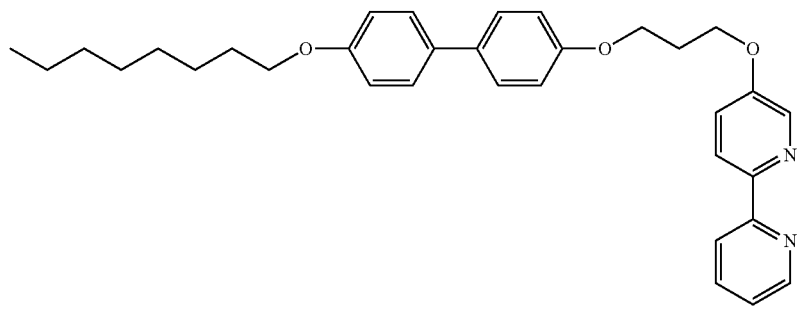
Formula SA 1-5
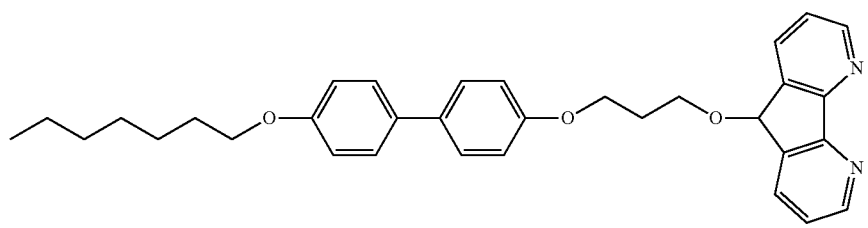
Formula SA 1-6
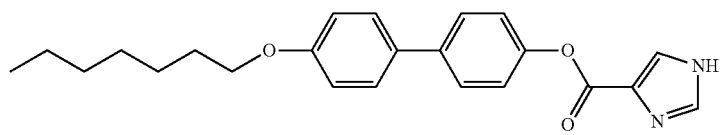
Formula SA 1-7
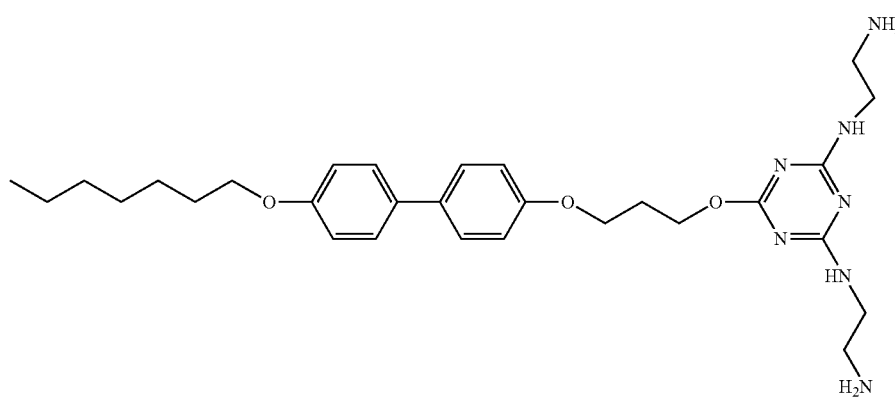

-continued

Formula SA 1-8

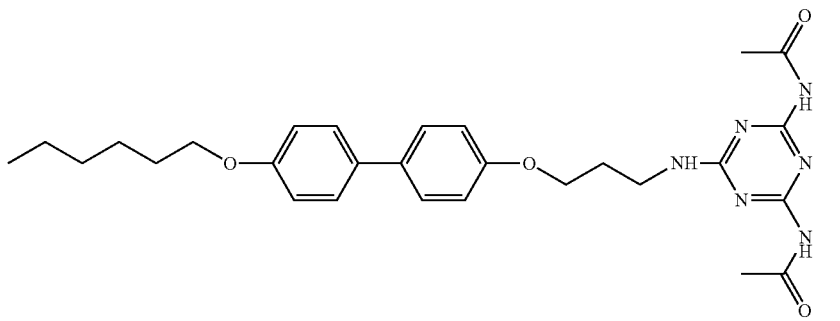

According to another exemplary embodiment, a liquid crystal display device is provided. The liquid crystal display device, including:
- a first electrode;
- a second electrode facing the first electrode;
- a liquid crystal layer containing a liquid crystal compound, wherein the liquid crystal layer is disposed between the first electrode and the second electrode; and
- a polymer of liquid crystal aligning agents including two or more of compounds represented by Formula 1-2, which is adsorbed on the surface of at least one of the first electrode and the second electrode to align the liquid crystal compound, wherein a content of compounds represented by Formula 2 is 0 percent by weight:

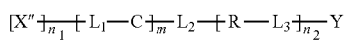

Formula 1-2 wherein in Formula 1-1,
X″—* is a polymerizing group selected from

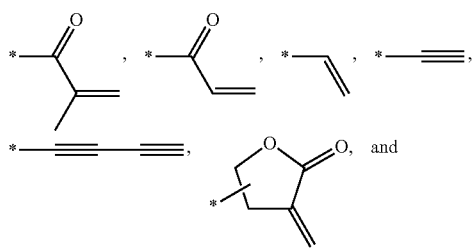

*-L$_1$-* is a single bond, *—(CH$_2$)$_{p1}$—*, *—O(CH$_2$)$_{p1}$—*, *—O—*,

*—CH=CH—*, *—C≡C—* (wherein p1 is an integer of 1 to 10), or a combination thereof;
*-L$_2$-* is a single bond, *—(CH$_2$)$_{p2}$—*, *—O(CH$_2$)$_{p2}$—*, *—O—*,

*—O—C(=O)—*, *—N(H)—*,

*—CH=CH—*, *—C≡C—* (wherein p2 is an integer of 1 to 10), or a combination thereof;
*-L$_3$-* is a single bond, *—(CH$_2$)$_{p3}$—*, *—O(CH$_2$)$_{p3}$—*, *—O—*,

*—O—C(=O)—*, *—N(H)—*,

*—CH=CH—*, *—C≡C—* (wherein p3 is an integer of 1 to 10), or a combination thereof;
*-L$_1$-*, *-L$_2$-*, and *-L$_3$-* are identical to or different from one another;
*—C—* is a substituted or unsubstituted cyclic linking group selected from substituted or unsubstituted

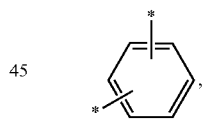

substituted or unsubstituted

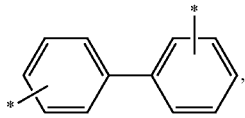

substituted or unsubstituted

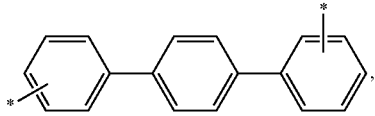

substituted or unsubstituted

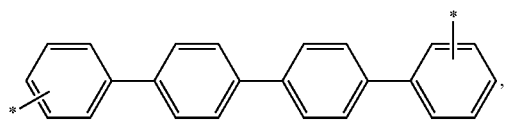

substituted or unsubstituted

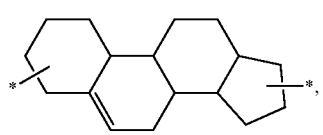

substituted or unsubstituted

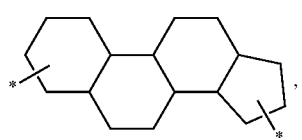

substituted or unsubstituted

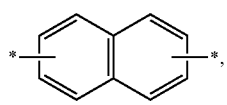

substituted or unsubstituted

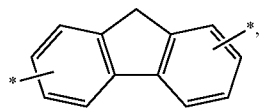

substituted or unsubstituted

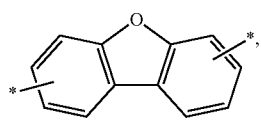

substituted or unsubstituted

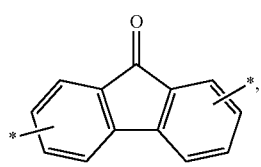

substituted or unsubstituted

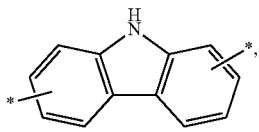

substituted or unsubstituted

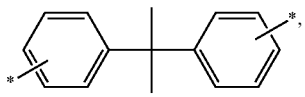

substituted or unsubstituted

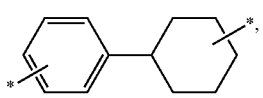

substituted or unsubstituted

substituted or unsubstituted

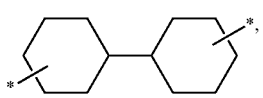

substituted or unsubstituted

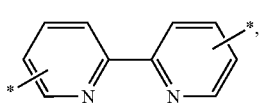

substituted or unsubstituted

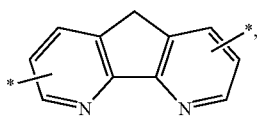

substituted or unsubstituted

substituted or unsubstituted

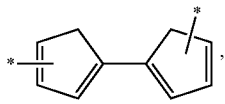

substituted or unsubstituted

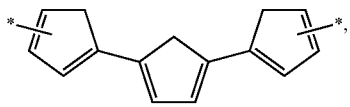

substituted or unsubstituted

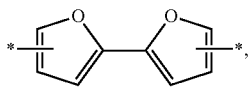

and substituted or unsubstituted

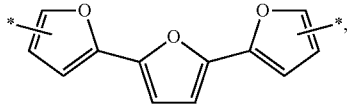

wherein at least one hydrogen in the substituted cyclic linking group is substituted with $C_{1-10}$-alkyl-*, F—*, Br—*, I—*, *—OH, *—$NH_2$, or (meth)acryloxy-$C_{1-10}$-alkyl-*;

*—R—* is *—$(CH_2)_q$—*, *—$O(CH_2)_q$—*, *—$(CH_2)_q$Arn-*, or *—$O(CH_2)_q$Arn-* (wherein Arn is a substituted or unsubstituted $C_{6-30}$ arylene, and q is an integer of 1 to 10); wherein at least one hydrogen in the substituted $C_{6-30}$ arylene is substituted with $C_{1-10}$-alkyl-*, F—*, Br—*, I—*, *—OH, *—$NH_2$, or (meth)acryloxy-$C_{1-10}$-alkyl-*;

Y—*

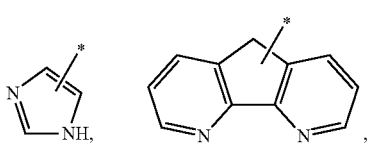

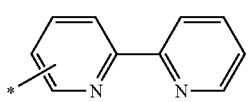

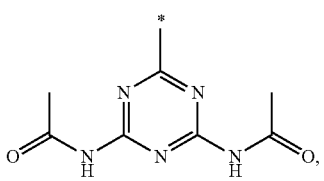

-continued

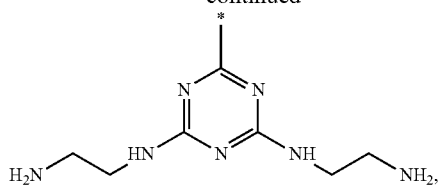

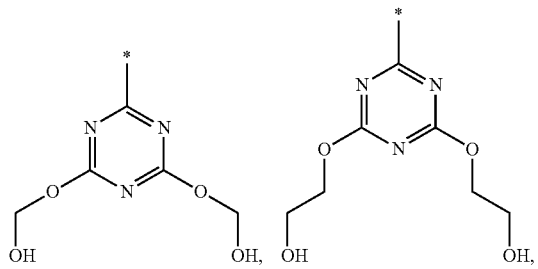

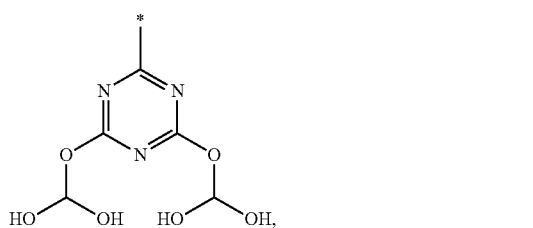

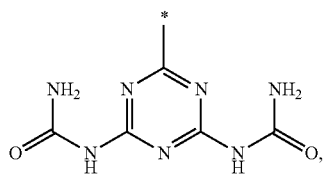

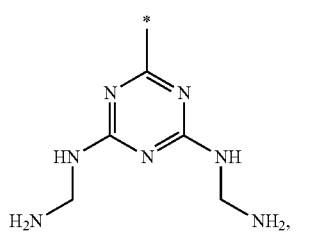

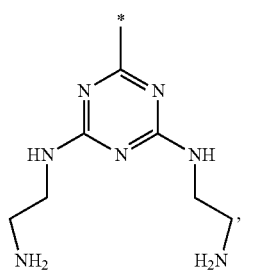

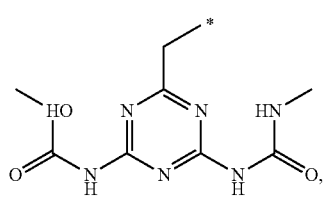

-continued

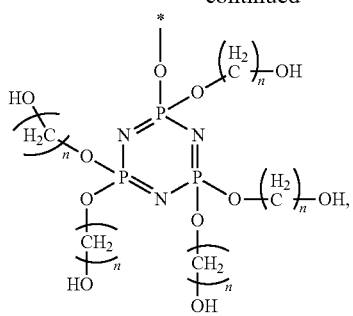

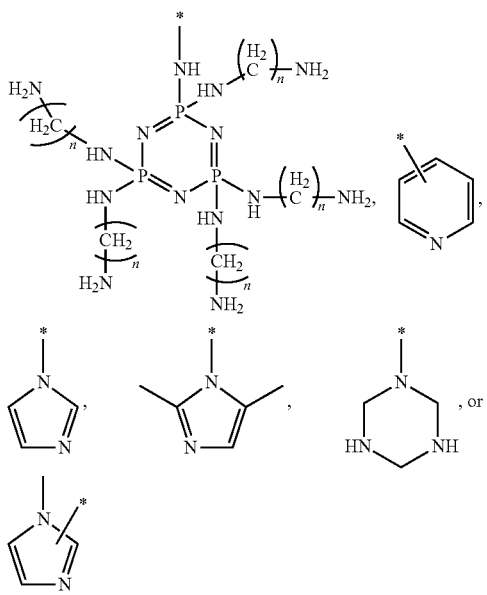

(wherein n is an integer of 0 to 5);
n₁ is an integer of 1 to 3, and
n₂ and m are each independently 0 or 1, P1-SP1-MG-SP2-P2   Formula 2 wherein in Formula 2,
P1-* and P2-* are each independently

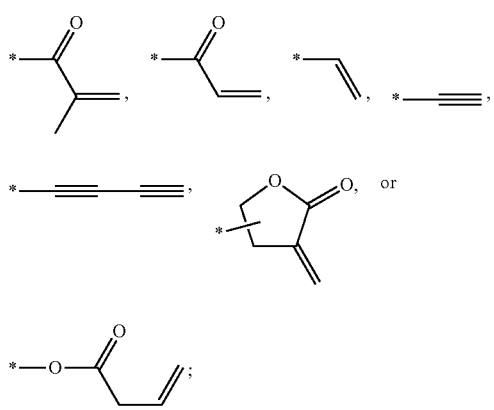

*—SP1-* is

*—(L—Z—L—Ar)ₐ—L—*

(wherein a is an integer of 0 to 2) and *—SP2-* is

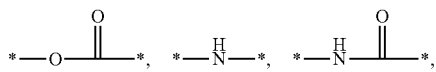

(wherein b is an integer of 0 to 2), in each of which *-L-* is *—(CH₂)_c—*, *—O(CH₂)_c—*,

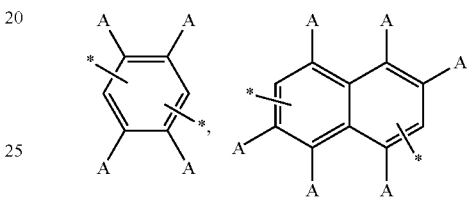

*—CH=CH—*, or *—C≡C—* (wherein c is an integer of 1 to 10), *—Z—* is *—(CH₂)_d—* (wherein d is an integer of 0 to 12), and *—Ar—* is

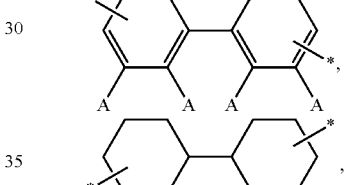

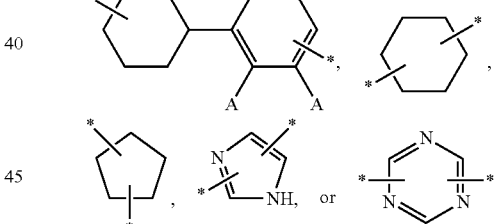

(wherein each A-* is H—*, C₁₋₁₀-alkyl-*, F—*, Br—*, I—*, *—OH, *—NH₂, or CN—*); and
*-MG-* is

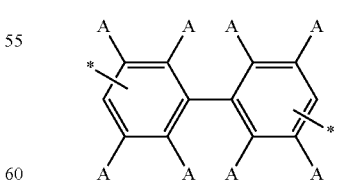

(wherein each A-* is H—*, C₁₋₁₀-alkyl-*, F—*, Br—*, I—*, *—OH, *—NH₂, or CN—*).

In an exemplary embodiment, the liquid crystal aligning agent may contain at least one compound represented by Formulae SA 2-1 to SA 2-14:

Chemical Formula SA 2-1
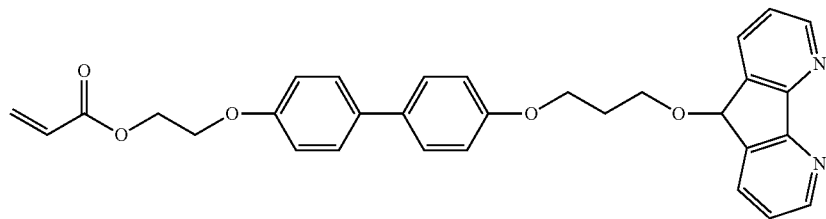
Chemical Formula SA 2-2
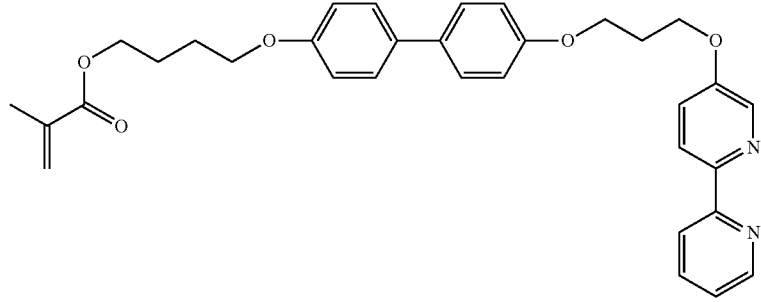
Chemical Formula SA 2-3
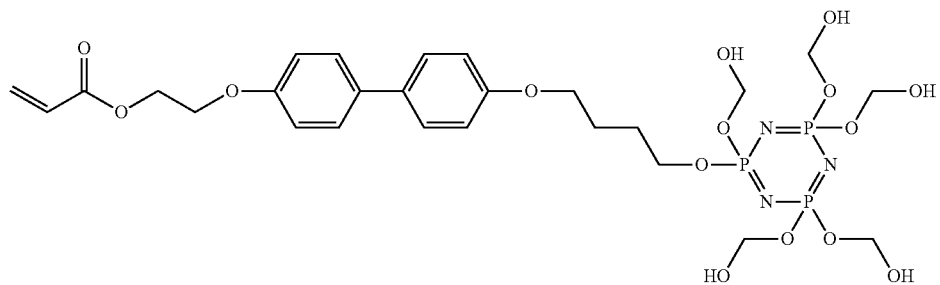
Chemical Formula SA 2-4
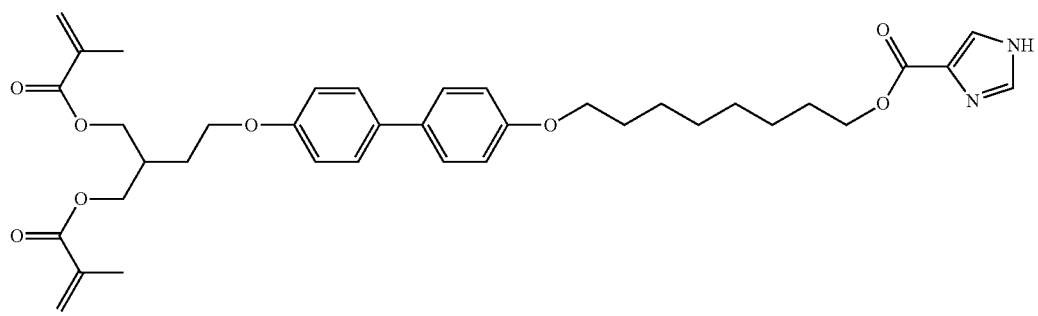
Chemical Formula SA 2-5
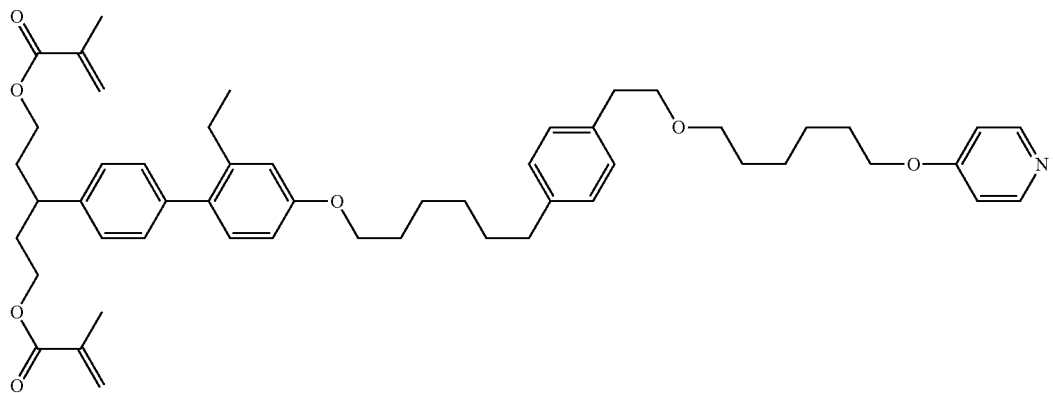

Chemical Formula SA 2-6
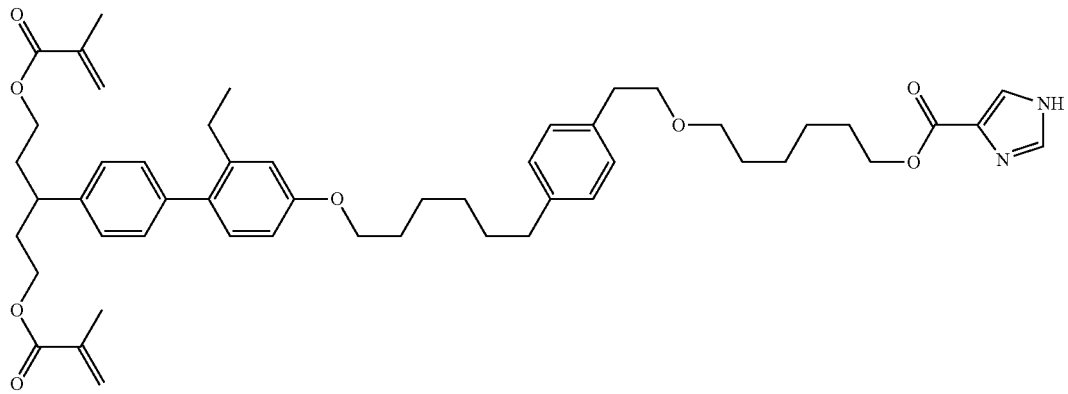
Chemical Formula SA 2-7
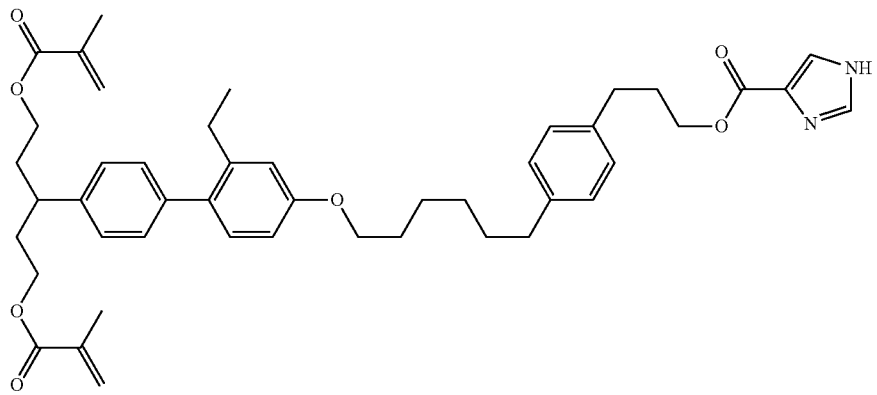
Chemical Formula SA 2-8
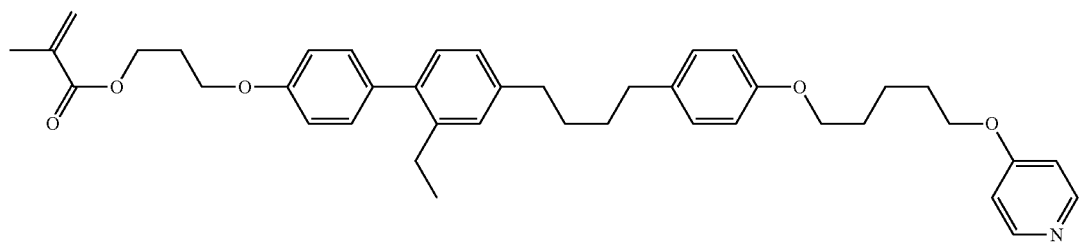
Chemical Formula SA 2-9
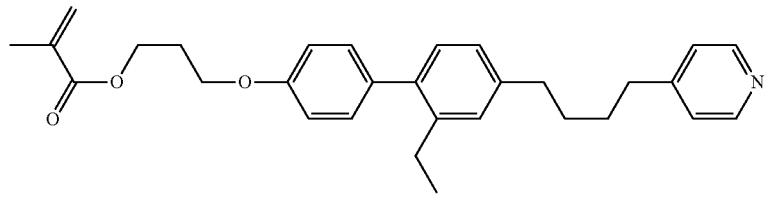

Chemical Formula SA 2-10
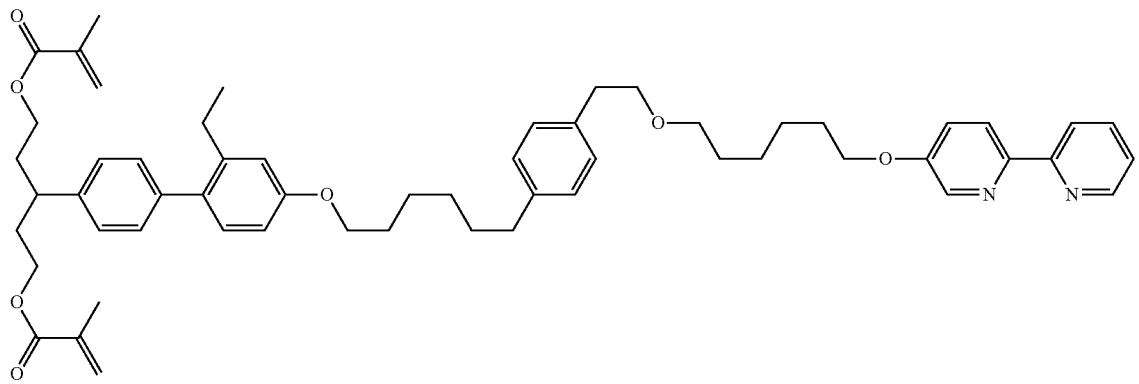
Chemical Formula SA 2-11
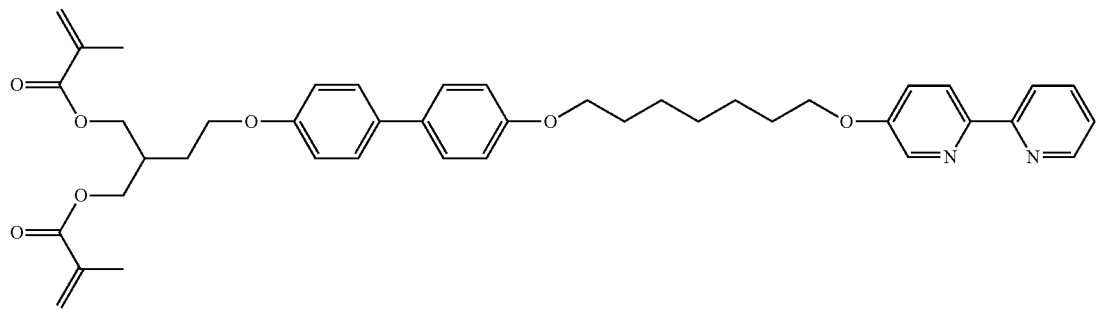
Chemical Formula SA 2-12
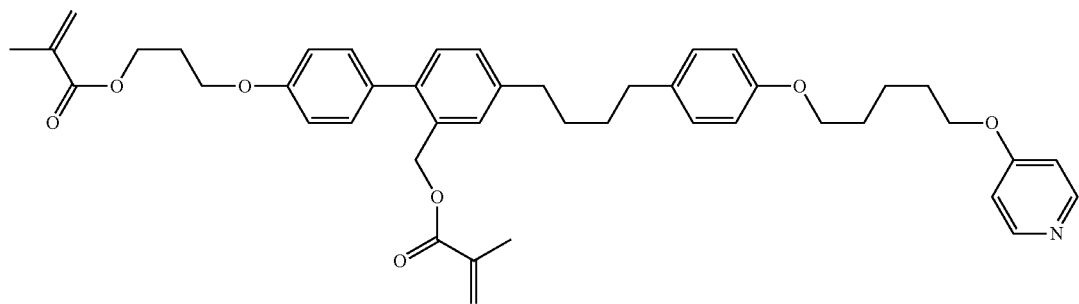
Chemical Formula SA 2-13
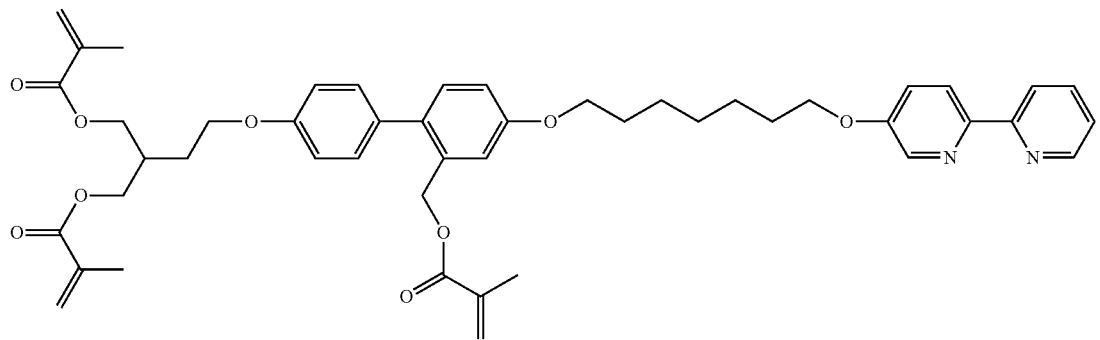

-continued

Chemical Formula SA 2-14

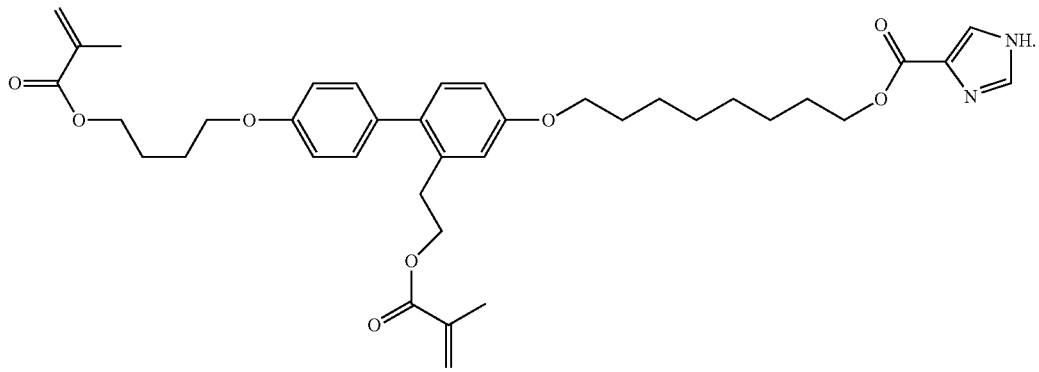

According to an exemplary embodiment, a method of manufacturing liquid crystal display device is provided. The method includes:

disposing the liquid crystal composition between a first electrode and a second electrode facing the first electrode to manufacture a liquid crystal cell; and irradiating the liquid crystal cell with ultraviolet rays when a voltage is applied to the liquid crystal cell.

In an exemplary embodiment, X—* may be $C_{1-20}$-alkyl-* group, and the liquid crystal composition may further include a reactive mesogen containing at least one compound represented by Formula 2:

P1-SP1-MG-SP2-P2    Formula 2 wherein in Formula 2,

P1-* and P2-* are each independently

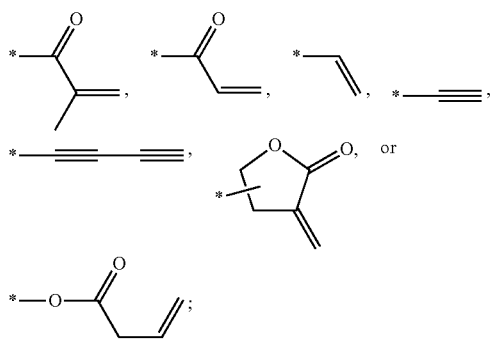

*—SP1-* is

*—(L—Z—L—Ar)$_a$—L—*

(wherein a is an integer of 0 to 2) and *—SP2-* is

*—L—(Ar—L—Z—L)$_b$—*

(wherein b is an integer of 0 to 2), in each of which *-L-* is *—$(CH_2)_c$—*, *—$O(CH_2)_c$—*,

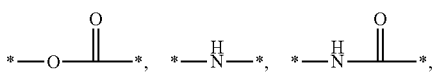

*—CH=CH—*, or *—C≡C—* (wherein c is an integer of 1 to 10), *—Z—* is *—$(CH_2)_d$—* (wherein d is an integer of 0 to 12), and *—Ar—* is

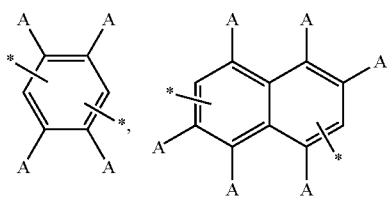

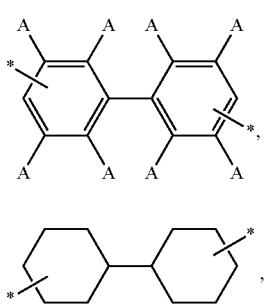

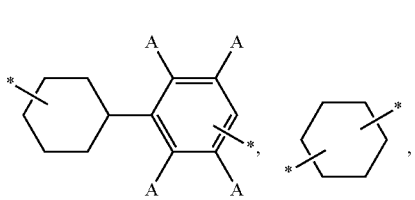

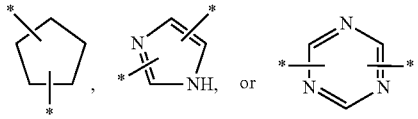

(wherein each A-* is H—*, $C_{1-10}$-alkyl-*, F—*, Br—*, I—*, *—OH, *—NH$_2$, or CN—*); and *-MG-* is
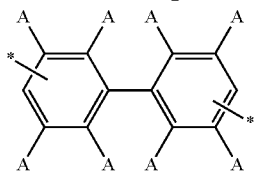
(wherein each A-* is H—*, $C_{1-10}$-alkyl-*, F—*, Br—*, I—*, *—OH, *—NH$_2$, or CN—*).
In an exemplary embodiment, at least one of the liquid crystal aligning agent may contain at least one compound represented by Formulae SA 1-1 to SA 1-8:
Formula SA 1-1
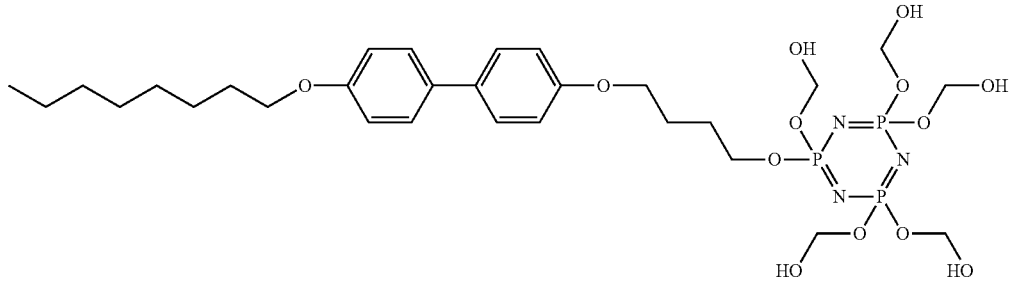
Formula SA 1-2
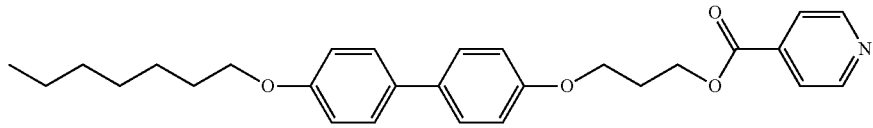
Formula SA 1-3
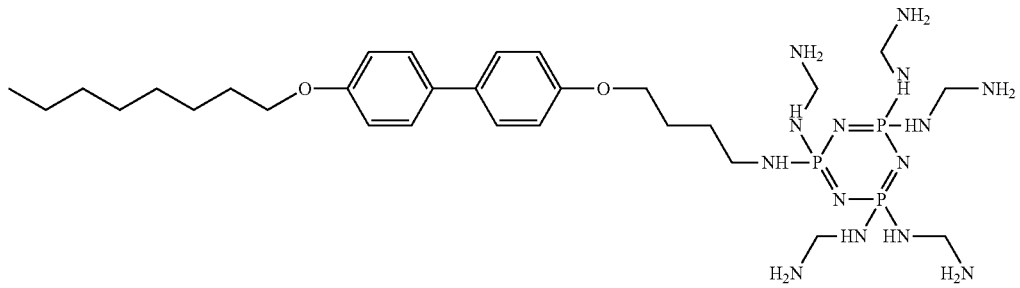
Formula SA 1-4
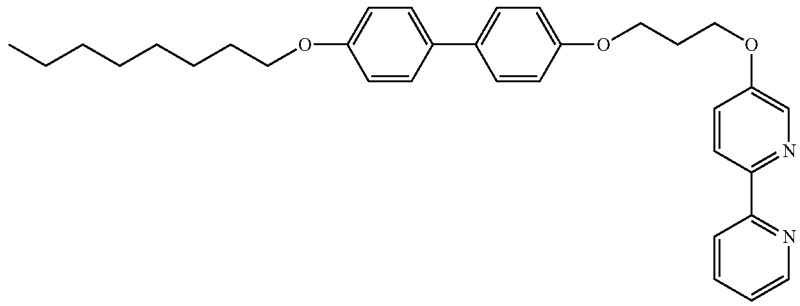
Formula SA 1-5
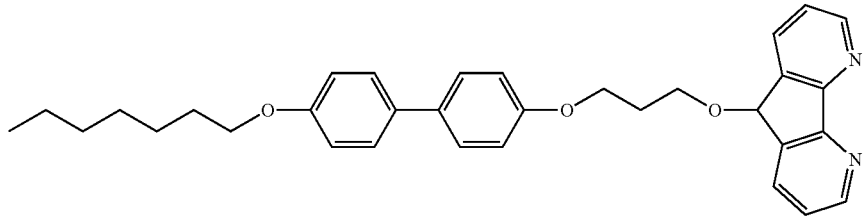
Formula SA 1-6
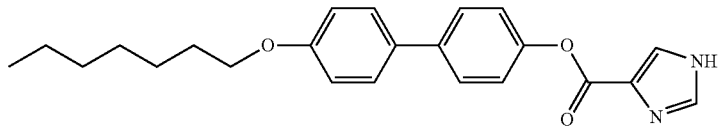

-continued

Formula SA 1-7

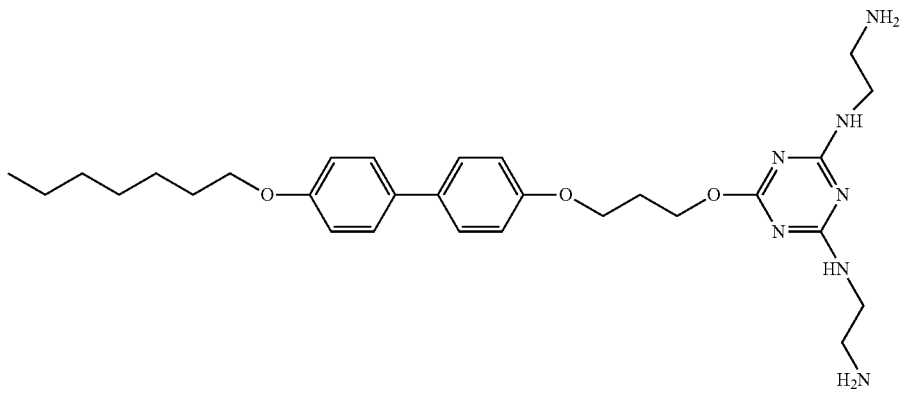

Formula SA 1-8

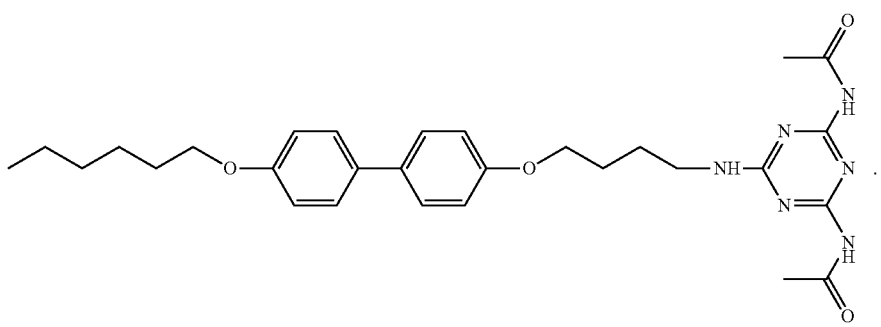

In an exemplary embodiment,
the liquid crystal aligning agent may contain the compound represented by Formula 1, wherein X—* is

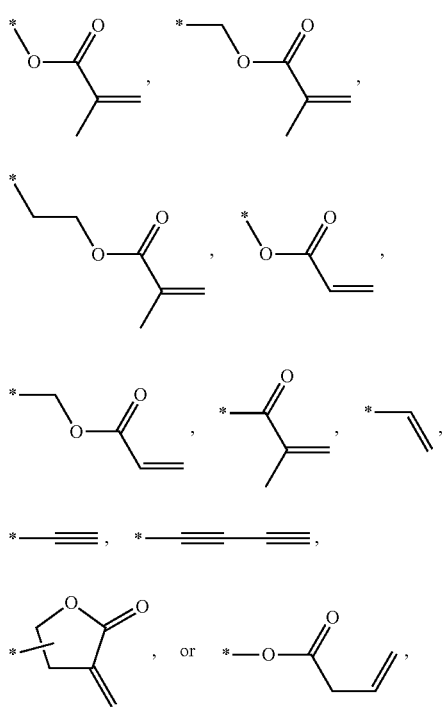

and
a content of the reactive mesogen containing at least one compound represented by Formula 2 may be 0 percent by weight:

P1-SP1-MG-SP2-P2         Formula 2 wherein in Formula 2,
P1-* and P2-* are each independently

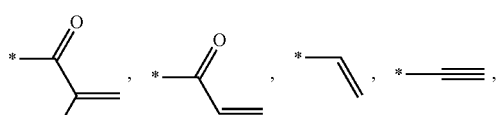

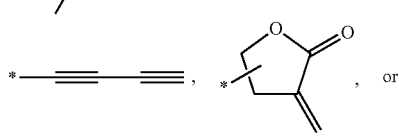

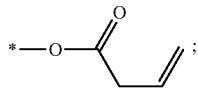;

*—SP1-* is

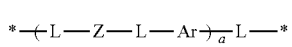

(wherein a is an integer of 0 to 2) and *—SP2-* is

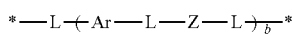

(wherein b is an integer of 0 to 2), in each of which *-L-* is *—(CH$_2$)$_c$—*, *—O(CH$_2$)$_c$—*,

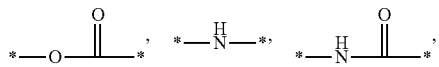

*—CH=CH—*, or *—C≡C—* (wherein c is an integer of 1 to 10), *—Z—* is *—(CH$_2$)$_d$—* (wherein d is an integer of 0 to 12), and *—Ar—* is

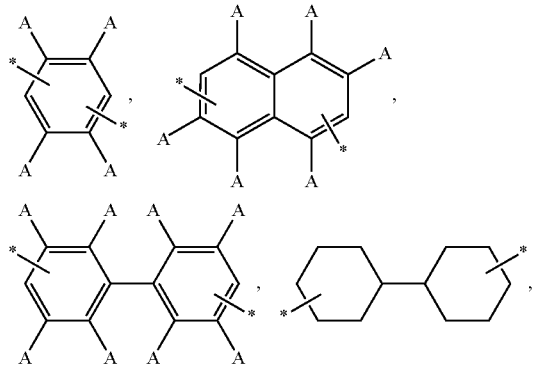

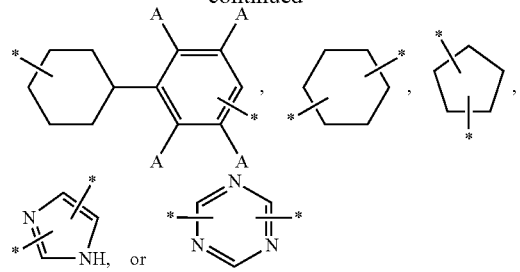

(wherein each A-* is H—*, C$_{1-10}$-alkyl-*, F—*, Br—*, I—*, *—OH, *—NH$_2$, or CN—*); and *-MG-* is

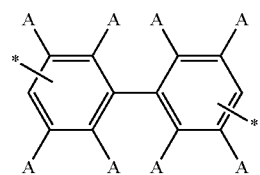

(wherein A-* is H—*, C$_{1-10}$-alkyl-*, F—*, Br—*, I—*, *—OH, *—NH$_2$, or CN—*).

In an exemplary embodiment, the liquid crystal aligning agent may contain at least one compound represented by Formulae SA 2-1 to SA 2-14:

Chemical Formula SA 2-1

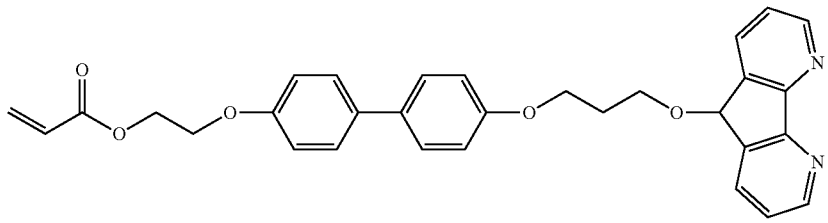

Chemical Formula SA 2-2

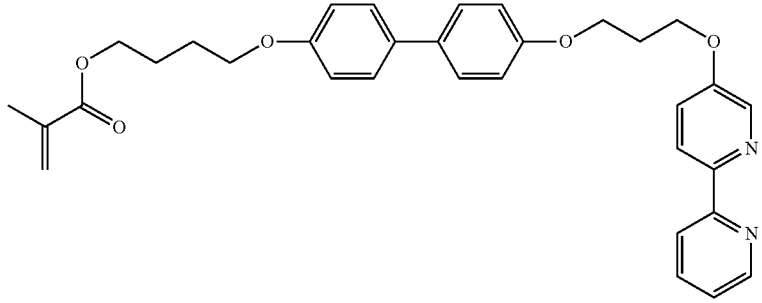

Chemical Formula SA 2-3

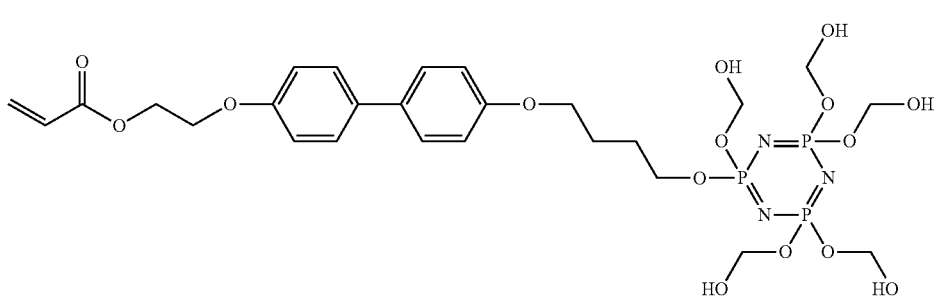

Chemical Formula SA 2-4
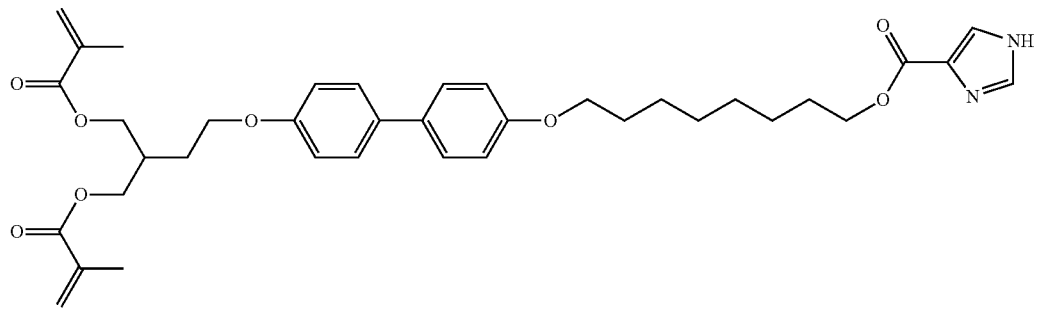
Chemical Formula SA 2-5
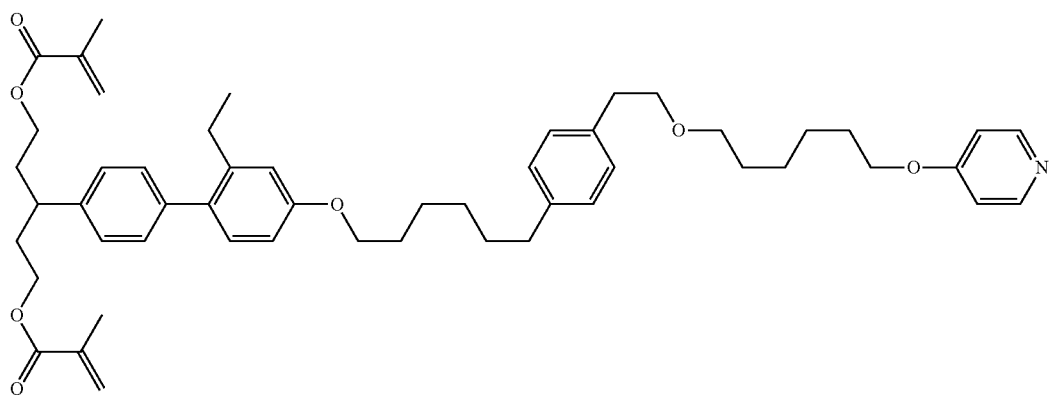
Chemical Formula SA 2-6
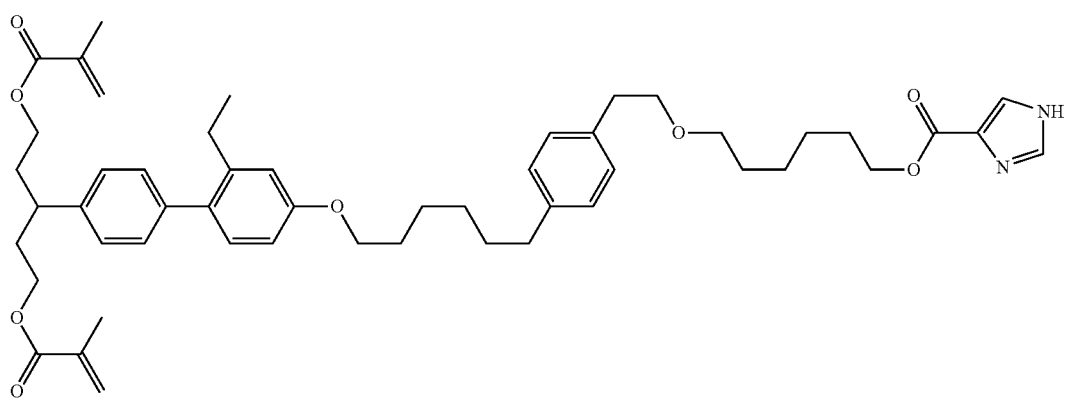
Chemical Formula SA 2-7
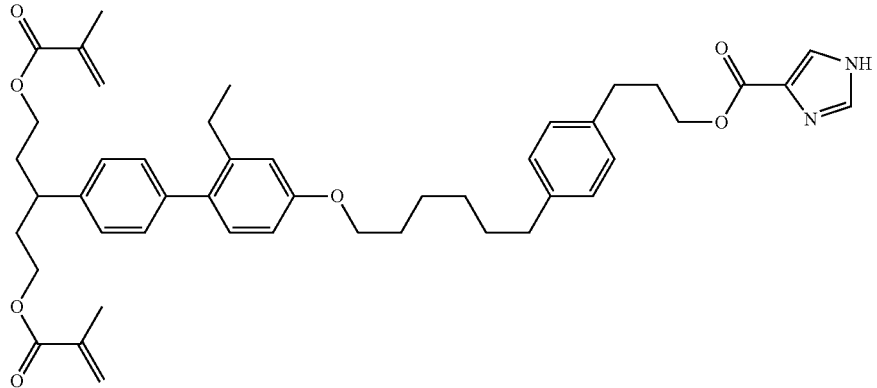

Chemical Formula SA 2-8
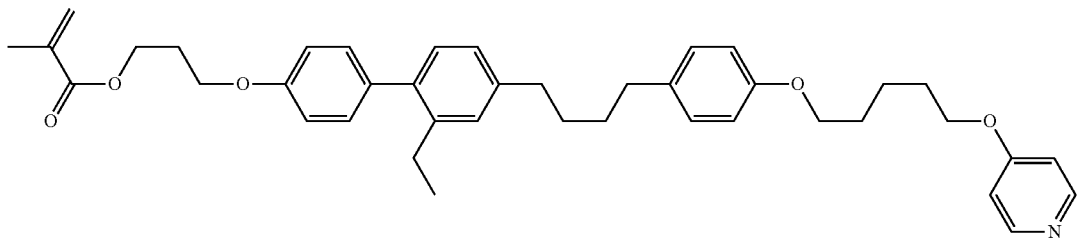
Chemical Formula SA 2-9
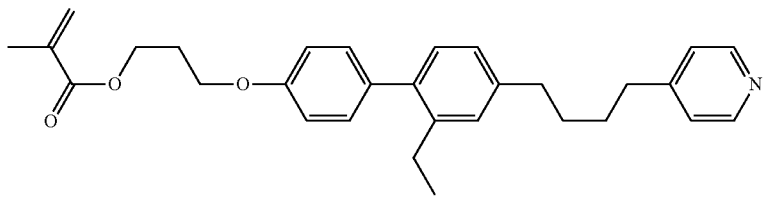
Chemical Formula SA 2-10
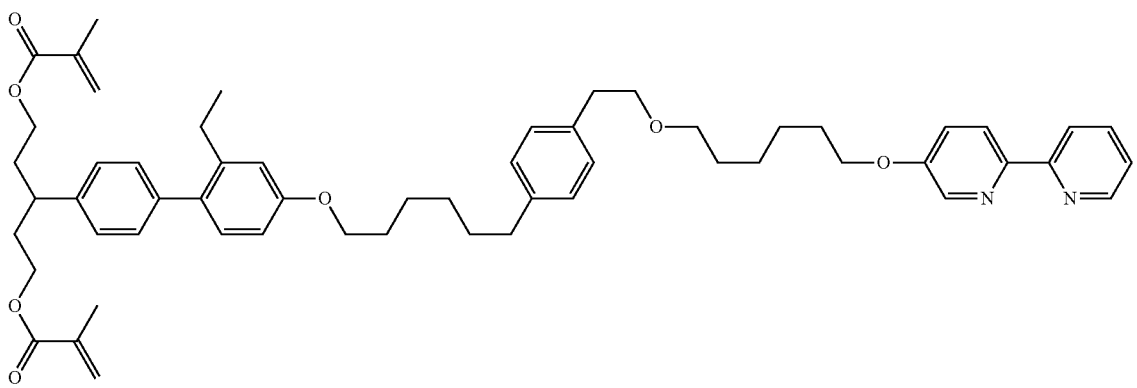
Chemical Formula SA 2-11
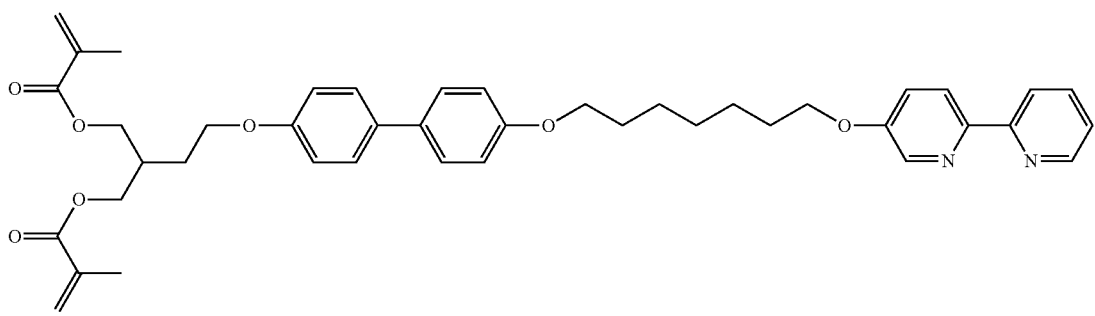
Chemical Formula SA 2-12
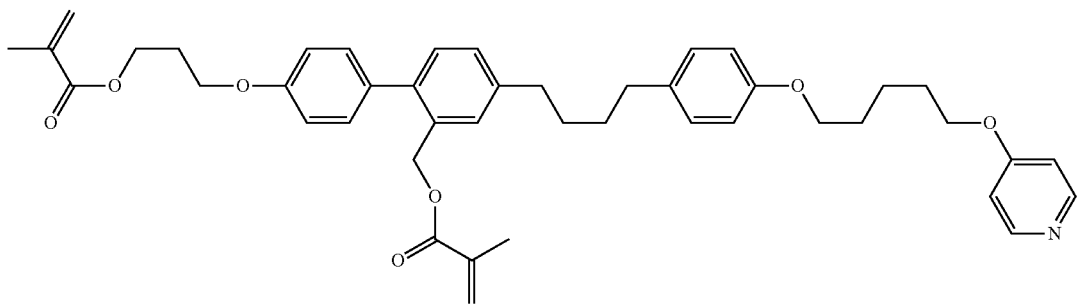

Chemical Formula SA 2-13

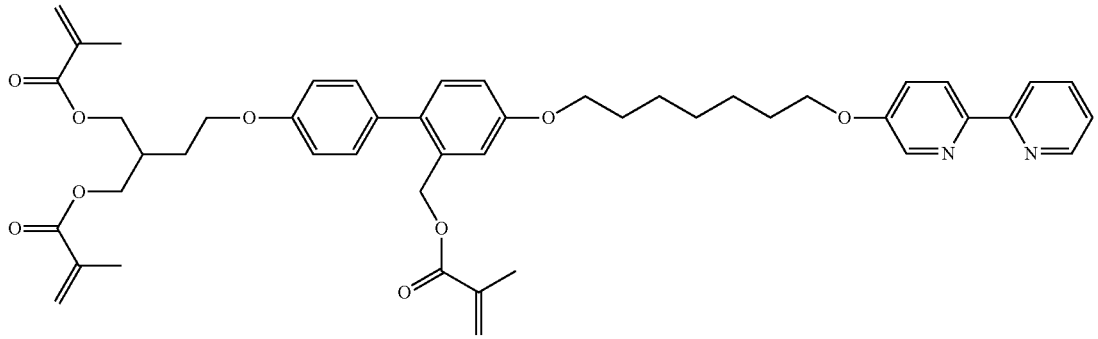

Chemical Formula SA 2-14

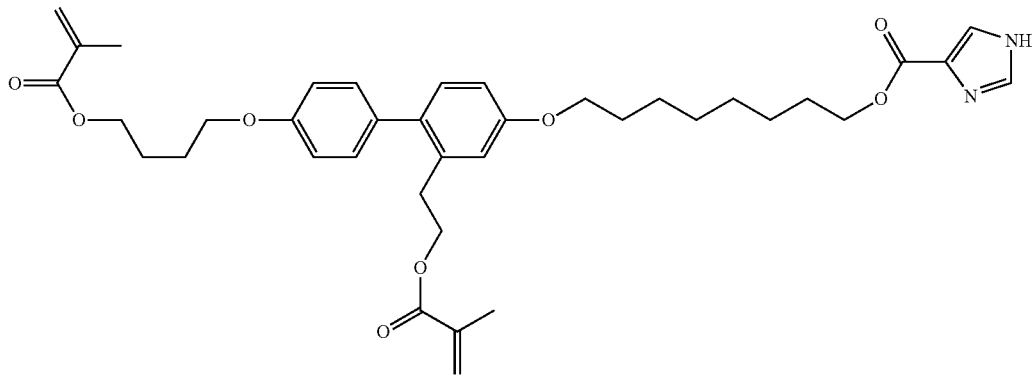

As described below, according to embodiments of the present disclosure, the following effects are noted.

The liquid crystal composition according to an embodiment of the present disclosure can be used in the method of manufacturing a liquid crystal display device, characterized by improved processability and productivity by omitting a conventional liquid crystal alignment film forming process (for example, coating, drying and sintering of an alignment solution), which is environmentally friendly and has minimal impact on the human body.

The liquid crystal display device according to an embodiment of the present disclosure can be characterized by improved processability and productivity by omitting a conventional liquid crystal alignment film forming process (for example, coating, drying and sintering of an alignment solution), which is environmentally friendly, and has minimal impact on the human body.

The method of manufacturing a liquid crystal display device according to another embodiment of the present disclosure can be characterized by improved processability and productivity by omitting a conventional liquid crystal alignment film forming process (for example, coating, drying and sintering of an alignment solution), which is environmentally friendly, and has minimal impact on the human body.

The effects of the present disclosure are not limited by the foregoing disclosure, and other various effects can be apparent to one of ordinary skill in the art.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
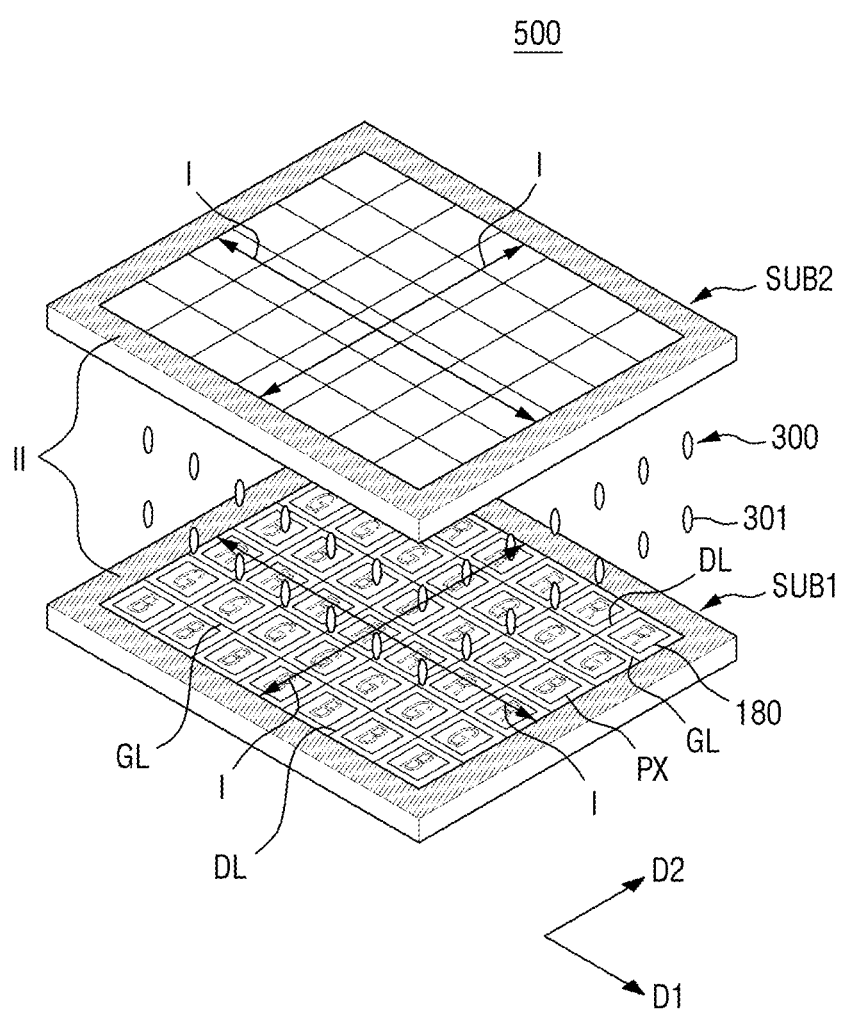
FIG. 1 is a schematic exploded perspective view of a liquid crystal display device according to an embodiment of the present disclosure.

Features of the inventive concept and methods of accomplishing the same may be understood more readily by reference to the following detailed description of exemplary embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the disclosure.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value."

As used herein, when a definition is not otherwise provided, the term "substituted" refers to a compound wherein at least one of hydrogen atoms thereof is substituted with a substituent selected from a $C_{1-30}$ alkyl group, a $C_{2-30}$ alkynyl group, a $C_{6-30}$ aryl group, a $C_{7-30}$ alkylaryl group, a $C_{1-30}$ alkoxy group, a $C_{1-30}$ heteroalkyl group, a $C_{3-30}$ heteroalkylaryl group, a $C_{3-30}$ cycloalkyl group, a $C_{3-15}$ cycloalkenyl group, a $C_{6-30}$ cycloalkynyl group, a $C_{2-30}$ heterocycloalkyl group, a halogen (—F, —Cl, —Br or —I), a hydroxy group (—OH), a nitro group (—NO$_2$), a cyano group (—CN), an amino group (—NRR', wherein R and R' are each independently hydrogen or a $C_{1-6}$ alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a $C_{1-6}$ alkyl group or a $C_{6-12}$ aryl group), a carboxylic acid group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

As used herein, when a definition is not otherwise provided, the term "hetero" refers to a group or fragment including 1 to 3 heteroatoms selected from N, O, S, Si, and P.

As used herein, when a definition is not otherwise provided, the term "alkyl group" refers to a group derived from a straight or branched chain saturated aliphatic hydrocarbon having the specified number of carbon atoms and having a valence of at least one.

As used herein, when specific definition is not otherwise provided, the term "(meth)acryloxyalkyl" refers to both "acryloxyalkyl" [CH$_2$=CH—C(=O)—O-alkyl-] and "methacryloxyalkyl" [CH$_2$=C(CH$_3$)—C(=O)—O-alkyl-] each having a specified number of carbon atoms in the alkyl group, wherein the term "alkyl" has the same meaning as described above.

As used herein, when a definition is not otherwise provided, the term "arylene group" refers to a functional group having a valence of at least two obtained by removal of two hydrogens in an aromatic ring, optionally substituted with one or more substituents where indicated, provided that the valence of the alkylene group is not exceeded.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_{6-30}$ arylene" refers to a $C_{6-30}$ arylene group substituted with a $C_{1-10}$ alkyl group, the total number of carbon atoms in the resulting alkyl substituted arylene group is $C_{7-40}$.

In the present specification, the "$C_{A-B}$" means that the number of carbon atoms is A to B. In the present specification, the symbol "*" is defined as a bonding site.

Hereinafter, preferred embodiments of the present disclosure will be described in detail with reference to the attached drawings.

Figure 2:
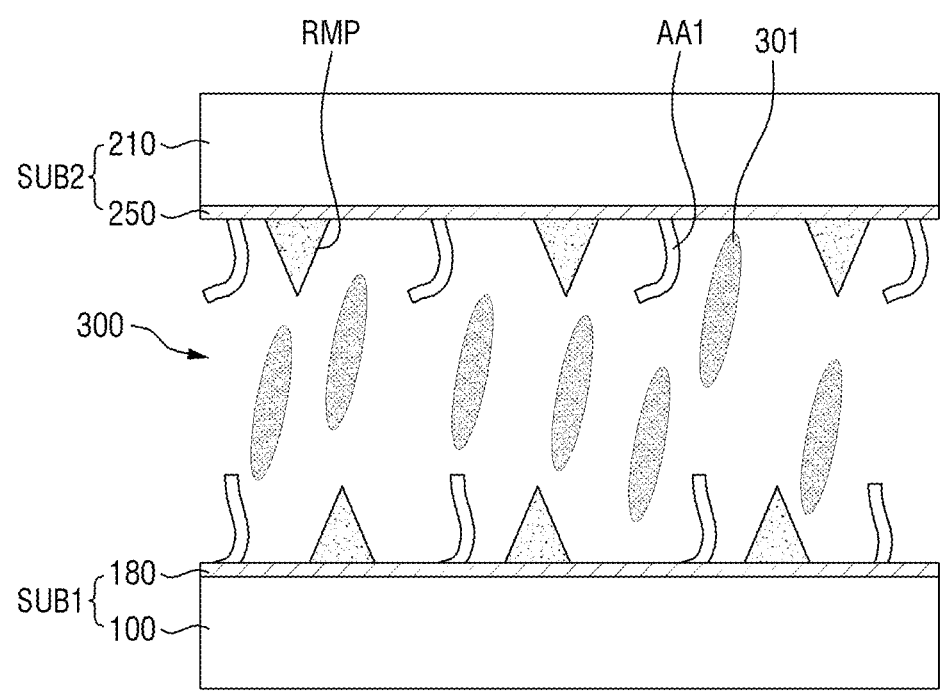
FIG. 2 is a schematic cross-sectional view of the liquid crystal display device of FIG. 1.

FIG. 1 is a schematic exploded perspective view of a liquid crystal display device 500 according to an embodiment of the present disclosure. FIG. 2 is a schematic cross-sectional view of the liquid crystal display device 500 of FIG. 1.

Referring to FIG. 1, the liquid crystal display device 500 may be configured to include: a display substrate SUB1; a counter display substrate SUB2 disposed to face the display substrate SUB1 and be spaced apart from the display substrate SUB1 while maintaining a predetermined distance; and a liquid crystal layer 300 disposed between the display substrate SUB1 and the counter display substrate SUB2. The liquid crystal layer 300 may include liquid crystal compounds 301, and the liquid crystal compounds 301 may have negative dielectric anisotropy.

The liquid crystal display device 500 includes a display area I and a non-display area II. The display area I is an area in which an image is displayed. The non-display area II is a peripheral area surrounding the display area I, and is an area in which an image is not displayed.

The display substrate SUB1 may include a plurality of gate lines GL extending in a first direction and a plurality of data line DL extending in a second direction perpendicular to the first direction. Although not shown in the drawings, the gate lines GL are not disposed only in the display area I, and may extend to the non-display area II. In this case, the non-display area II may be provided with a gate pad (not shown). That is, in the non-display area II, the display substrate SUB1 may include a gate pad (not shown). Further, the data lines DL are not disposed only in the display area I, and may extend to the non-display area II. In this case, the non-display area II may be provided with a data pad (not shown). That is, in the non-display area II, the display substrate SUB1 may include a data pad (not shown).

A plurality of pixels PX defined by the gate lines GL the data lines DL may be disposed in the display area I. The plurality of pixels PX may be arranged in the form of a matrix, and a pixel electrode 180 may be disposed for each of the pixels PX. In this case, in the display area I, the display substrate SUB1 may include the plurality of pixels PX arranged in the form of a matrix and the plurality of pixel electrodes 180 arranged in the form of a matrix.

In the non-display area II, a drive unit (not shown) for providing a gate drive signal and a data drive signal to each of the pixels PX may be disposed. In this case, in the non-display area II, the display substrate SUB1 may include a drive unit (not shown). The drive unit (not shown) may generate a gate drive signal and a data drive signal corresponding to a drive frequency of 120 Hertz (Hz) or more.

Referring to FIGS. 1 and 2, the display substrate SUB1 may be configured to include a switching element array substrate 100 and a first electrode 180. The switching element array substrate 100 may be configured to include a first base substrate (not shown) made of glass or a polymer and a switching element (not shown) disposed on the first base substrate. The switching element (not shown), for example, may be a thin film transistor. The counter display substrate SUB2 may be configured to include a second base substrate 210 made of glass or a polymer and a second electrode 250. The first electrode 180 generates an electric field together with the second electrode 250 to control the alignment direction of liquid crystal compounds 301 in the liquid crystal layer 300 disposed therebetween. The first electrode 180 may be a pattern electrode having at least one of a projection pattern and a slit pattern, or may be a patternless electrode. The second electrode may be the pattern electrode or the patternless electrode. In the liquid crystal display device 500, for example, the first electrode 180 may be the pattern electrode, and the second electrode 250 may the patternless electrode.

A first liquid crystal aligning agent AA1 containing at least one compound represented by Formula 1-1 below and reactive mesogen polymer projections (RMP) obtained by the polymerization of two or more of compounds represented by Formula 1-2 below may be adsorbed on the surface of at least one of the first electrode 180 and the second electrode 250. Here, the surface of at least one of the first electrode 180 and the second electrode 250 is defined as an interface between the liquid crystal layer 300 and at least one of the first electrode 180 and the second electrode 250.

Formula 1-1

$$[X'\!-\!]_{n_1}\!\!-\!L_1\!-\!C\!-\!]_m\!\!-\!L_2\!-\!]\!-\!R\!-\!L_3\!-\!]_{n_2}\!\!-\!Y$$

In Formula 1-1, X'—*, which is a functional group capable of substantially arranging liquid crystal compounds 301 in a direction perpendicular to the display substrate SUB1 and the counter display substrate SUB2, may be $C_{1-20}$-alkyl-*.

In Formula 1-1, *-$L_1$-*, which is a linking group, may be a single bond, *—$(CH_2)_{p1}$—*, *—$O(CH_2)_{p1}$—*, *—O—*,

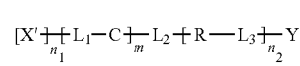

*—CH=CH—*, *—C≡C—*, or a combination thereof. p1 may be an integer of 1 to 10.

In Formula 1-1, *-$L_2$-*, which is a linking group, may be a single bond, *—$(CH_2)_{p2}$—*, *—$O(CH_2)_{p2}$—*, *—O—*,

*—CH=CH—*, *—C≡C—*, or a combination thereof. p2 may be an integer of 1 to 10.

In Formula 1-1, *-$L_3$-*, which is a linking group, may be a single bond, *—$(CH_2)_{p3}$—*, *—$O(CH_2)_{p3}$—*, *—O—*,

*—CH=CH—*, *—C≡C—*, or a combination thereof. p3 may be an integer of 1 to 10.

*-$L_1$-*, *-$L_2$-*, and *-$L_3$-* may be identical to or different from one another.

In Formula 1-1, *, which is a spacer for maintaining the length of the first liquid crystal aligning agent (AA1) in a long chain direction, may be *—$(CH_2)_q$—*, *—$O(CH_2)_q$—*, *—$(CH_2)_q$Arn-*, or *—$O(CH_2)_q$Arn-*. Arn may be a substituted or unsubstituted $C_{6-30}$ arylene, and q is an integer of 1 to 10. The substituted $C_{6-30}$ arylene is defined as a $C_{6-30}$ arylene in which at least one hydrogen group is substituted with $C_{1-10}$-alkyl-*, F—*, Br—*, I—*, *—OH, *—$NH_2$, or (meth)acryloxy-$C_{1-10}$-alkyl-*.

In Formula 1-1, $n_1$ may be an integer of 1 to 3, and $n_2$ and m may be each independently 0 or 1.

In Formula 1-1, *—C—*, which is a functional group for improving the miscibility with the liquid crystal compounds 301, is a substituted or unsubstituted cyclic linking group. In Formula 1-1, *—C—* may be selected from substituted or unsubstituted

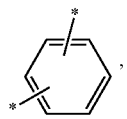

substituted or unsubstituted

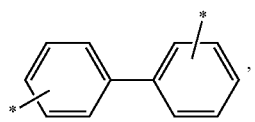

substituted or unsubstituted

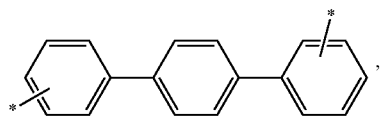

substituted or unsubstituted

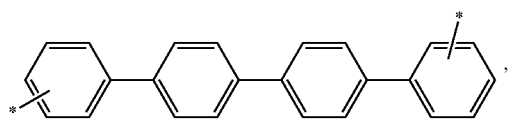

substituted or unsubstituted

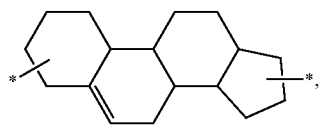

substituted or unsubstituted

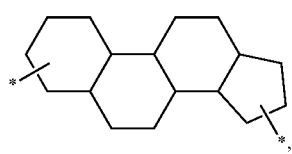

substituted or unsubstituted

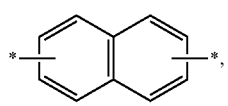

substituted or unsubstituted

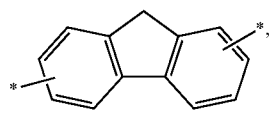

substituted or unsubstituted

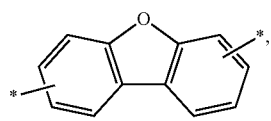

substituted or unsubstituted

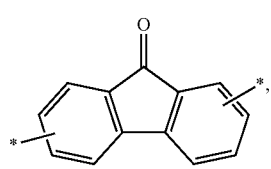

substituted or unsubstituted

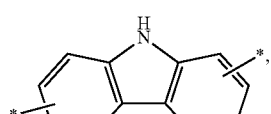

substituted or unsubstituted

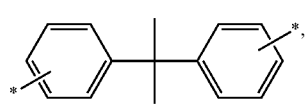

substituted or unsubstituted

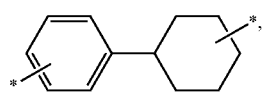

substituted or unsubstituted

substituted or unsubstituted

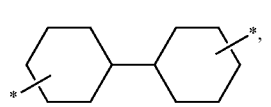

substituted or unsubstituted

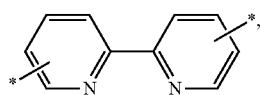

substituted or unsubstituted

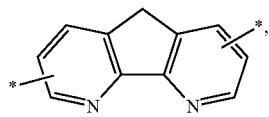

substituted or unsubstituted

substituted or unsubstituted

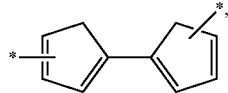

substituted or unsubstituted

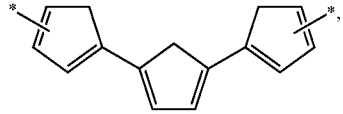

substituted or unsubstituted

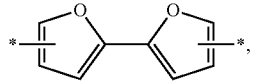

and substituted or unsubstituted

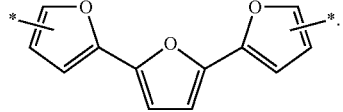

The substituted cyclic linking group is defined as a cyclic linking group in which at least one hydrogen group (H—*) is substituted with $C_{1-10}$-alkyl-*, F—*, Br—*, I—*, *—OH, *—$NH_2$, or (meth)acryloxy-$C_{1-10}$-alkyl-*.

In Formula 1-1, Y—*, which is a functional group for improving the adsorption of the first liquid crystal aligning agent to at least one of the first electrode 180 and the second electrode 250, may be

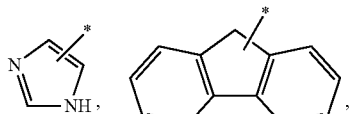

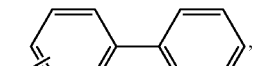

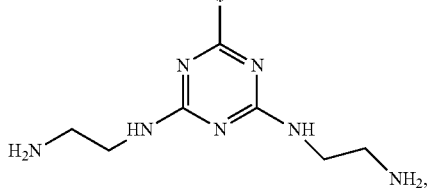

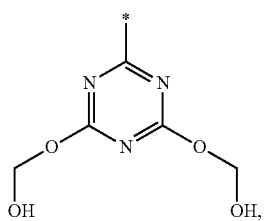

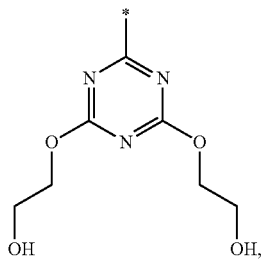

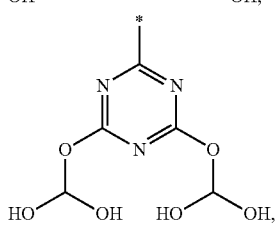

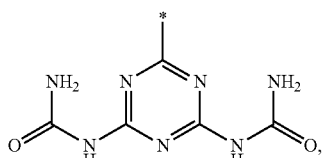

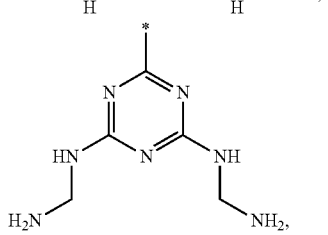

-continued

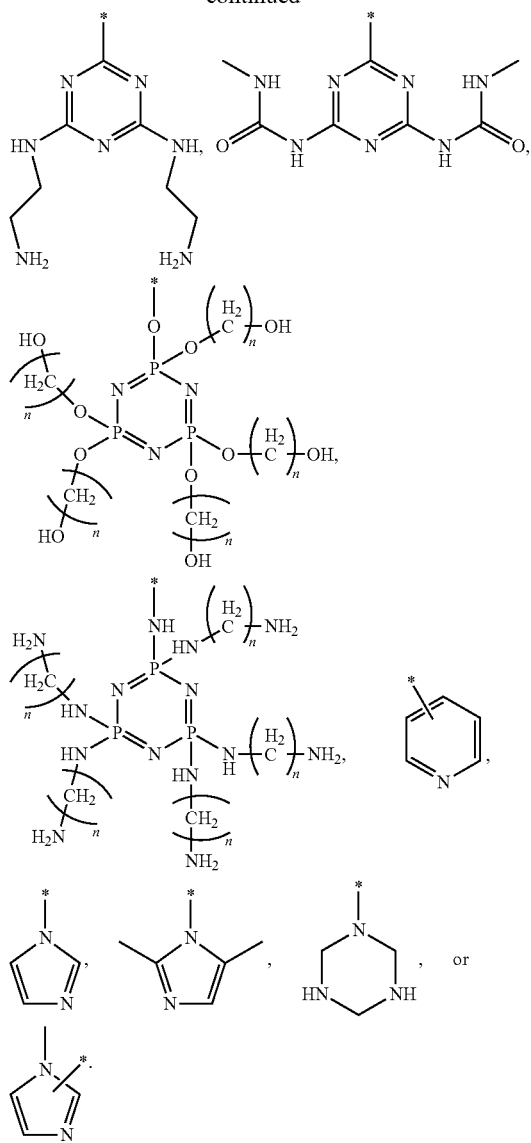

Here, n may be 0 to 5.

P1-SP1-MG-SP2-P2   Formula 2

In Formula 2, P1-* and P2-* are polymerizing groups of reactive mesogens, and may be each independently

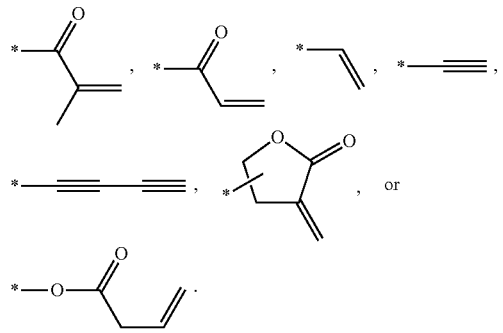

In Formula 2, *—SP1-*, which is a linking group, may be

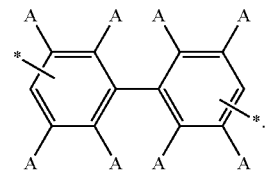

(wherein a may be 0 to 2), and *—SP2-*, which is a linking group, may be

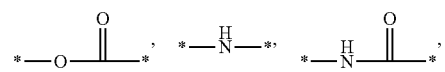

(wherein b may be 0 to 2). In Formula 2, *-MG-*, which is a functional group for improving the miscibility with the liquid crystal compounds 301, may be

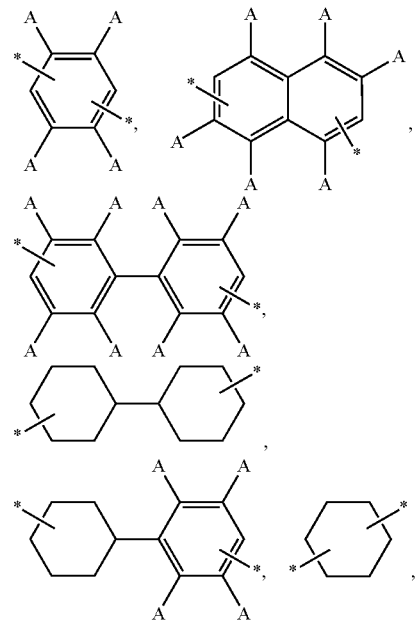

In each of *—SP1-* and *—SP2-*, *-L-* may be *—(CH$_2$)—*, *—O(CH$_2$)—*,

*—CH=CH—*, or *—C≡C—* (wherein c may be an integer of 1 to 10), and *—Z—* may be *—(CH$_2$)$_d$—* (wherein d may be an integer of 0 to 12). In each of *—SP1-* and *—SP2-*, *—Ar—*, which is a functional group for improving the miscibility with the liquid crystal compounds 301, may be -continued

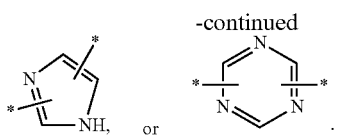

In each of *—SP1-*, *—SP2-* and *-MG-*, each A-* may be H—*, $C_{1-10}$-alkyl-*, F—*, Br—*, I—*, *—OH, *—$NH_2$, or CN—*.

The liquid crystal display device 500 can align the liquid crystal compounds 301 using the first liquid crystal aligning agents AA1 and the reactive mesogen polymer projections RMP. The first liquid crystal aligning agent particle AA1 can align the liquid crystal compounds 301 in a direction substantially perpendicular to at least one of the display substrate SUB1 and the counter display substrate SUB2, and the reactive mesogen polymer projections (RMP) can control and stabilize the pre-tilt angle of the liquid crystal compounds 301.

In the first liquid crystal aligning agent, Y—* includes a nitrogen-containing hetero ring. The nitrogen-containing hetero ring can improve the spreadability of the first crystal aligning agent molecules AA1 and the alignment stability of the liquid crystal compounds 301. The first liquid crystal aligning agents AA1 can be uniformly adsorbed on the first electrode 180 and the second electrode 250. Since the liquid crystal display device 500 includes the first liquid crystal aligning agent particle AA1, edge alignment and alignment stability of the liquid crystal compounds 301 can be improved, compared to an embodiment wherein Y—* in Formula 1-1 includes a linear hydroxyl group and a linear amine group as a liquid crystal aligning agent. Further, the nitrogen-containing hetero ring can improve the voltage holding ratio of the liquid crystal display device 500, compared to the linear hydroxyl group and the linear amine group.

The first liquid crystal aligning agent may contain at least one compound represented by Formulae SA 1-1 to SA 1-8 below.

Formula SA 1-1

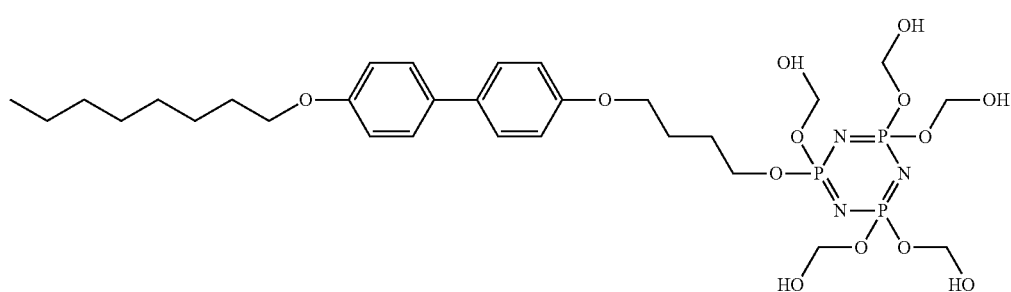

Formula SA 1-2

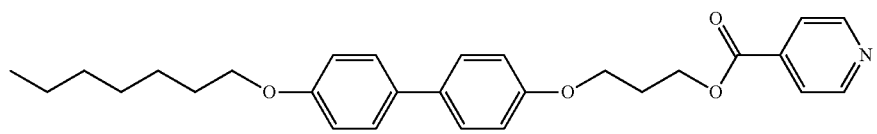

Formula SA 1-3

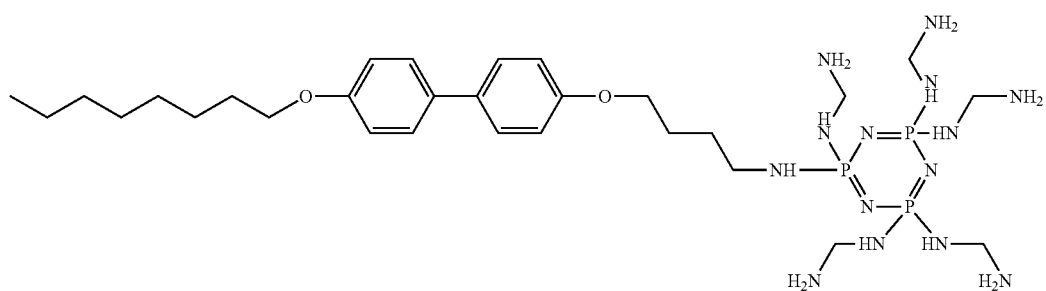

Formula SA 1-4

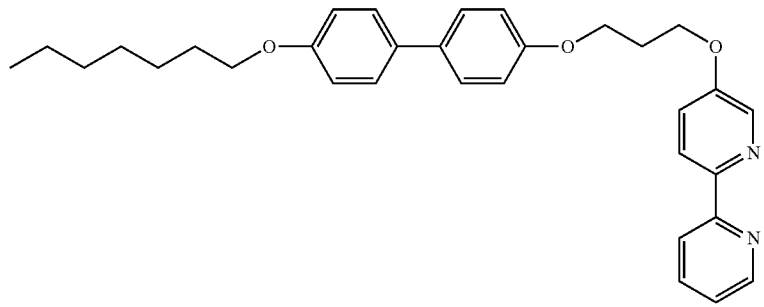

Formula SA 1-5

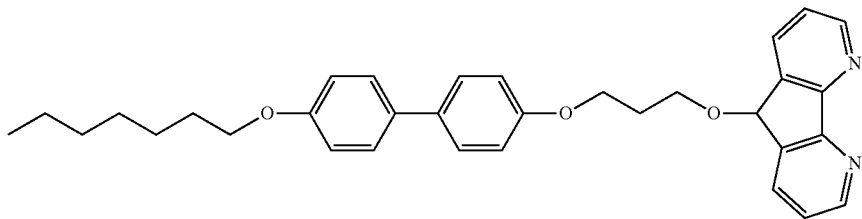

Formula SA 1-6

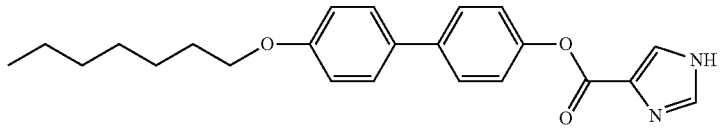

Formula SA 1-7

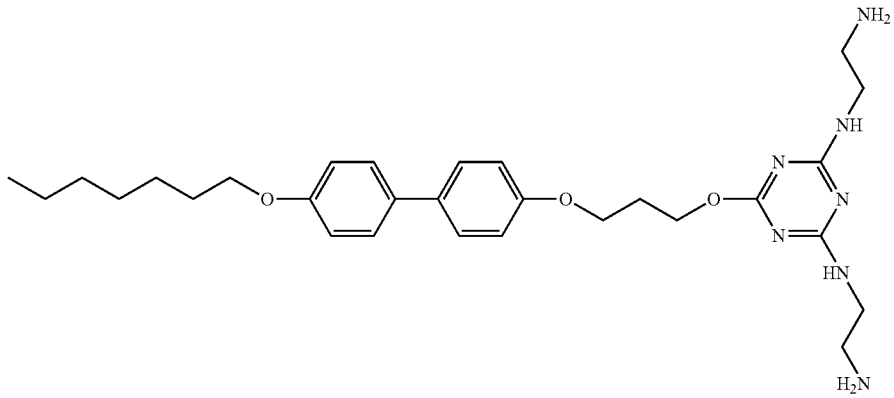

Formula SA 1-8

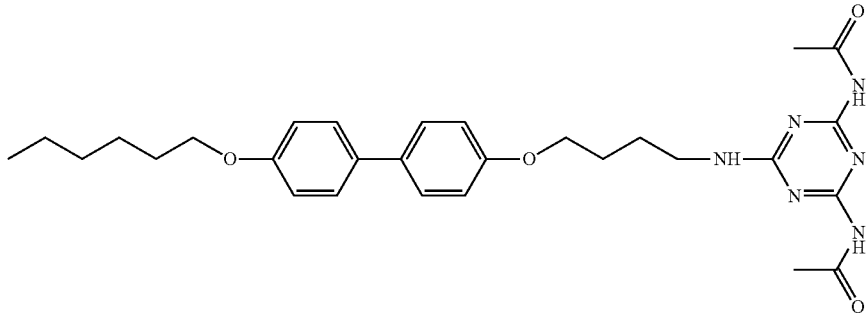

Although not shown in the drawings, the liquid crystal display device 500 may further include a color filter layer (not shown). The color filter layer (not shown) may be formed at the region corresponding to each pixel in the display area I, and may include a red color filter (R), a green color filter (G), and a blue color filter (B). The color filter layer (not shown) may be included in any one of the display substrate SUB1 and the counter display substrate SUB2. For example, when the display substrate SUB1 includes the color filter layer, the display substrate SUB1 may have a color filter on array (COA) structure in which a first base substrate (not shown), a switching element (not shown), and a color filter layer (not shown) are sequentially laminated in this order. In this case, the first electrode 180 may be disposed on the color filter layer (not shown). Further, for example, when the counter display substrate SUB2 includes the color filter layer, the counter display substrate SUB2 may have a structure in which a second base substrate (not shown), a color filter layer (not shown), and an overcoat layer are sequentially laminated in this order. The overcoat layer (not shown) may be a planarization layer covering the color filter (not shown). In this case, the second electrode 250 may be disposed on the overcoat layer (not shown).

Although not shown in the drawings, the liquid crystal display device 500 may further include a backlight assembly (not shown) disposed at the rear side of the display substrate SUB1 to provide light to the liquid crystal layer 300.

The backlight assembly (not shown), for example, may further include a light guide plate (not shown), light source (not shown), a reflective member (not shown), and an optical sheet (not shown).

The light guide plate (not shown) serves to change the pathway of light emitted from the light source toward the liquid crystal layer 300, and may include a light incoming surface provided to allow the light emitted from the light source (not shown) to be introduced, and a light outgoing surface provided to allow the light to be emitted toward the liquid crystal layer 300. The light guide plate may be made of a light-transmissive material, such as polymethylmethacrylate (PMMA) or polycarbonate (PC), which has a predetermined refractive index, but the present disclosure is not limited thereto. Since the light incoming upon one side or both sides of the light guide plate has an angle within the critical angle of the light guide plate, when the light is incident to the inside of the light guide plate and is incident to the upper surface or lower surface of the light guide plate, the incident angle of the light exceeds the critical angle of the light guide plate, and thus the incident light is evenly delivered inside the light guide plate without being emitted to the outside of the light guide plate. A scattering pattern may be formed on any one of the upper surface and lower surface of the light guide plate in order to emit the guided light over the light guide plate. That is, a scattering pattern may be printed on the one surface of the light guide plate with ink such that the light delivered inside the light guide plate is emitted over the light guide plate. Such a scattering pattern may be formed by ink printing, but the present disclosure is not limited thereto. The light guide plate may be provided with minute grooves or protrusions, and may be modified as needed.

The reflective member (not shown) serves to reflect the light emitted to the lower surface of the light guide plate, that is, the surface facing the light outgoing surface, so as to supply the reflected light to the light guide plate. The reflective member may be made in the form of a film, but the present disclosure is not limited thereto.

The light source (not shown) may be disposed to face the light incoming surface of the light guide plate. The number of light sources can be appropriately changed as needed. For example, one light source may be provided at only one side of the light guide plate, and three or more light sources may also be provided corresponding to three or more sides of four sides of the light guide plate. Meanwhile, a plurality of light sources may also be provided to correspond to any one of sides of the light guide plate. As described above, there has been exemplified a side-light type backlight assembly in which light sources are located at the sides of the light guide plate. However, in addition to this backlight assembly, a direct type backlight assembly, a planar light source type backlight assembly, and the like are exemplified according to the configuration of backlight. As the light source, a white light-emitting diode (LED) emitting white light, or a plurality of light-emitting diodes emitting red light, green light, and blue light may be used. In the case where the plurality of light sources is composed of light-emitting diodes emitting red light, green light, and blue light, when these light-emitting diodes turn on at once, white light can be realized by color mixing.

Figure 3A:
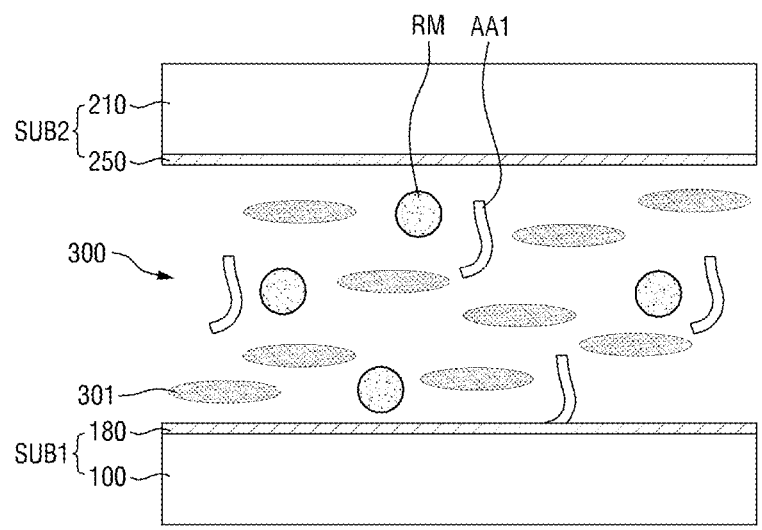
FIGS. 3A, 3B, and 3C are schematic cross-sectional views showing a method of manufacturing the liquid crystal display device of FIG. 1.
Figure 3B:
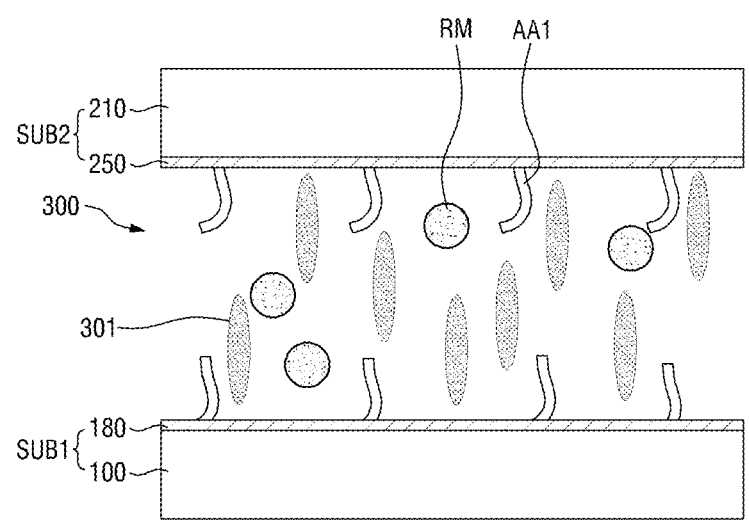
Figure 3C:
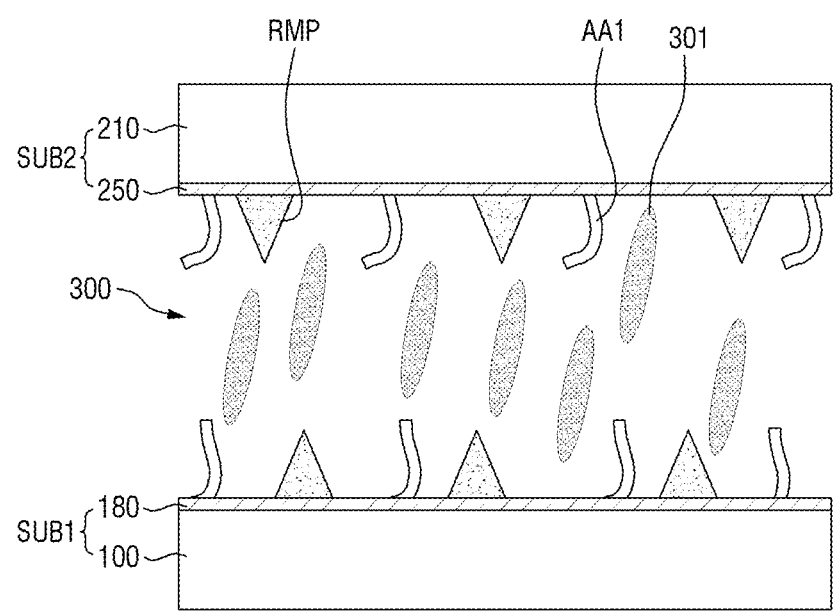

FIGS. 3A, 3B, and 3C are schematic cross-sectional views showing a process of manufacturing the liquid crystal display device 500 of FIG. 1.

Referring to FIGS. 3A and 3B, a liquid crystal composition including liquid crystal compounds 301, first liquid crystal aligning agents AA1, and reactive mesogens RM is injected or dropped between the display substrate SUB1 and the counter display substrate SUB2, so as to form a liquid crystal layer 300. Since the first liquid crystal aligning agents AA1, and the reactive mesogens RM have been described above, detailed descriptions thereof will be omitted.

For example, the liquid crystal compounds 301 may be negative liquid crystal compounds having negative dielectric anisotropy. In the early stage in which the liquid crystal composition is injected or dropped between the display substrate SUB1 and the counter display substrate SUB2, the liquid crystal compounds 301 may be aligned in a direction substantially horizontal to the display substrate SUB1 and the counter display substrate SUB2. When a predetermined period of time have passed after the liquid crystal composition was injected or dropped between the display substrate SUB1 and the counter display substrate SUB2, the first liquid crystal aligning agents AA1 may be adsorbed on one side of the first electrode 180 and one side of the second electrode 250 to be self-aligned. At this time, the liquid crystal compounds 301 may be aligned in a direction substantially perpendicular to the display substrate SUB1 and the counter display substrate SUB2.

Referring to FIGS. 3B and 3C, when a liquid crystal cell, in which the liquid crystal layer 300 is disposed between the display substrate SUB1 and the counter display substrate SUB2, is irradiated with ultraviolet rays in a state where a voltage is applied to the liquid crystal cell, the liquid crystal compounds 301 are aligned in a direction in which a major axis is perpendicular to an electric field, reactive mesogens RM are photo-polymerized to form reactive mesogen polymer projections RMP, and the reactive mesogen polymer projections are adsorbed on one side of the first electrode 180 and one side of the second electrode 250 to provide a pre-tilt to the liquid crystal compounds 301 and stabilize these liquid crystal compounds 301. Therefore, even when the voltage applied to the liquid crystal cell is released, the liquid crystal compounds 301 can be maintained in a pre-tilted state.

Referring to FIG. 2 and FIGS. 3A, 3B, and 3C, the method of manufacturing the liquid crystal display device 500 does not require a conventional liquid crystal alignment film forming process (for example, coating, drying and sintering of an alignment solution). That is, in the method of manufacturing the liquid crystal display device 500, a conventional liquid crystal alignment film forming process can be omitted because both the liquid crystal compounds 301 and the first liquid crystal aligning agents AA1 for aligning the liquid crystal compounds 301 are injected or dropped between the display substrate SUB1 and the counter display substrate SUB2 in the process of forming the liquid crystal layer 300. Therefore, the method of manufacturing the liquid crystal display device 500 can improve productivity or processability. Further, since the method of manufacturing the liquid crystal display device 500 does not use an organic solvent harmful to environment, this method is environmentally friendly, and can improve safety for workers. Moreover, since the method of manufacturing the liquid crystal display device 500 does not require a high-temperature sintering process, this method is advantageous in that it is easy to manufacture a liquid crystal display device using a flexible organic polymer substrate having many problems in a high-temperature process.

Meanwhile, the reactive mesogen polymer projections RMP can be formed in various forms depending on the content of the reactive mesogens RM, photo-polymerization conditions, or the like.

Figure 4A:
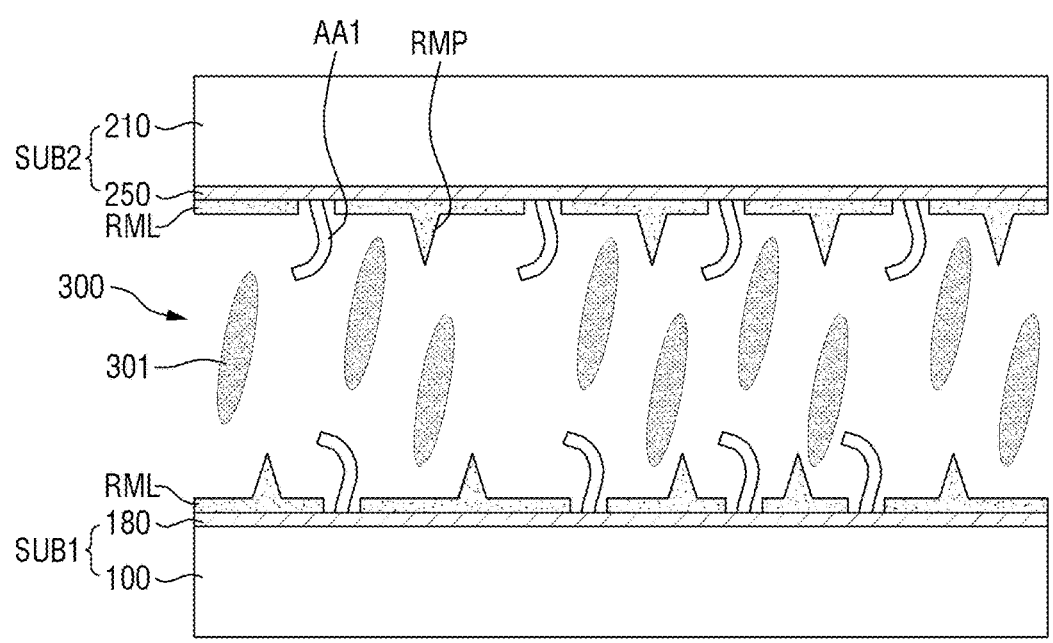
FIGS. 4A and 4B are schematic cross-sectional views showing the modified embodiments of the liquid crystal display device of FIG. 1.
Figure 4B:
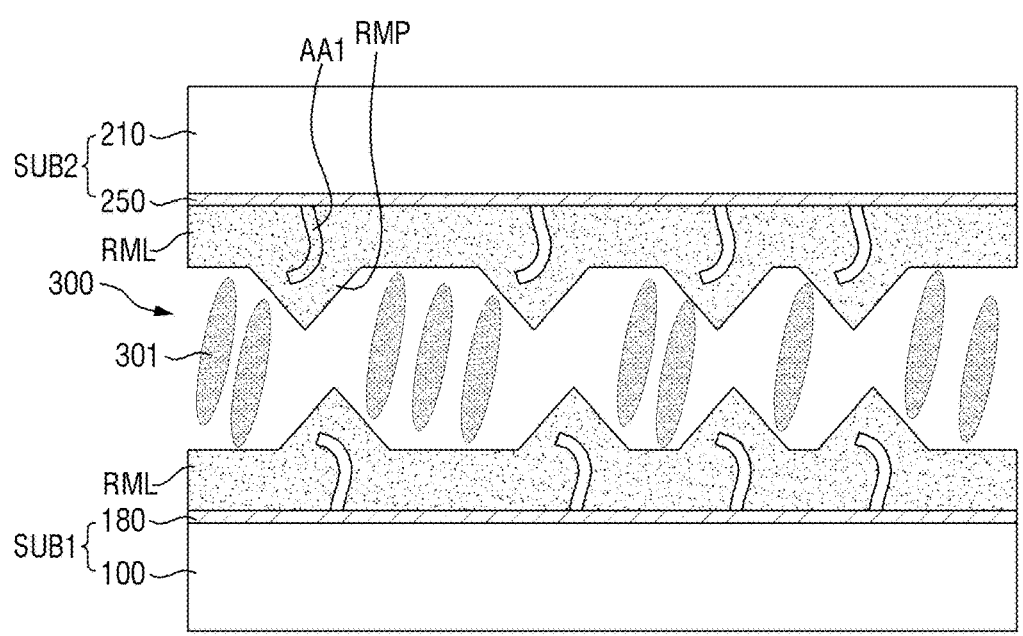

FIGS. 4A and 4B are schematic cross-sectional views showing the modified embodiments of the liquid crystal display device 500 of FIG. 2. Hereinafter, differences of liquid crystal display devices 500, 500-1, and 500-2 will be described with reference to FIG. 2 and FIGS. 4A and 4B.

The liquid crystal display device 500-1 may be configured such that a reactive mesogen polymer layer RML is further formed around reactive mesogen polymer projections RMP. The reactive mesogen polymer projections RMP are formed to protrude from the reactive mesogen polymer layer RML. At this point, the liquid crystal display device 500-1 is different from the liquid crystal display device 500. The liquid crystal display device 500-2 is configured such that first liquid crystal aligning agents AA1 are covered with a reactive mesogen polymer layer RML and reactive mesogen polymer projections RMP protruding from the reactive mesogen polymer layer RML. At this point, the liquid crystal display device 500-2 is different from the liquid crystal display device 500.

Figure 5:
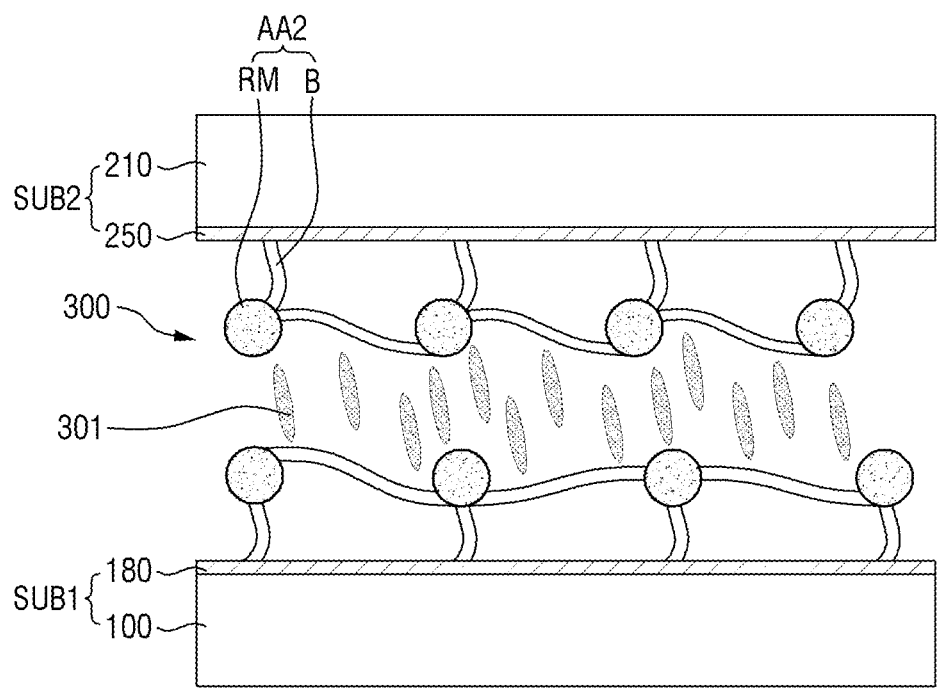
FIG. 5 is a schematic cross-sectional view of a liquid crystal display device according to another embodiment of the present disclosure.

FIG. 5 is a schematic cross-sectional view of a liquid crystal display device 501 according to another embodiment of the present disclosure.

Referring to FIG. 5, the liquid crystal display device 501 can align liquid crystal compounds using the polymers of two or more second liquid crystal aligning agents AA2 represented by Formula 1-2 below. The polymers of the second liquid crystal aligning agents AA2 represented by Formula 1-2 below may be adsorbed on the surface of at least one of the first electrode 180 and the second electrode 250.

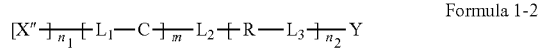

Formula 1-2

In Formula 1-2, X″—*, which is a polymerizing group of the second liquid crystal aligning agents AA2, may be

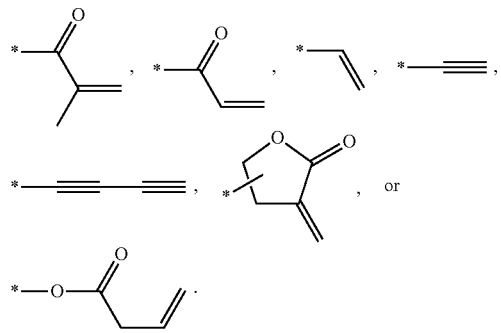

In Formula 1-2, *-$L_1$-*, which is a linking group, may be a single bond, *—$(CH_2)_{p1}$—*, *—$O(CH_2)_{p1}$—*, *—O—*,

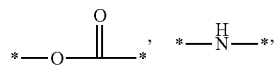

*—CH=CH—*, *—C≡C—*, or a combination thereof. Here, p1 may be an integer of 1 to 10.

In Formula 1-2, *-$L_2$-*, which is a linking group, may be a single bond, *—$(CH_2)_{p2}$—*, *—$O(CH_2)_{p2}$—*, *—O—*,

*—CH=CH—*, *—C≡C—*, or a combination thereof. Here, p2 may be an integer of 1 to 10.

In Formula 1-2, *-$L_3$-*, which is a linking group, may be a single bond, *—$(CH_2)_{p3}$—*, *—$O(CH_2)_{p3}$—*, *—O—*,

*—CH=CH—*, *—C≡C—*, or a combination thereof. Here, p3 may be an integer of 1 to 10.

*-$L_1$-*, *-$L_2$-*, and *-$L_3$-* may be identical to or different from one another.

In Formula 1-2, *—R—*, which is a spacer for maintaining the length of the second liquid crystal aligning agents AA2 in a long chain direction, may be *—$(CH_2)_q$—*, *—$O(CH_2)_q$—*, *—$(CH_2)_q$Arn-*, or *—$O(CH_2)_q$Arn-*. Arn may be a substituted or unsubstituted $C_{6-30}$ arylene, and q is an integer of 1 to 10. The substituted $C_{6-30}$ arylene is defined as an arylene in which at least one hydrogen group is substituted with $C_{1-10}$-alkyl-*, F—*, Br—*, I—*, *—OH, *—$NH_2$, or (meth)acryloxy-$C_{1-10}$-alkyl-*. In Formula 1-2, $n_1$ may be an integer of 1 to 3, and $n_2$ and m may each independently 0 or 1.

In Formula 1-2, *—C—*, which is a functional group for improving the miscibility with the liquid crystal compounds 301, is a substituted or unsubstituted cyclic linking group. In Formula 1-2, *—C—* may be selected from substituted or unsubstituted

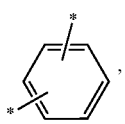

substituted or unsubstituted

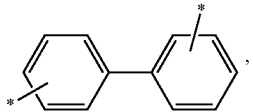

substituted or unsubstituted

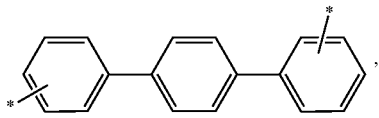

substituted or unsubstituted

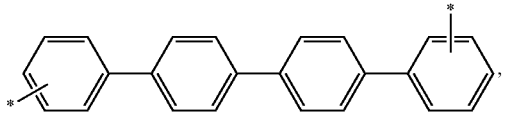

substituted or unsubstituted

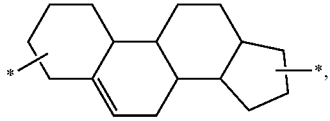

substituted or unsubstituted

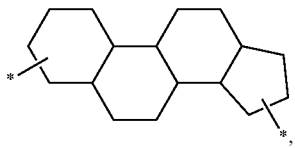

substituted or unsubstituted

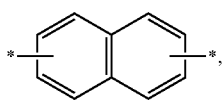

substituted or unsubstituted

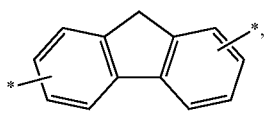

substituted or unsubstituted

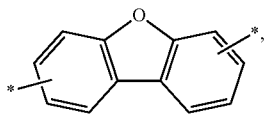

substituted or unsubstituted

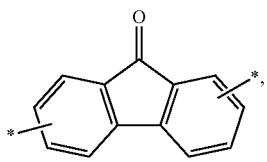

substituted or unsubstituted

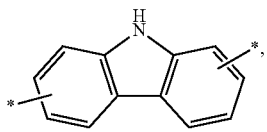

substituted or unsubstituted

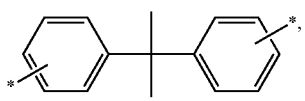

substituted or unsubstituted

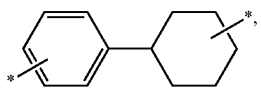

substituted or unsubstituted

substituted or unsubstituted

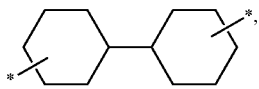

substituted or unsubstituted

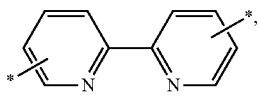

substituted or unsubstituted

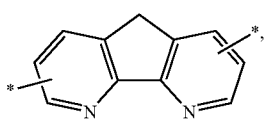

substituted or unsubstituted

substituted or unsubstituted

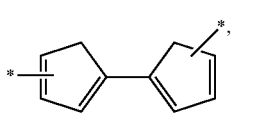

substituted or unsubstituted

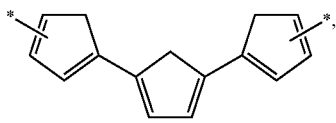

substituted or unsubstituted

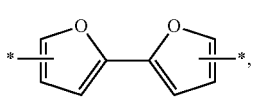

and substituted or unsubstituted

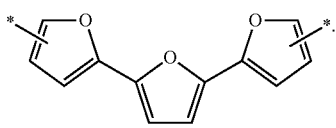

The substituted cyclic linking group is defined as a cyclic linking group in which at least one hydrogen group (H—*) is substituted with $C_{1-10}$-alkyl-*, F—*, Br—*, I—*, *—OH, *—$NH_2$, or (meth)acryloxy-$C_{1-10}$-alkyl-*.

In Formula 1-2, Y—*, which is a functional group for improving the adsorption of the second liquid crystal aligning agents AA2 to at least one of the first electrode 180 and the second electrode 250, may be

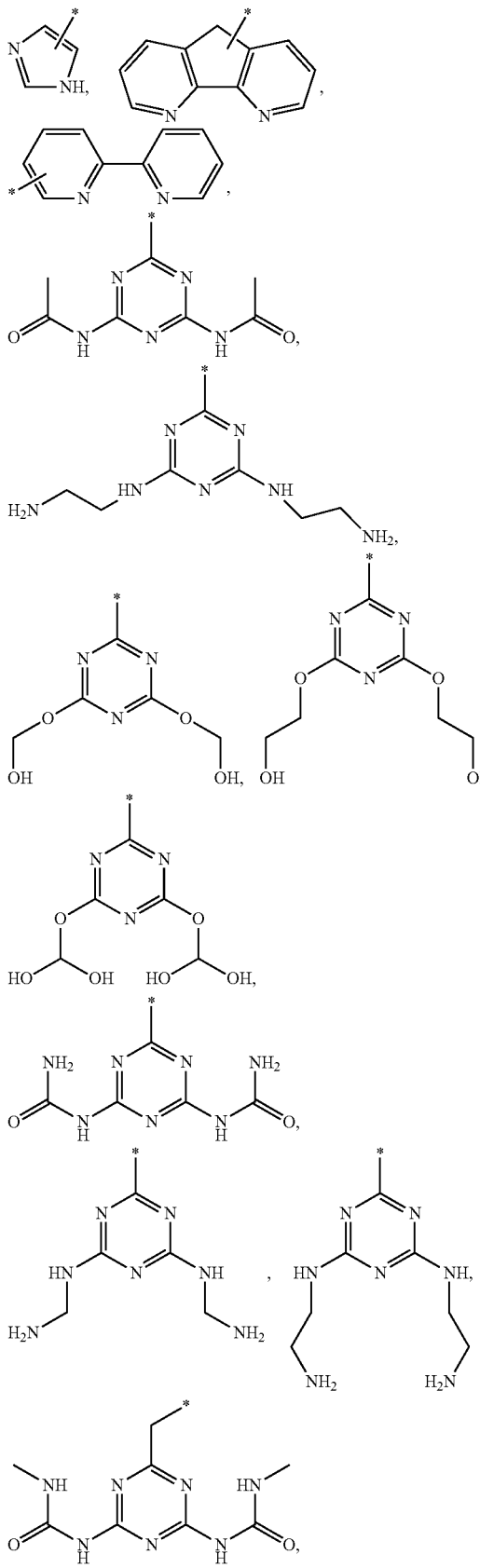

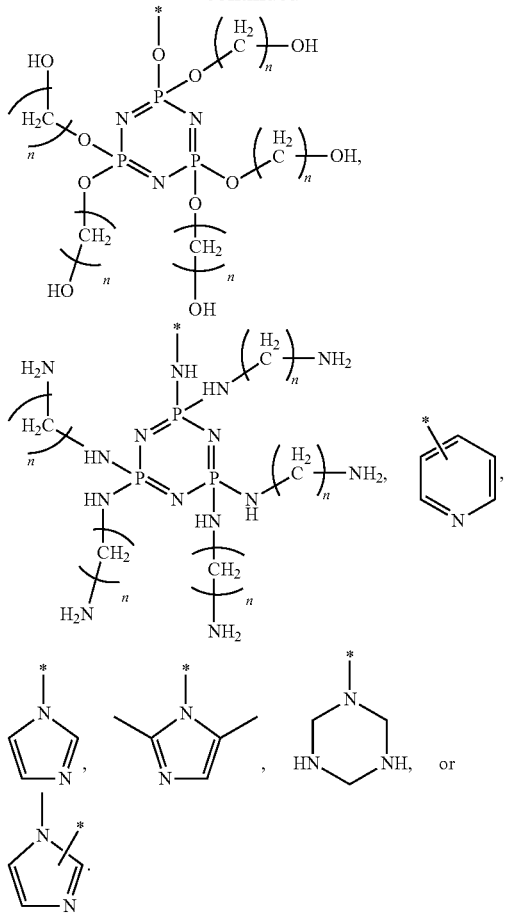

Here, n may be 0 to 5.

The polymers of the second liquid crystal aligning agents AA2 are configured to include vertical aligning groups B for aligning the liquid crystal compounds 301 in a direction substantially perpendicular to at least one of the display substrate SUB1 and the counter display substrate SUB2, and photopolymerization reaction groups RM as functional groups that can be photo-polymerized by ultraviolet rays. The photopolymerization reaction groups RM are polymerized to form a polymer network for controlling and stabilizing the pre-tilt angle of the liquid crystal compounds 301.

In the second liquid crystal aligning agent, Y—* includes a nitrogen-containing hetero ring. The nitrogen-containing hetero ring can improve the spreadability of the second crystal aligning agent molecules AA2 and the alignment stability of the liquid crystal compounds 301. The second liquid crystal aligning agents AA2 can be uniformly adsorbed in the first electrode 180 and the second electrode 250. Since the liquid crystal display device 501 includes the second liquid crystal aligning agents AA2, edge alignment and alignment stability of the liquid crystal compounds 301 can be improved, compared to an embodiment wherein Y—* in Formula 1-2 includes a linear hydroxyl group and a linear amine group as a liquid crystal aligning agent. Further, the nitrogen-containing hetero ring can improve the voltage holding ratio of the liquid crystal display device 501, compared to the linear hydroxyl group and the linear amine group.

The second liquid crystal aligning agent may contain at least one compound represented by Formulae SA 2-1 to SA 2-14 below.

Formula SA 2-1
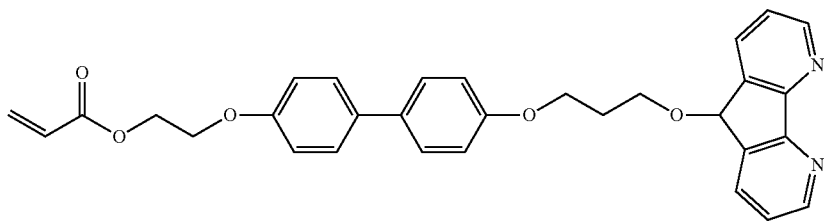
Formula SA 2-2
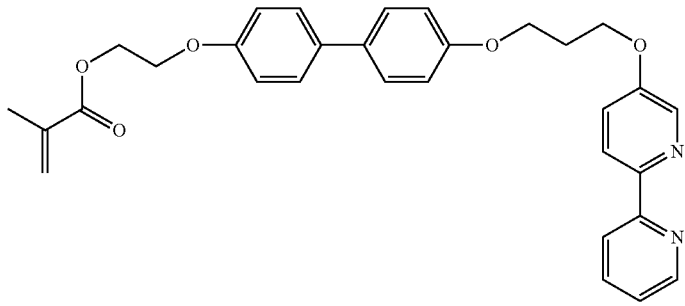
Formula SA 2-3
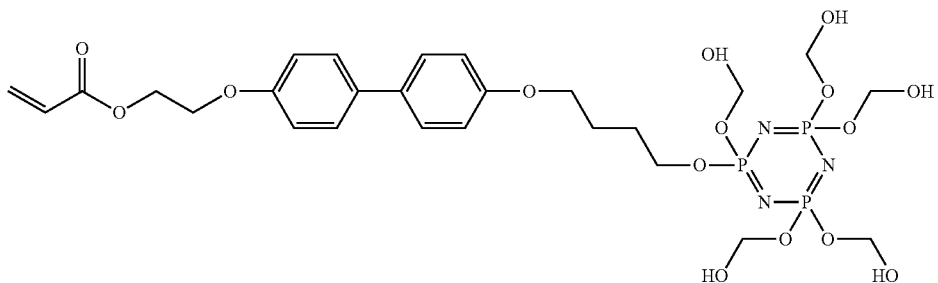
Formula SA 2-4
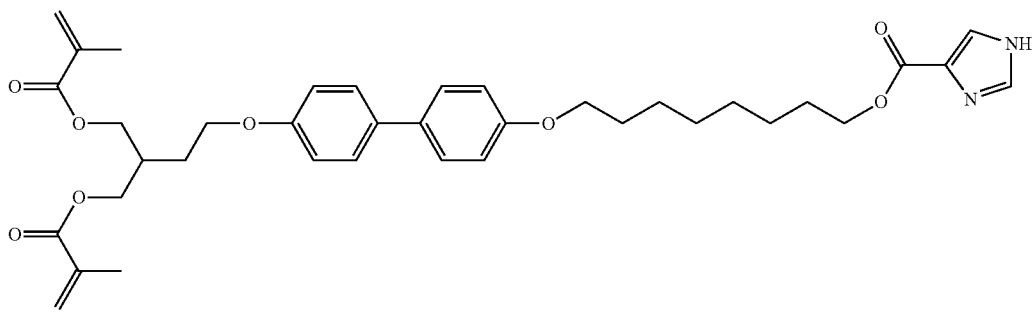
Formula SA 2-5
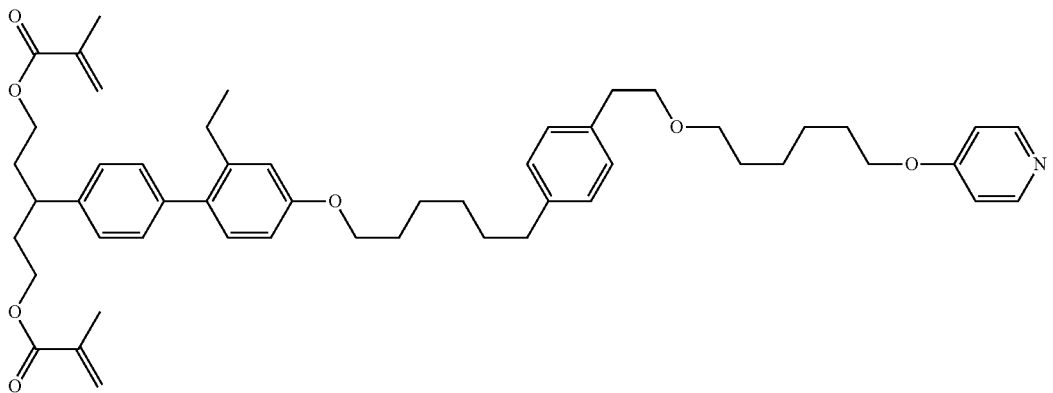

-continued
Formula SA 2-6
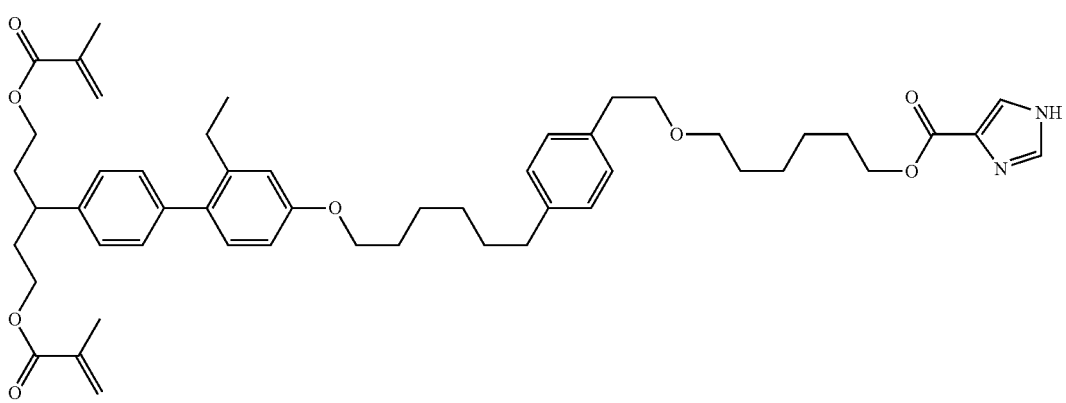
Formula SA 2-7
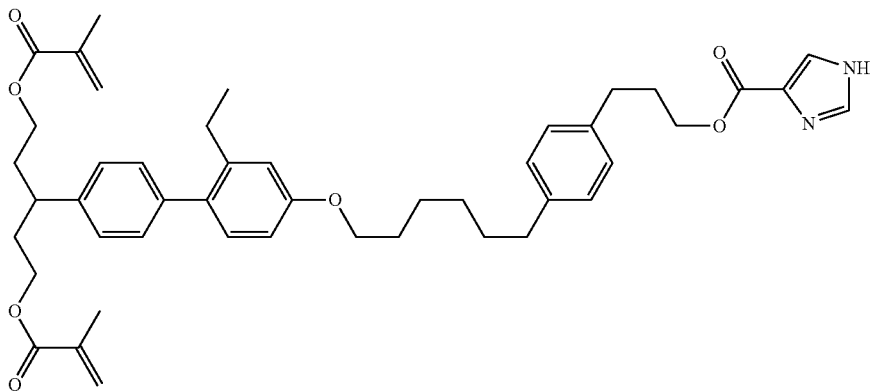
Formula SA 2-8
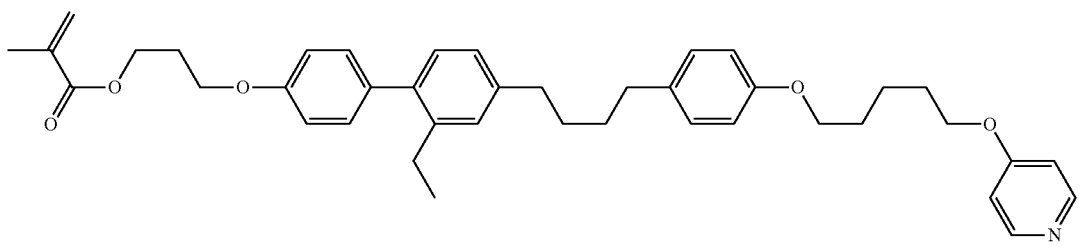
Formula SA 2-9
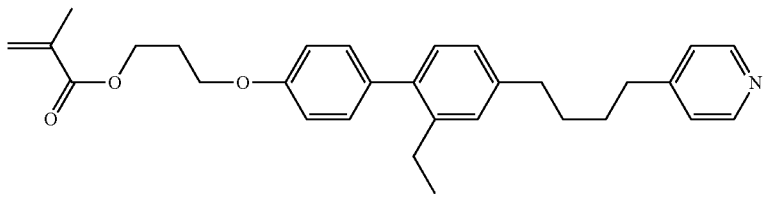

Formula SA 2-10
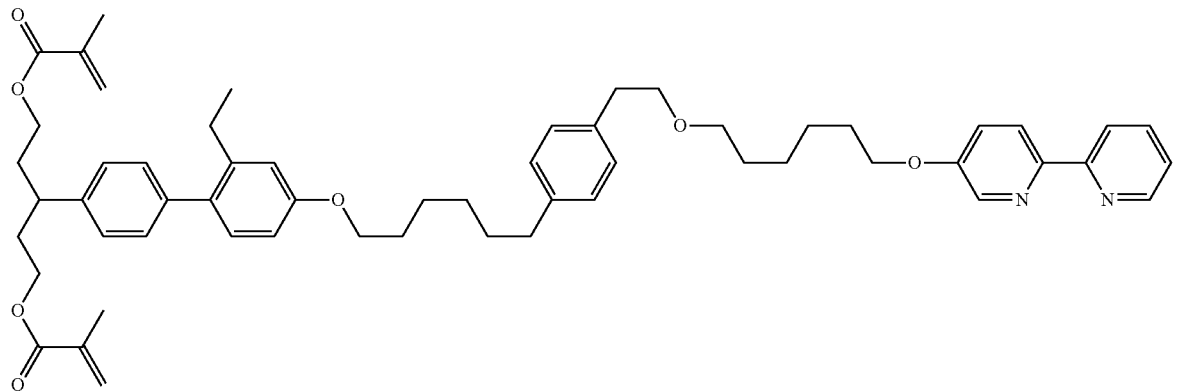
Formula SA 2-11
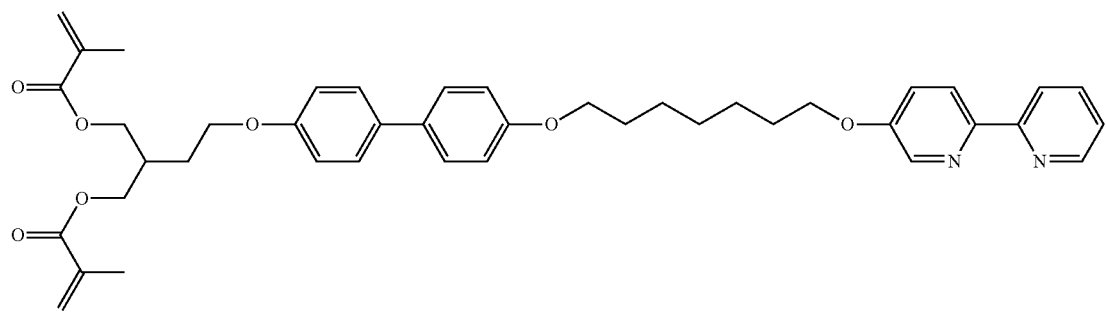
Formula SA 2-12
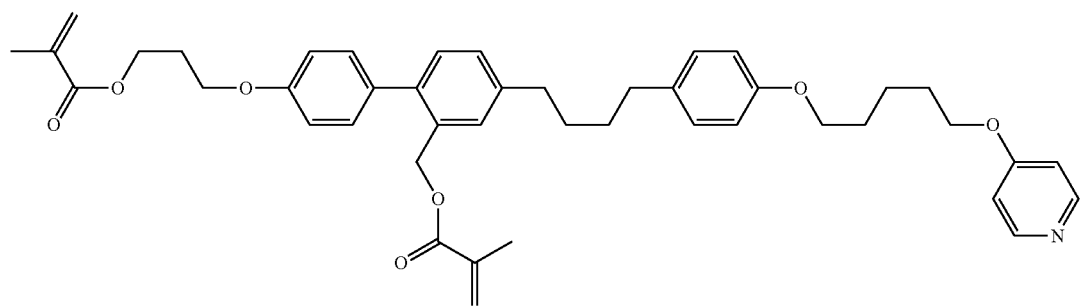
Formula SA 2-13
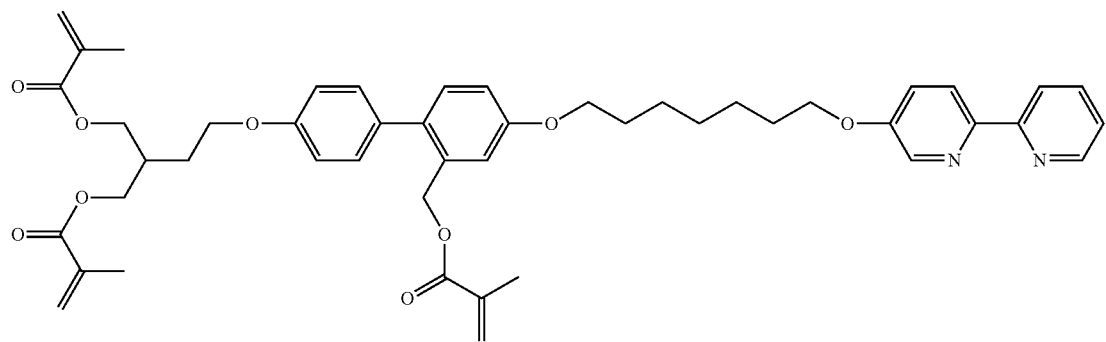

-continued

Formula SA 2-14

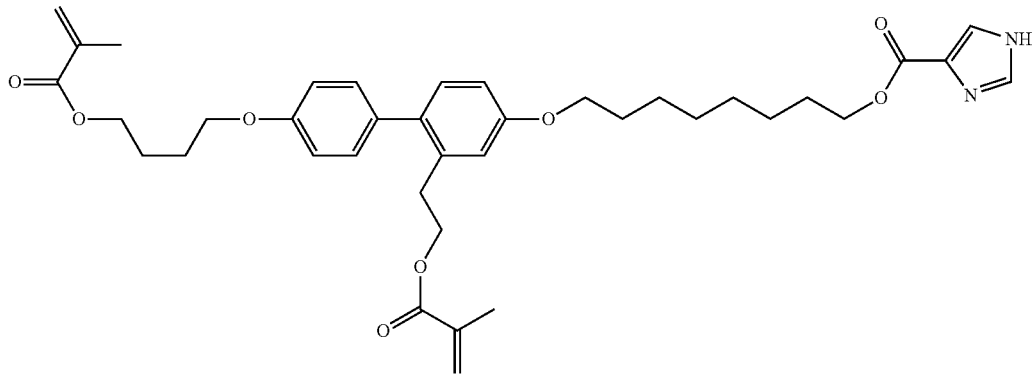

Figure 6A:
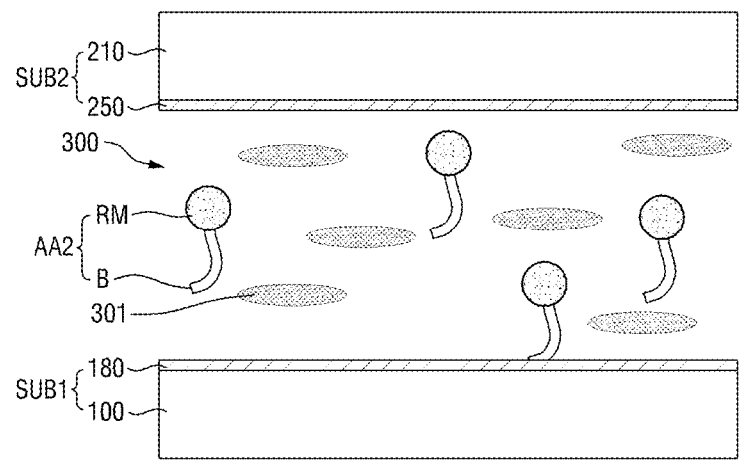
FIGS. 6A, 6B, and 6C are schematic cross-sectional views showing a method of manufacturing the liquid crystal display device of FIG. 5.
Figure 6B:
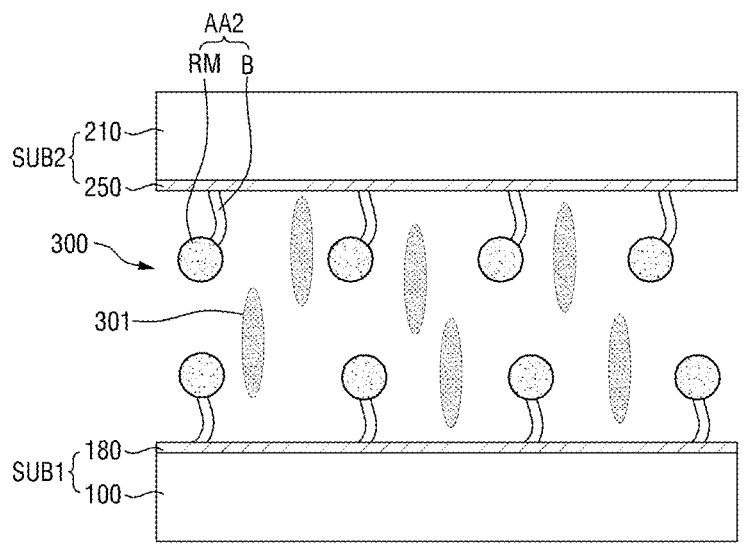
Figure 6C:
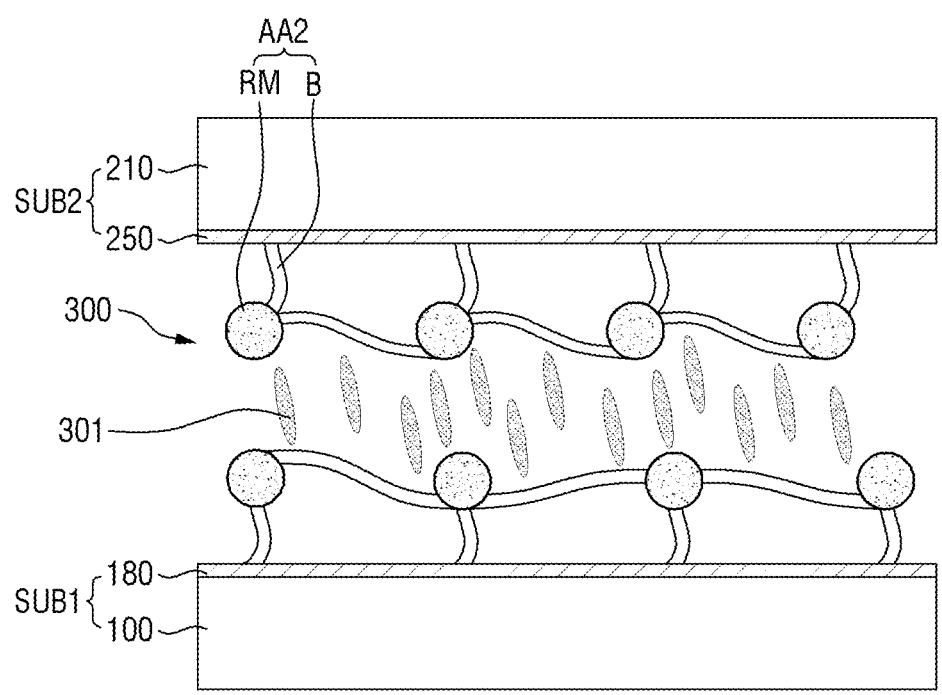

FIGS. 6A, 6B, and 6C are schematic cross-sectional views showing a process of manufacturing the liquid crystal display device 501 of FIG. 5.

Referring to FIGS. 6A and 6B, a liquid crystal composition including liquid crystal compounds 301 and second liquid crystal aligning agents AA2 is disposed, for example, injected or dropped, between the display substrate SUB1 and the counter display substrate SUB2, so as to form a liquid crystal layer 300. Since the second liquid crystal aligning agents AA2 have been described above, detailed descriptions thereof will be omitted. For example, the liquid crystal compounds 301 may be negative liquid crystal compounds having negative dielectric anisotropy. In the early stage in which the liquid crystal composition is disposed, for example, injected or dropped, between the display substrate SUB1 and the counter display substrate SUB2, the liquid crystal compounds 301 may be aligned in a direction substantially horizontal to the display substrate SUB1 and the counter display substrate SUB2. When a predetermined period of time have passed after the liquid crystal composition was injected or dropped between the display substrate SUB1 and the counter display substrate SUB2, the second liquid crystal aligning agents AA2 may be adsorbed on one side of the first electrode 180 and one side of the second electrode 250 to be self-aligned. At this time, the liquid crystal compounds 301 may be aligned in a direction substantially perpendicular to the display substrate SUB1 and the counter display substrate SUB2.

Referring to FIGS. 6B and 6C, when a liquid crystal cell, in which the liquid crystal layer 300 is disposed between the display substrate SUB1 and the counter display substrate SUB2, is irradiated with ultraviolet rays in a state where a voltage is applied to the liquid crystal cell, the liquid crystal compounds 301 are aligned in a direction in which a major axis is perpendicular to an electric field, photo-polymerization reaction groups RM are photo-polymerized, and thus the second liquid crystal aligning agents AA2 can form a polymer network for controlling and stabilizing the pre-tilt angle of the liquid crystal compounds 301. Therefore, even when the voltage applied to the liquid crystal cell is released, the liquid crystal compounds 301 can be maintained in a pre-tilted state.

Referring to FIG. 5 and FIGS. 6A, 6B, and 6C, the method of manufacturing the liquid crystal display device 501 does not require a conventional liquid crystal alignment film forming process (for example, coating, drying and sintering of an alignment solution). That is, in the method of manufacturing the liquid crystal display device 501, a conventional liquid crystal alignment film forming process can be omitted because both the liquid crystal compounds 301 and the second liquid crystal aligning agents AA2 for aligning the liquid crystal compounds 301 are injected or dropped between the display substrate SUB1 and the counter display substrate SUB2 in the process of forming the liquid crystal layer 300. Therefore, the method of manufacturing the liquid crystal display device 501 can improve productivity or processability. Further, since the method of manufacturing the liquid crystal display device 501 does not use an organic solvent harmful to health or environment, this method is environmentally friendly, and can improve safety for workers. Moreover, since the method of manufacturing the liquid crystal display device 501 does not require a high-temperature sintering process, this method is advantageous in that it is easy to manufacture a liquid crystal display device using a flexible organic polymer substrate having many problems in a high-temperature process.

Referring to FIGS. 3A, 3B, 3C and FIGS. 6A, 6B, 6C, unlike the method of manufacturing the liquid crystal display device 500, the method of manufacturing the liquid crystal display device 501 does not require the reactive mesogens RM. The reason for this is that the second liquid crystal aligning agents AA2 include the photo-polymerization reaction groups RM. Therefore, in the method of manufacturing the liquid crystal display device 501, the liquid crystal composition does not contain the reactive mesogens RM represented by Formula 2 above. Similarly, in the liquid crystal display device 501, the liquid crystal layer 300 does not contain the reactive mesogens RM represented by Formula 2 above. That is, in the liquid crystal display device 501, the content of the reactive mesogens RM represented by Formula 2 above is 0 percent by weight (wt %).

Hereinafter, the method of manufacturing a liquid crystal display device according to the present disclosure will be summarized. The method of manufacturing a liquid crystal display device according to the present disclosure includes the steps of:

disposing (for example, injecting or dropping) a liquid crystal composition containing liquid crystal compounds and at least one liquid crystal aligning agent represented by Formula 1 above between a first electrode and a second electrode facing the first electrode to manufacture a liquid crystal cell; and irradiating the liquid crystal cell with ultraviolet rays when a voltage is applied to the liquid crystal cell.

The liquid crystal aligning agent may be a first liquid crystal aligning agent containing at least one compound represented by Formula 1-1 above. In this case, the liquid crystal composition may further contain reactive mesogens represented by Formula 2 above.

The liquid crystal aligning agent may be a second liquid crystal aligning agent containing at least one compound represented by Formula 1-2 above. In this case, the content of reactive mesogens represented by Formula 2 above in the liquid crystal composition may be 0 wt %.

Hereinafter, effects of the liquid crystal display device according to embodiment will be described in detail with reference to FIGS. 7A and 7B and FIGS. 8A and 8B.

Figure 7A:
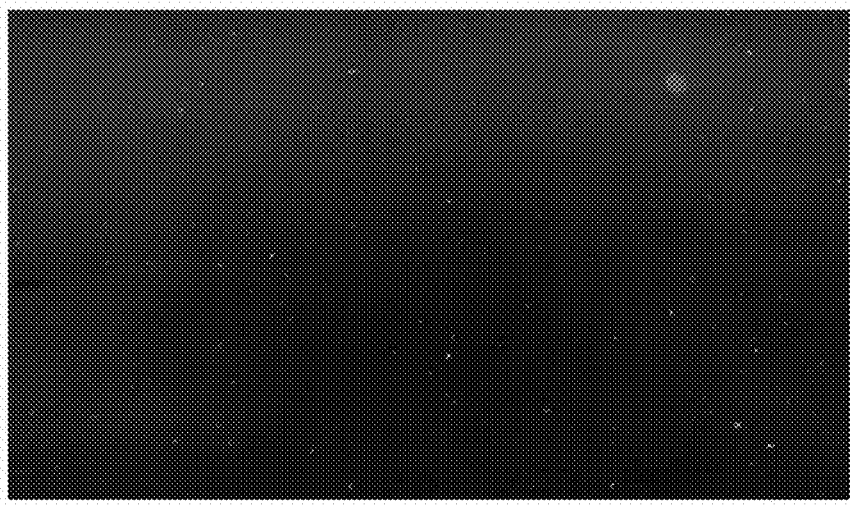
FIGS. 7A and 7B are images of liquid crystal display devices according to Example.
Figure 7B:
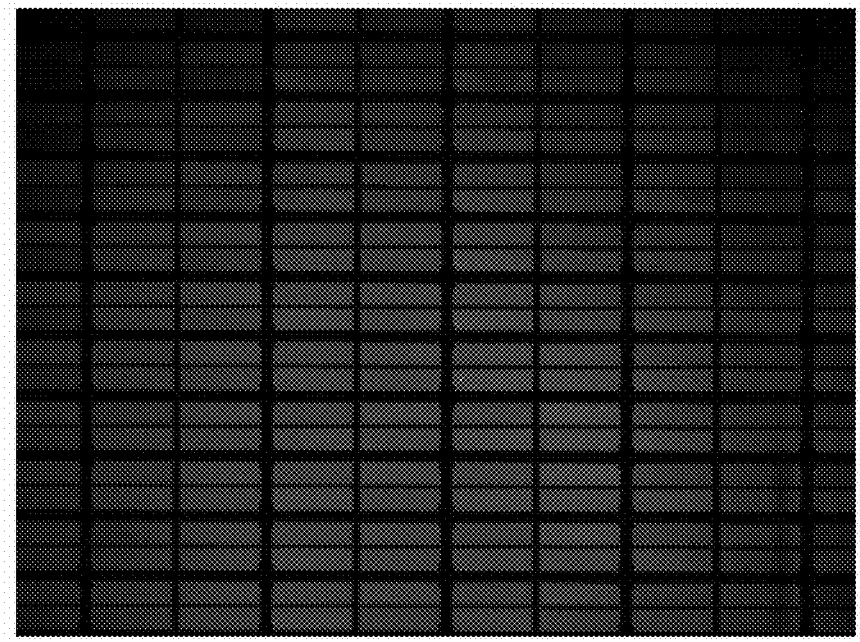

FIGS. 7A and 7B show the images of the liquid crystal display device 501 of FIG. 5. The liquid crystal display device 501 was manufactured as shown in FIGS. 6A to 6C, and a compound represented by Formula SA 2-4 was used as a liquid crystal aligning agent.

Figure 8A:
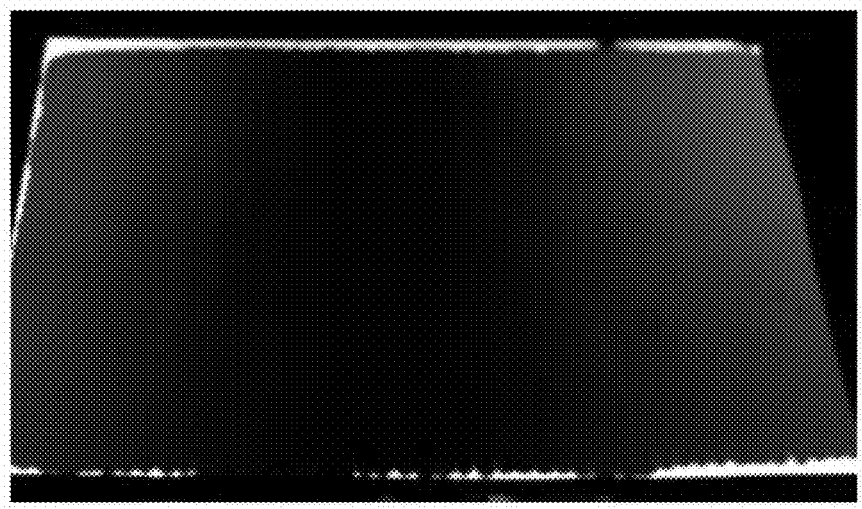
FIGS. 8A and 8B are images of liquid crystal display devices according to Comparative Example.
Figure 8B:
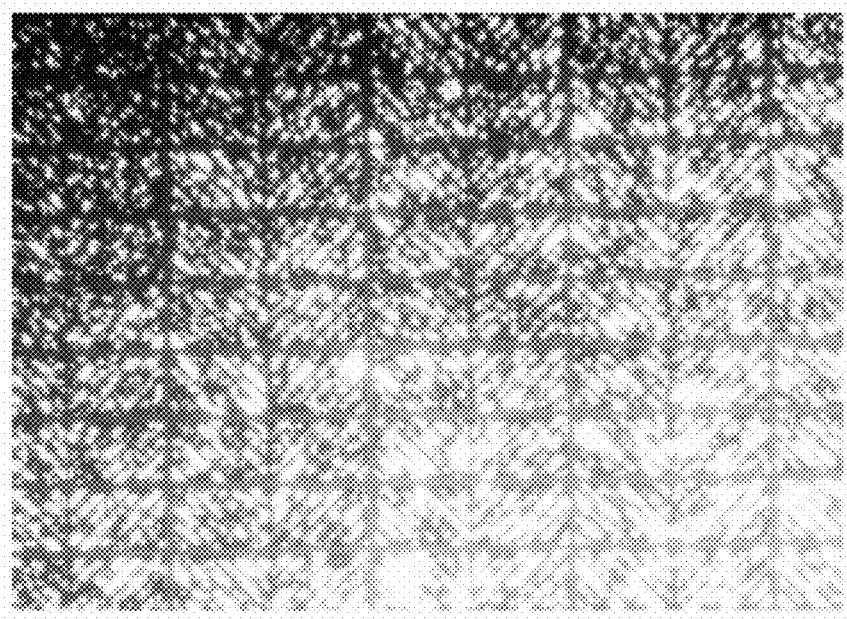

FIGS. 8A and 8B show the images of a liquid crystal display device of Comparative Example. The liquid crystal display device of Comparative Example was manufactured as shown in FIGS. 6A to 6C, and a compound represented by Formula C1 was used as a liquid crystal aligning agent.

Referring to FIGS. 7A and 8A, in the liquid crystal display device 501, edge alignment was improved compared to in the liquid crystal display device of Comparative Example. The reason for this is that the compound represented by Formula SA 2-4 includes a nitrogen-containing hetero ring. The nitrogen-containing hetero ring can improve the spreadability of liquid crystal aligning agents, compared to a linear hydroxyl group.

Comparing the alignment stability of the liquid crystal display device 501 with the alignment stability of the liquid crystal display device of Comparative Example with reference to FIGS. 7A and 8A after keeping these liquid crystal display devices at a temperature of 60° C. for 1,000 hours, the edge alignment of the liquid crystal display device 501 was improved compared to that of the liquid crystal display device of Comparative Example. The reason for this is that the compound represented by Formula SA 2-4 includes a nitrogen-containing hetero ring. The nitrogen-containing hetero ring can stabilize the alignment of liquid crystal aligning agents 301, compared to a linear hydroxyl group.

Hereinafter, the voltage holding ratio of the liquid crystal display device of Example (hereinafter, referred to as "Example") will be compared to the voltage holding ratio of the liquid crystal display device of Comparative Example (hereinafter, referred to as "Comparative Example").

Formula SA 2-4

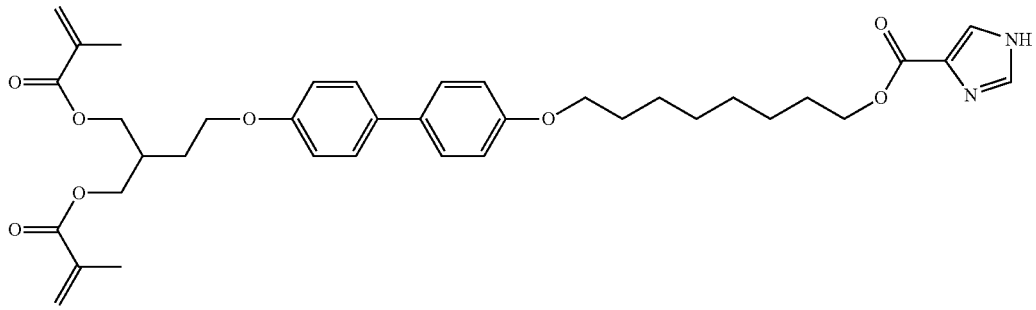

Formula C1

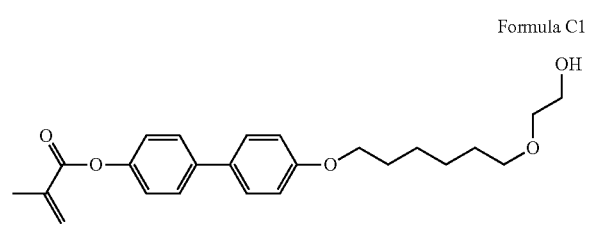 [SMILES: C=C(C)C(=O)Oc1ccc(-c2ccc(OCCCCCCOCCO)cc2)cc1]

TABLE 1

| | Voltage holding ratio (%) | | |
| --- | --- | --- | --- |
| | Before exposure | After UV exposure | After fluorescent UV exposure |
| Comparative Example | 98.9 | 99.0 | 99.2 |
| Example | 98.9 | 99.1 | 99.3 |

In Table 1, Example was manufactured as shown in FIGS. 3A to 3C, and a compound represented by Formula SA 1-2 was used as a liquid crystal aligning agent. Further, Comparative Example was manufactured as shown in FIGS. 3A to 3C, and a compound represented by Formula C2 was used as a liquid crystal aligning agent.

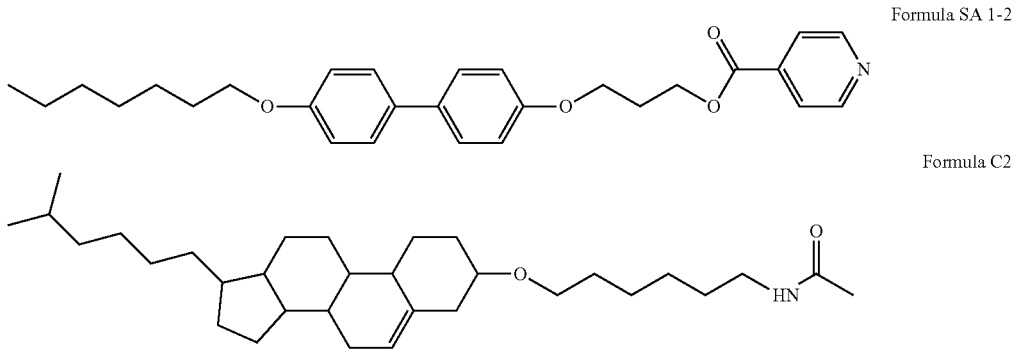

Formula SA 1-2

Formula C2

Referring to Table 1 above, it can be ascertained that the voltage hold ratio of Example is higher than that of Comparative Example.

Although the preferred embodiments of the present disclosure have been disclosed for illustrative purposes, those skilled in the art will appreciate that various modifications, additions and substitutions are possible, without departing from the scope and spirit of the present disclosure as recited in the accompanying claims.

What is claimed is:

1. A liquid crystal composition, comprising:
   a liquid crystal compound; and
   a liquid crystal aligning agent comprising at least one compound represented by Formula 1:

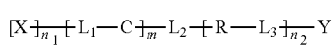

Formula 1 wherein in Formula 1,
X—* is $C_{1-20}$-alkyl-*,

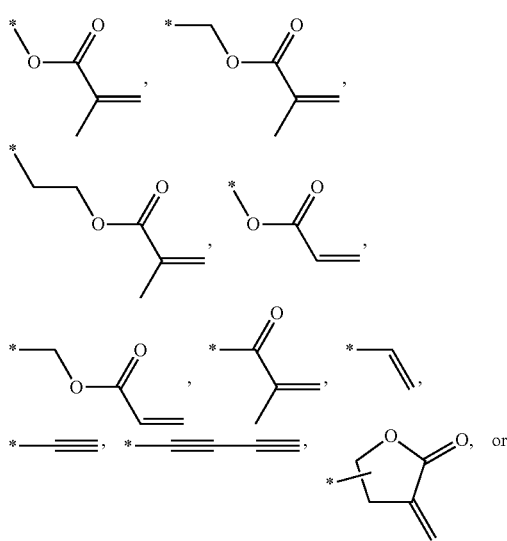

-$L_1$-* is a single bond, *—$(CH_2)_{p1}$—*, *—$O(CH_2)_{p1}$—*, *—O—*,

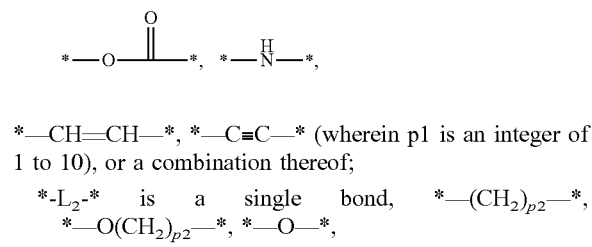

*—CH=CH—*, *—C≡C—* (wherein p1 is an integer of 1 to 10), or a combination thereof;

*-$L_2$-* is a single bond, *—$(CH_2)_{p2}$—*, *—$O(CH_2)_{p2}$—*, *—O—*,

*—CH=CH—*, *—C≡C—* (wherein p2 is an integer of 1 to 10), or a combination thereof;

*-$L_3$-* is a single bond, *—$(CH_2)_{p3}$—*, *—$O(CH_2)_{p3}$—*, *—O—*,

*—CH=CH—*, *—C≡C—* (wherein p3 is an integer of 1 to 10), or a combination thereof;

*-$L_1$-*, *-$L_2$-*, and *-$L_3$-* are identical to or different from one another;

*—C—* is a substituted or unsubstituted cyclic linking group selected from substituted or unsubstituted

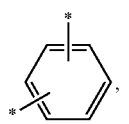

substituted or unsubstituted

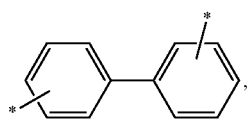

substituted or unsubstituted

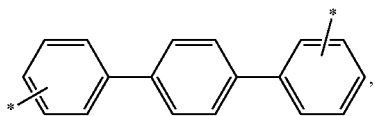

substituted or unsubstituted

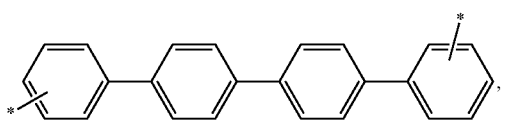

substituted or unsubstituted

substituted or unsubstituted

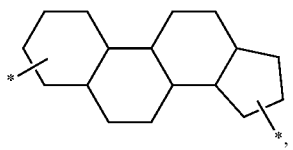

substituted or unsubstituted

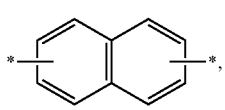

substituted or unsubstituted

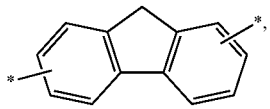

substituted or unsubstituted

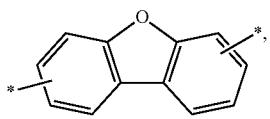

substituted or unsubstituted

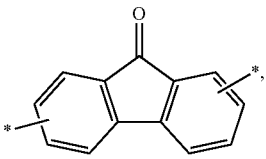

substituted or unsubstituted

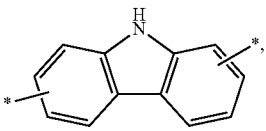

substituted or unsubstituted

substituted or unsubstituted

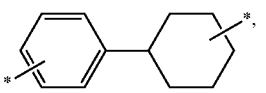

substituted or unsubstituted

substituted or unsubstituted

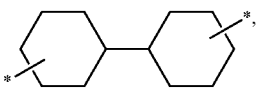

substituted or unsubstituted

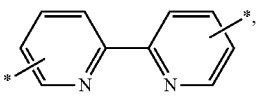

substituted or unsubstituted

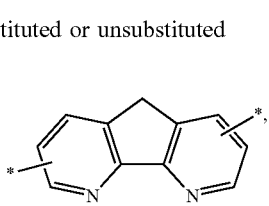

substituted or unsubstituted

substituted or unsubstituted

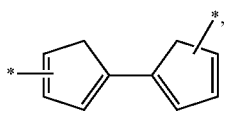

substituted or unsubstituted

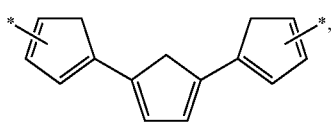

substituted or unsubstituted

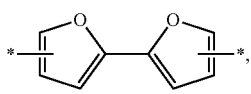

and substituted or unsubstituted

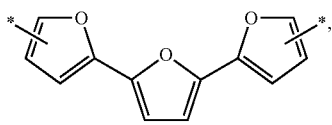

wherein at least one hydrogen in the substituted cyclic linking group is substituted with $C_{1-10}$-alkyl-*, F—*, Br—*, I—*, *—OH, *—$NH_2$, or (meth)acryloxy-$C_{1-10}$-alkyl-*;

*—R—* is *—$(CH_2)_q$—*, *—$O(CH_2)_q$—*, *—$(CH_2)_q$Arn-*, or *—$O(CH_2)_q$Arn-* (wherein Arn is a substituted or unsubstituted $C_{6-30}$ arylene, and q is an integer of 1 to 10), wherein at least one hydrogen in the substituted $C_{6-30}$ arylene is substituted with $C_{1-10}$-alkyl-*, F—*, Br—*, I—*, *—OH, *—$NH_2$, or (meth)acryloxy-$C_{1-10}$-alkyl-*;

Y—* is

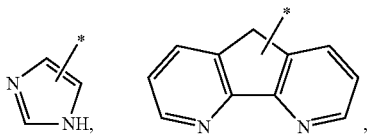

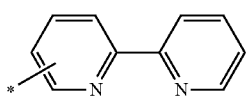

-continued

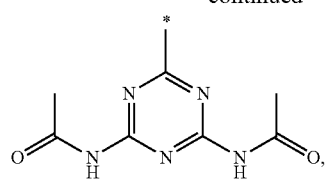

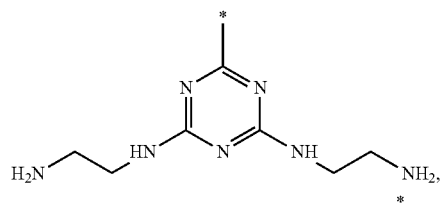

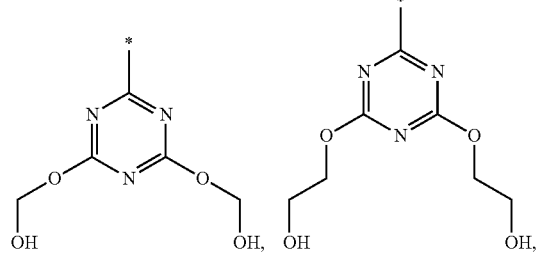

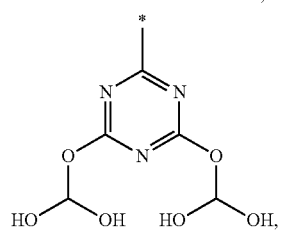

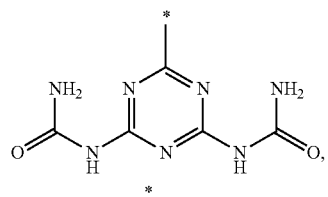

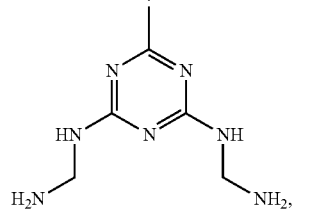

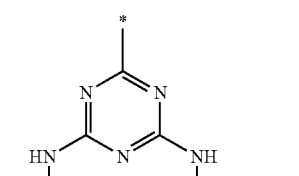

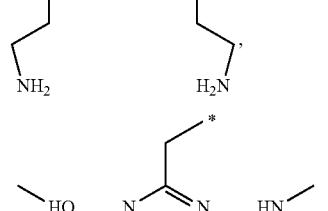

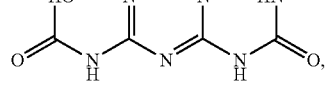

-continued

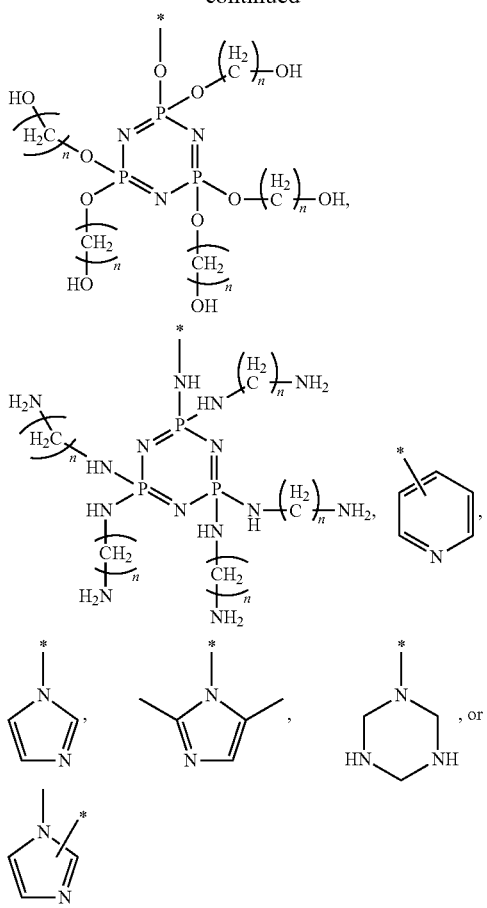

(wherein n is an integer of 0 to 5);

$n_1$ is an integer of 1 to 3, and $n_2$ and m are each independently 0 or 1.

2. The liquid crystal composition of claim 1, wherein X—* is $C_{1-20}$-alkyl-*, and wherein the liquid crystal composition further comprises a reactive mesogen comprising at least one compound represented by Formula 2:

P1-SP1-MG-SP2-P2        Formula 2 wherein in Formula 2,

P1-* and P2-* are each independently

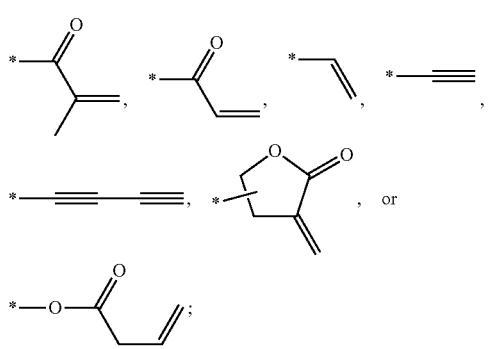

—SP1-* is

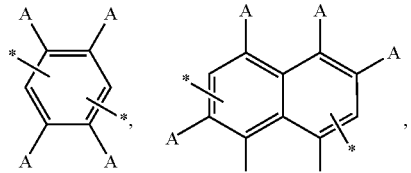

(wherein a is an integer of 0 to 2) and *—SP2-* is

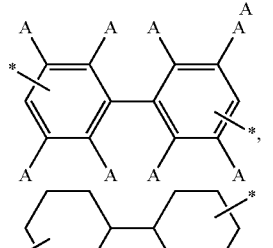

(wherein b is an integer of 0 to 2), wherein each *-L-* is independently *—(CH$_2$)$_c$—*, *—O(CH$_2$)$_c$—*,

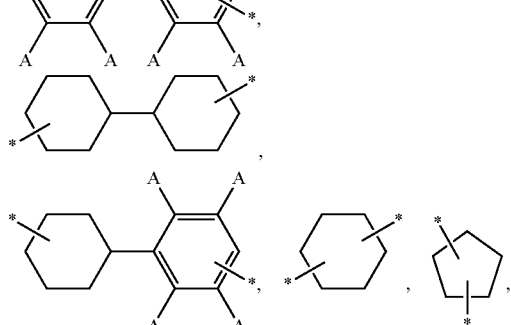

*—CH=CH—*, or *—C≡C—* (wherein c is an integer of 1 to 10), *—Z—* is *—(CH$_2$)$_d$—* (wherein d is an integer of 0 to 12), and *—Ar—* is

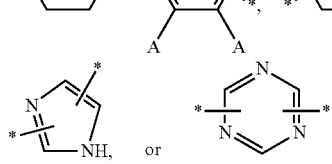

(wherein each A-* is H—*, $C_{1-10}$-alkyl-*, F—*, Br—*, I—*, *—OH, *—NH$_2$, or CN—*); and

*-MG-* is

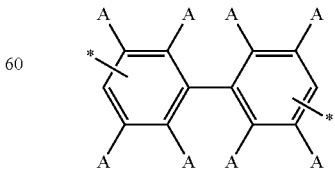

(wherein each A-* is H—*, $C_{1-10}$-alkyl-*, F—*, Br—*, I—*, *—OH, *—NH$_2$, or CN—*).

3. The liquid crystal composition of claim 2, wherein the liquid crystal aligning agent comprises at least one compound represented by Formulae SA 1-1 to SA 1-8:
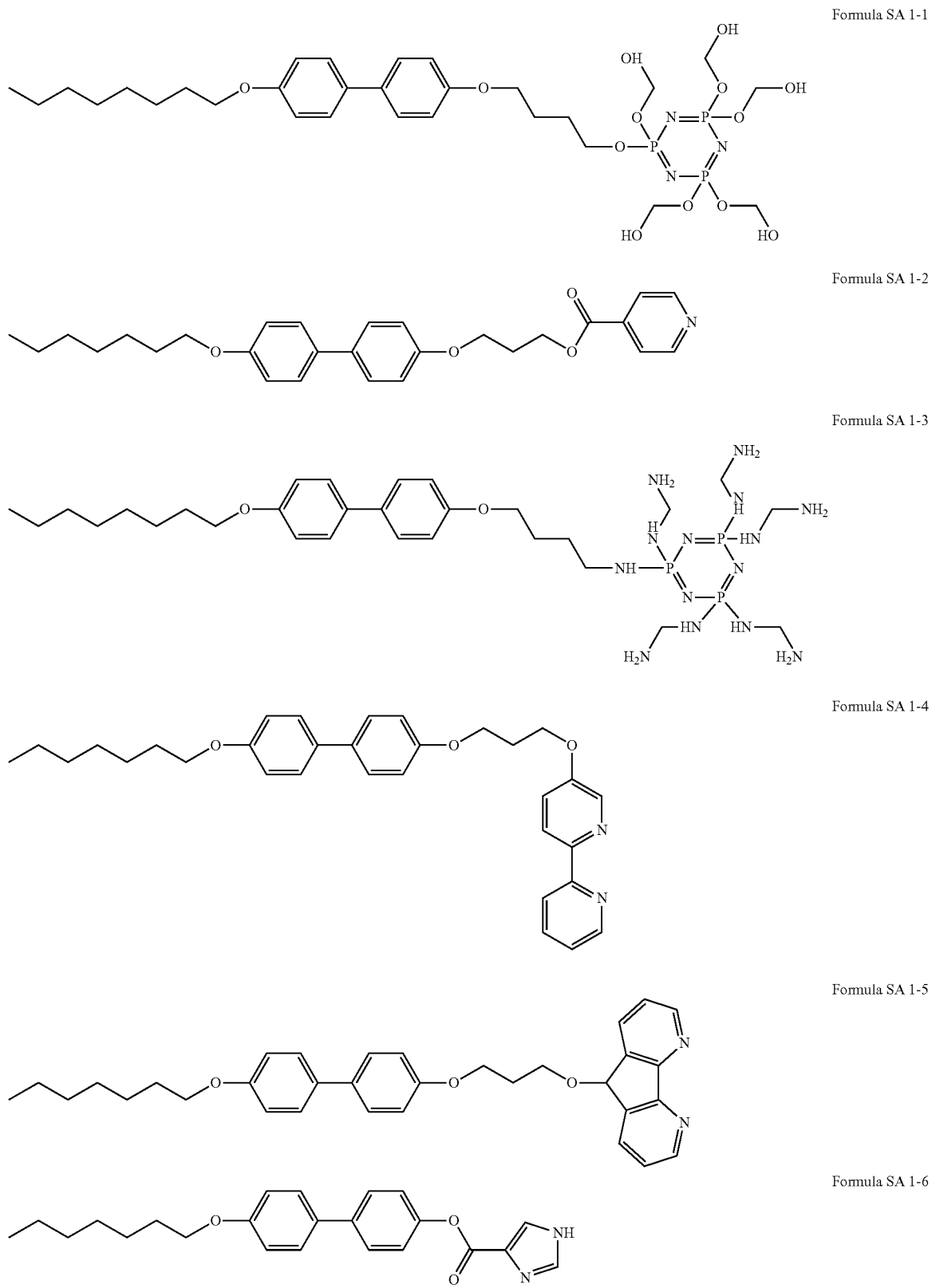

-continued

Formula SA 1-7

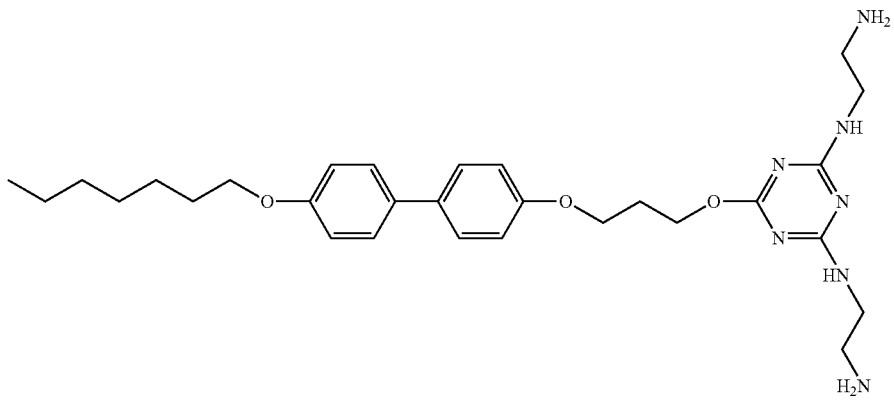

Formula SA 1-8

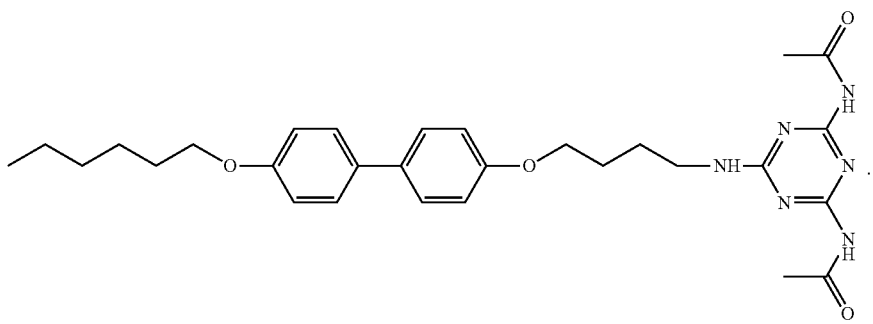

4. The liquid crystal composition of claim 1,
wherein the liquid crystal aligning agent comprises the compound represented by Formula 1,
wherein X—* is

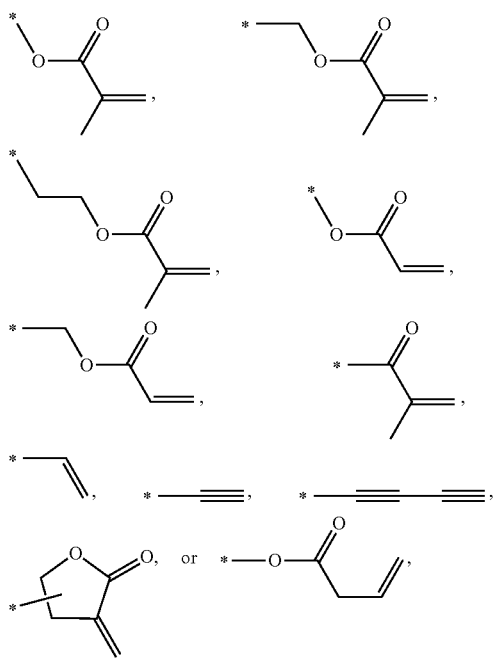

wherein the liquid crystal composition does not include a reactive mesogen comprising at least one compound represented by Formula 2:

P1-SP1-MG-SP2-P2   Formula 2 wherein in Formula 2,
P1-* and P2-* are each independently

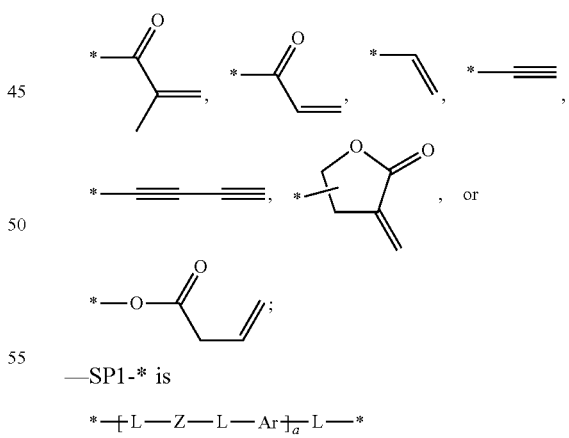

—SP1-* is

\*─┤L—Z—L—Ar├ₐ—L—\*

(wherein a is an integer of 0 to 2) and *—SP2-* is

\*—L─┤Ar—L—Z—L├ᵦ—\*

(wherein b is an integer of 0 to 2), in each of which *-L-* is *—$(CH_2)_c$—*, *—$O(CH_2)_c$—*,

*—CH=CH—*, or *—C≡C—* (wherein c is an integer of 1 to 10), *—Z—* is *—(CH$_2$)$_d$—* (wherein d is an integer of 0 to 12), and *—Ar—* is

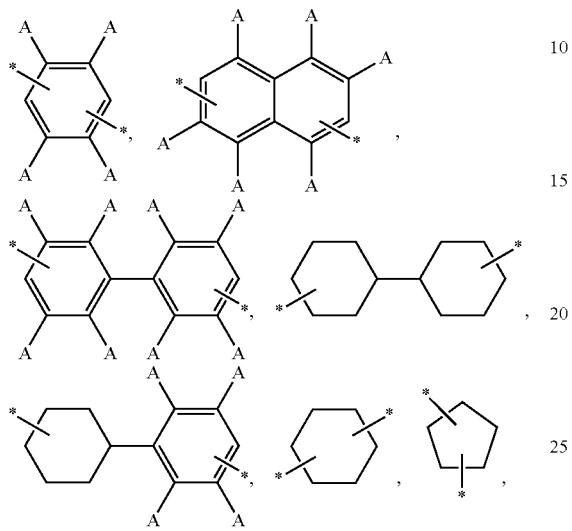

,

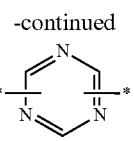

(wherein each A-* is H—*, C$_{1-10}$-alkyl-*, F—*, Br—*, I—*, *—OH, *—NH$_2$, or CN—*); and

*-MG-* is

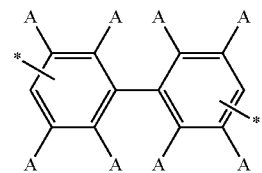

(wherein each A-* is H—*, C$_{1-10}$-alkyl-*, F—*, Br—*, I—*, *—OH, *—NH$_2$, or CN—*).

5. The liquid crystal composition of claim 4,
wherein the liquid crystal aligning agent comprises at least one compound represented by Formulae SA 2-1 to SA 2-14:

Chemical Formula SA 2-1

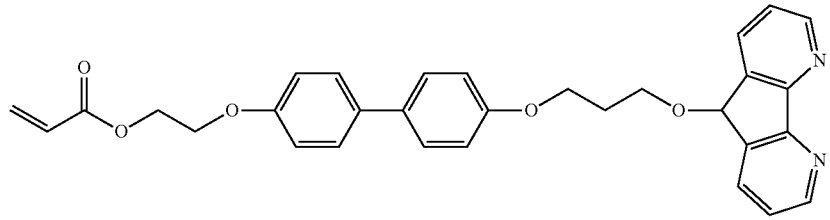

Chemical Formula SA 2-2

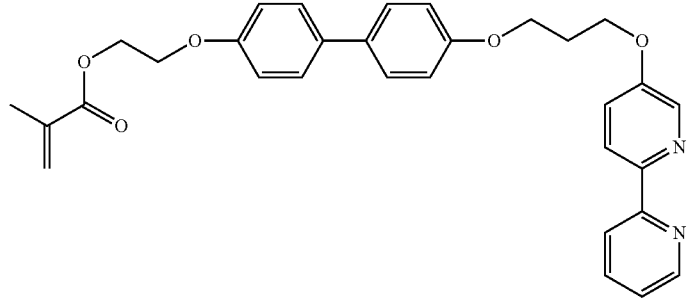

Chemical Formula SA 2-3

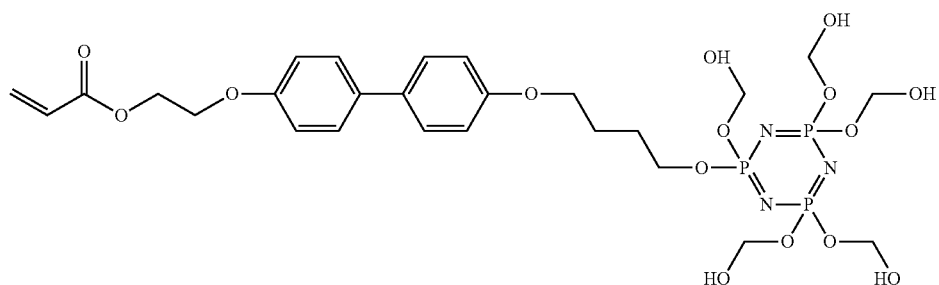

Chemical Formula SA 2-4
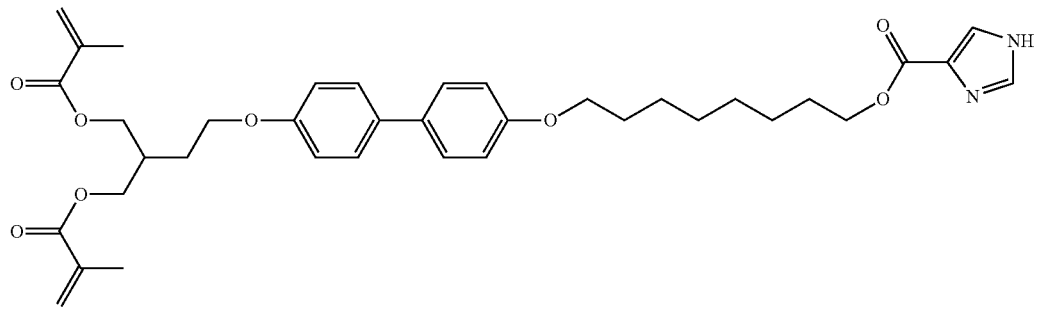
Chemical Formula SA 2-5
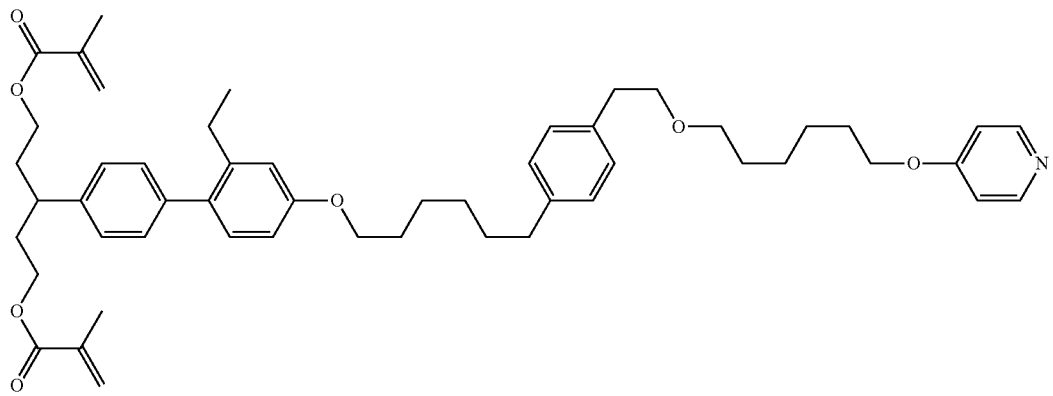
Chemical Formula SA 2-6
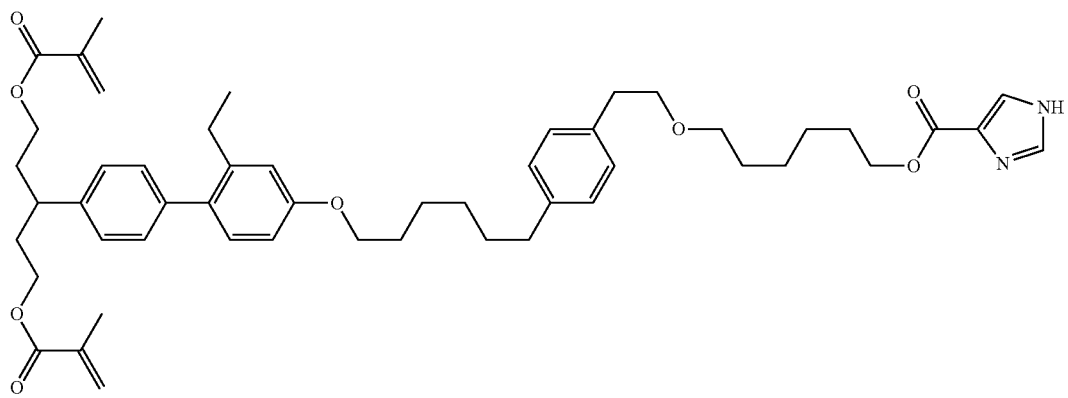
Chemical Formula SA 2-7
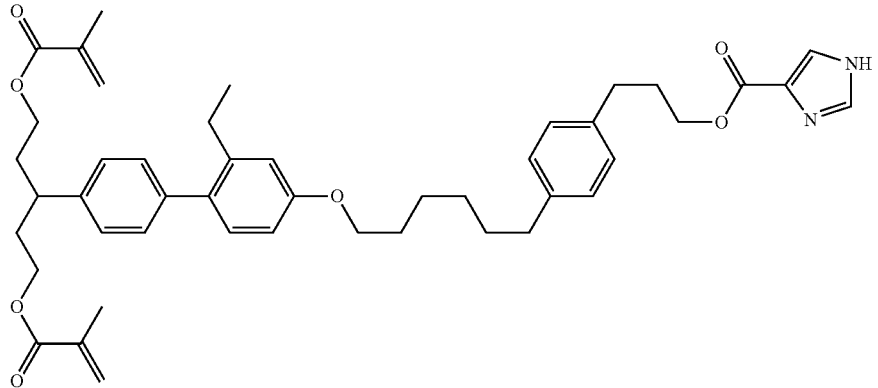

Chemical Formula SA 2-8
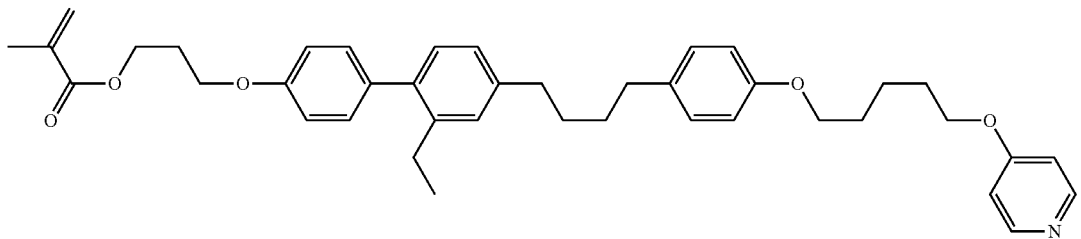
Chemical Formula SA 2-9
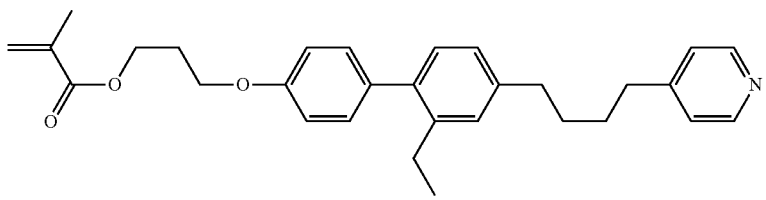
Chemical Formula SA 2-10
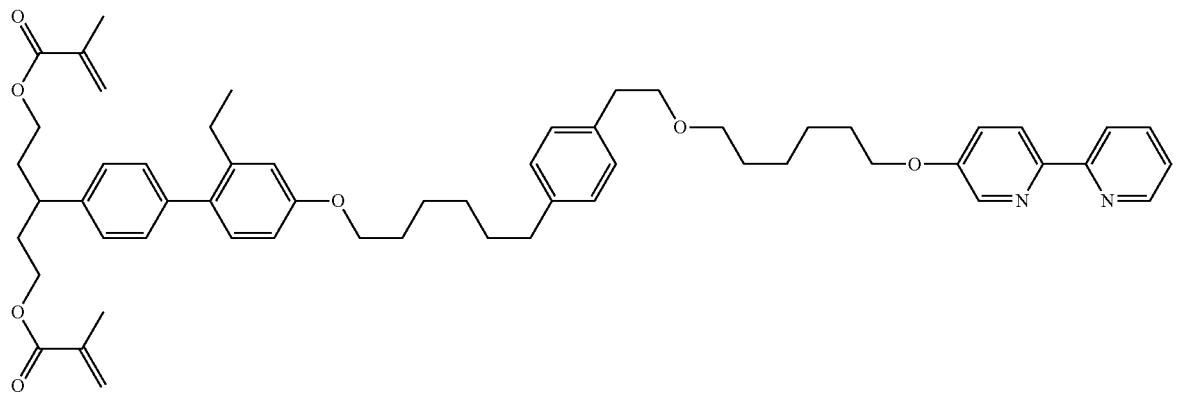
Chemical Formula SA 2-11
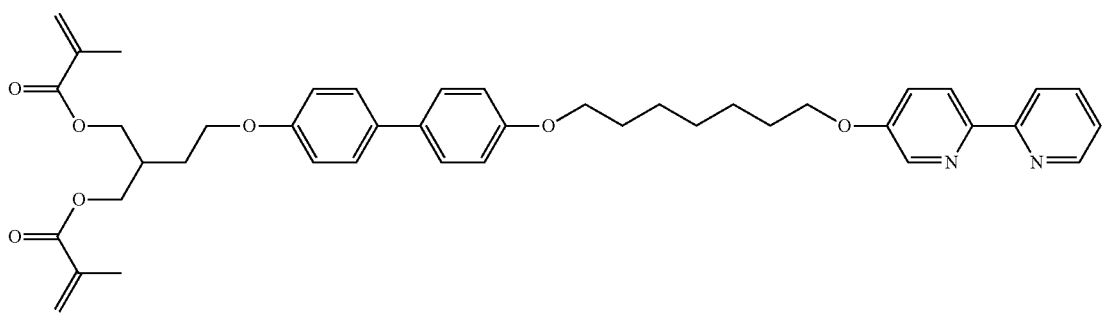
Chemical Formula SA 2-12
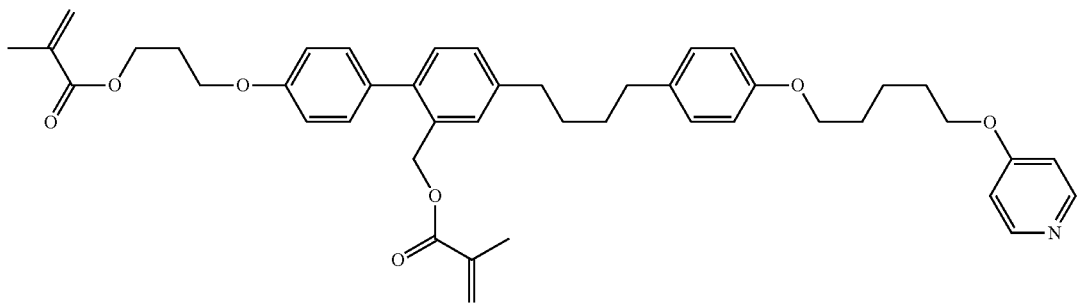

Chemical Formula SA 2-13

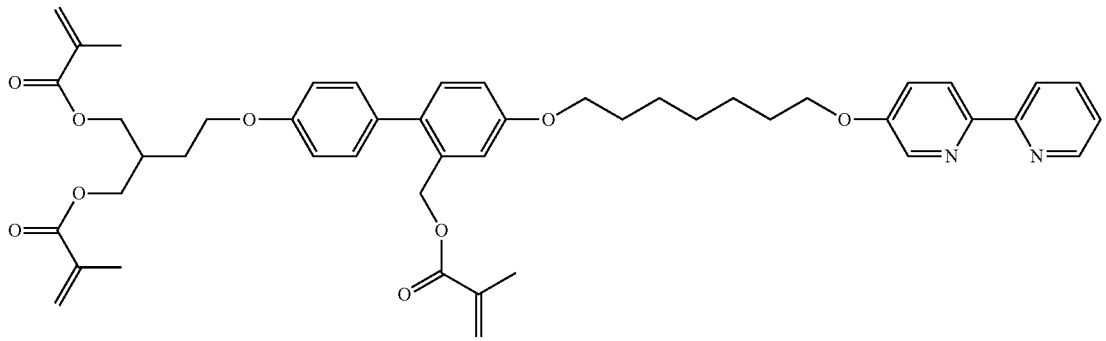

Chemical Formula SA 2-14

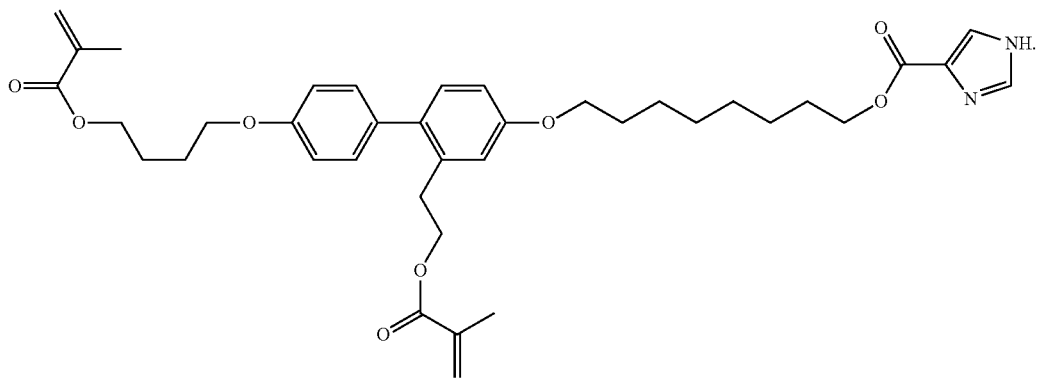

6. A liquid crystal display device, comprising:
a first electrode;
a second electrode facing the first electrode;
a liquid crystal layer comprising a liquid crystal compound, wherein the liquid crystal layer is disposed between the first electrode and the second electrode;
a liquid crystal aligning agent comprising at least one compound represented by Formula 1-1, wherein the liquid crystal layer is adsorbed on a surface of at least one of the first electrode and the second electrode to align the liquid crystal compound; and
a polymer of reactive mesogens comprising two or more compounds represented by Formula 2, wherein the polymer of reactive mesogens is adsorbed on the surface of at least one of the first electrode and the second electrode to align the liquid crystal compound:

Formula 1-1

[X'$\frac{}{n_1}$[L$_1$—C$\frac{}{m}$L$_2$$\frac{}{}$R—L$_3$$\frac{}{n_2}$Y wherein in Formula 1-1,
X'—* is C$_{1-20}$-alkyl-*;
*-L$_1$-* is a single bond, *—(CH$_2$)$_{p1}$—*, *—O(CH$_2$)$_{p1}$—*, *—O—*,

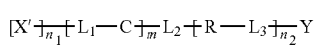

*—CH=CH—*, *—C≡C—* (wherein p1 is an integer of 1 to 10), or a combination thereof;

*-L$_2$-* is a single bond, *—(CH$_2$)$_{p2}$—*, *—O(CH$_2$)$_{p2}$—*, *—O—*,

*—CH=CH—*, *—C≡C—* (wherein p2 is an integer of 1 to 10), or a combination thereof;

*-L$_3$-* is a single bond, *—(CH$_2$)$_{p3}$—*, *—O(CH$_2$)$_{p3}$—*, *—O—*,

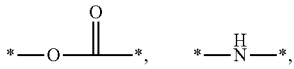

*—CH=CH—*, *—C≡C—* (wherein p3 is an integer of 1 to 10), or a combination thereof;

*-L$_2$-*, and *-L-* are identical to or different from one another;

*—C—* is a substituted or unsubstituted cyclic linking group selected from substituted or unsubstituted

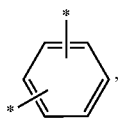

substituted or unsubstituted

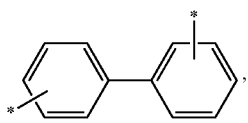

substituted or unsubstituted

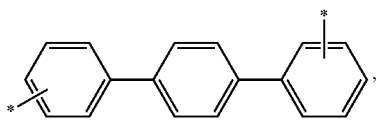

substituted or unsubstituted

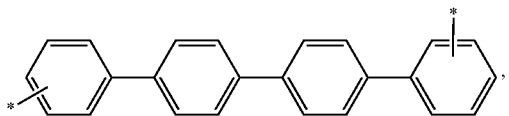

substituted or unsubstituted

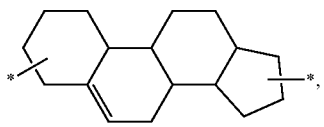

substituted or unsubstituted

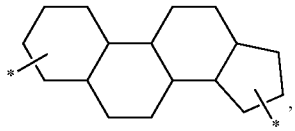

substituted or unsubstituted

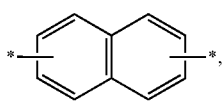

substituted or unsubstituted

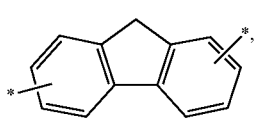

substituted or unsubstituted

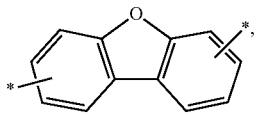

substituted or unsubstituted

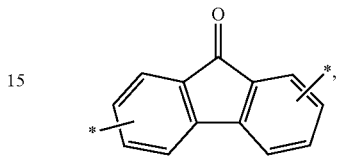

substituted or unsubstituted

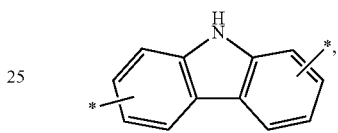

substituted or unsubstituted

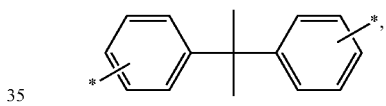

substituted or unsubstituted

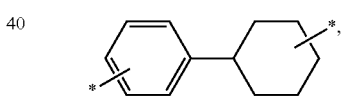

substituted or unsubstituted

substituted or unsubstituted

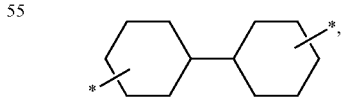

substituted or unsubstituted

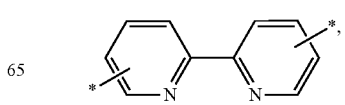

substituted or unsubstituted

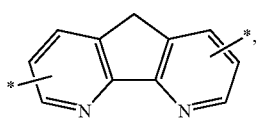

substituted or unsubstituted

substituted or unsubstituted

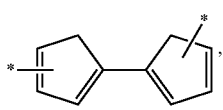

substituted or unsubstituted

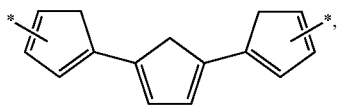

substituted or unsubstituted

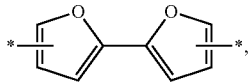

and substituted or unsubstituted

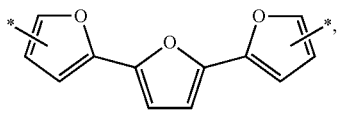

wherein at least one hydrogen in the substituted cyclic linking group is substituted with $C_{1-10}$-alkyl-*, F—*, Br—*, I—*, *—OH, *—NH$_2$, or (meth)acryloxy-$C_{1-10}$-alkyl-*;
  *—R—* is *—(CH$_2$)$_q$*, *—O(CH$_2$)$_q$*, *—(CH$_2$)$_q$Arn-*, or *—O(CH$_2$)$_q$Arn-* (wherein Arn is a substituted or unsubstituted $C_{6-30}$ arylene, and q is an integer of 1 to 10), wherein at least one hydrogen in the substituted C610 arylene is substituted with $C_{1-10}$-alkyl-*, F—*, Br—*, I—*, *—OH, *—NH$_2$, or (meth)acryloxy-$C_{1-10}$-alkyl-*;
Y—* is

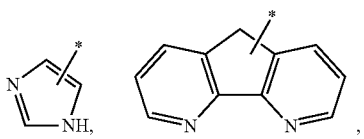

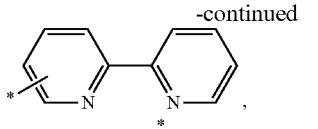

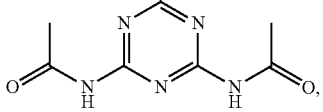

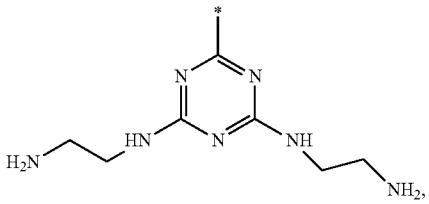

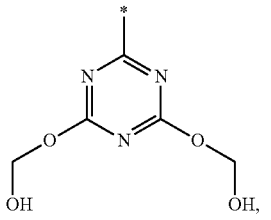

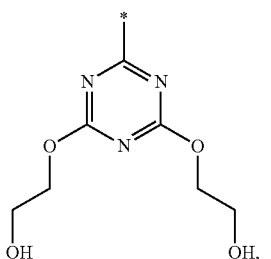

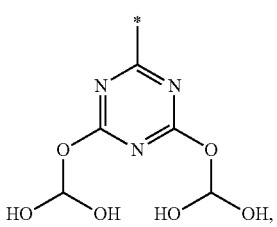

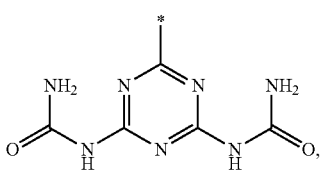

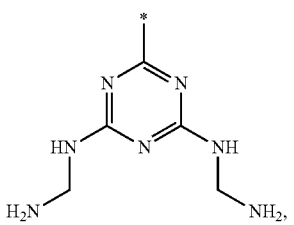

115
-continued

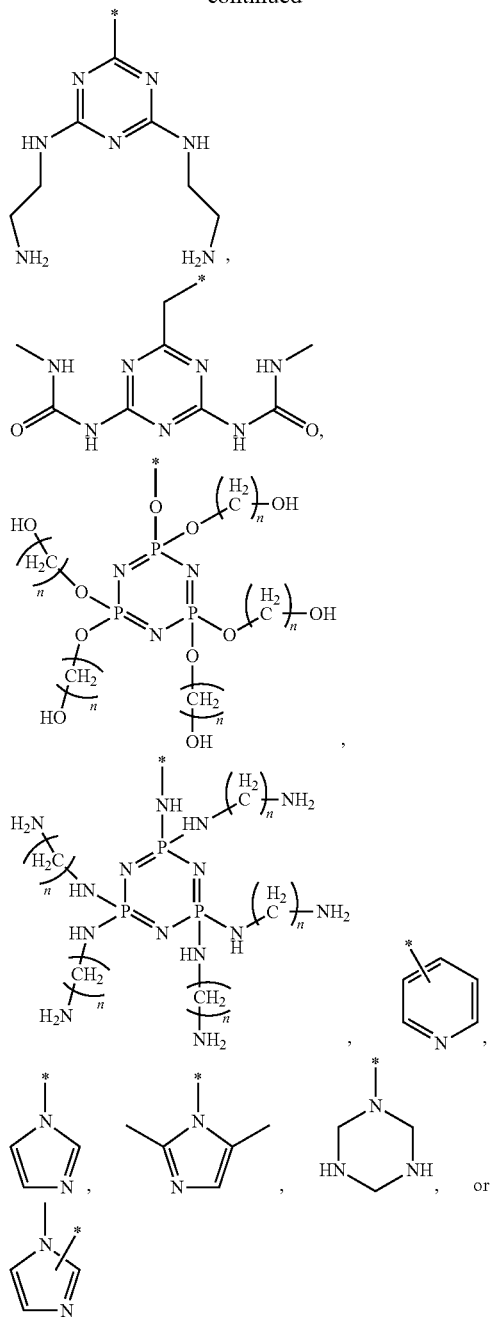

(wherein n is an integer of 0 to
n₁ is 1, and
n₂ and m are each independently 0 or 1, P1-SP1-MG-SP2-P2  Formula 2 wherein in Formula 2,
P1-* and P2-* are each independently

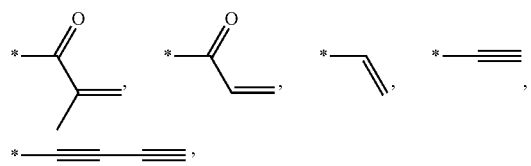

116
-continued

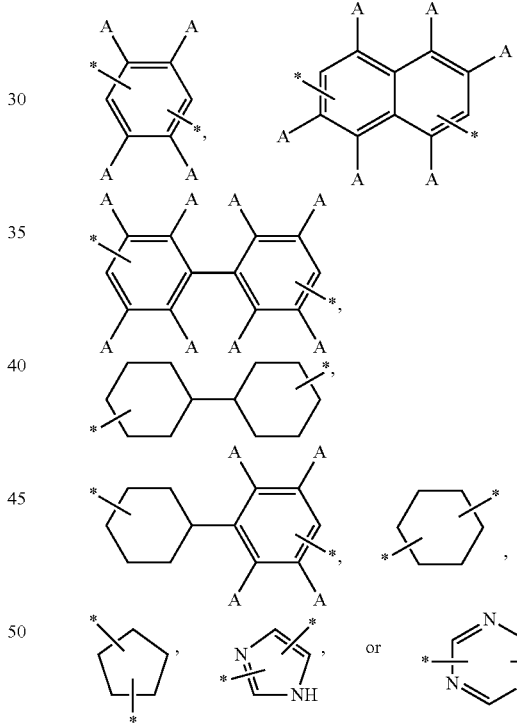

—SP1-* is

\*—(L—Z—L—Ar)$_a$—L—*

(wherein a is an integer of 0 to 2) and *—SP2-* is

*—L—(Ar—L—Z—L)$_b$—*

(wherein b is an integer of 0 to 2), in each of which *-L-*
is *—(CH$_2$)$_c$—*, *—O(CH$_2$)$_c$—*,

*—O—C(=O)—*, *—N(H)—*, *—N(H)—C(=O)—*,

*—CH=CH—*, or *—C≡C—* (wherein c is an integer of
1 to 10), *—Z—* is *—(CH$_2$)$_d$—* (wherein d is an integer
of 0 to 12), and *—Ar—* is (wherein each A-* is H—*, C$_{1-10}$-alkyl-*, F—*, Br—*,
I—*, *—OH, *—NH$_2$, or CN—*); and
*-MG-* is (wherein each A-* is H—*, C$_{1-10}$-alkyl-*, F—*, Br—*,
I—*, *—OH, *—NH$_2$, or CN—*).

7. The liquid crystal display device of claim 6, wherein the liquid crystal aligning agent comprises at least compound represented by Formulae SA 1-1 to SA 1-8:
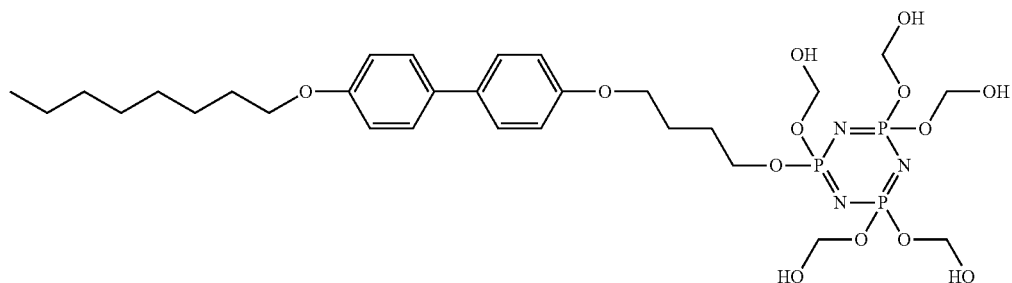
Formula SA 1-1
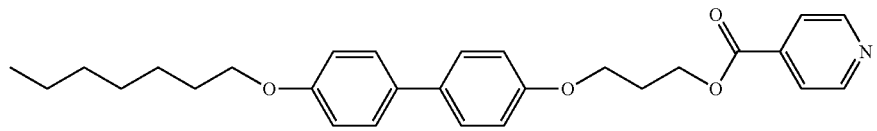
Formula SA 1-2
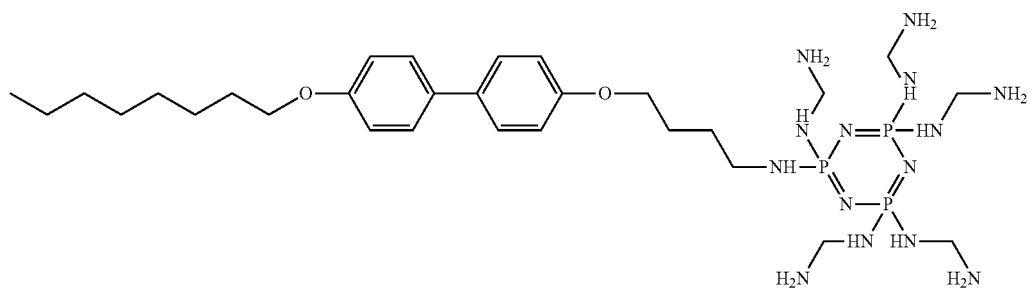
Formula SA 1-3
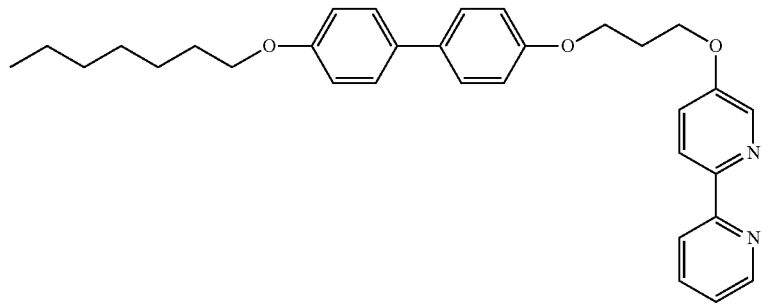
Formula SA 1-4
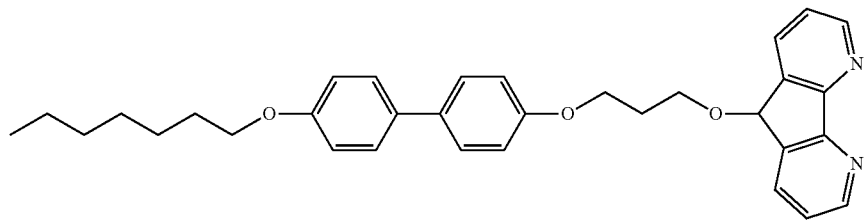
Formula SA 1-5
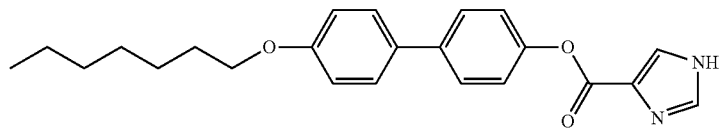
Formula SA 1-6

Formula SA 1-7

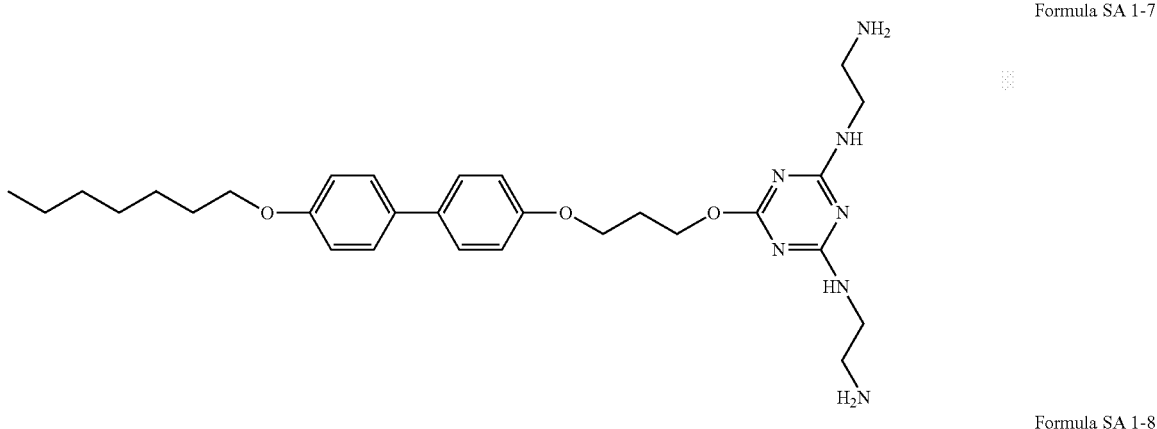

Formula SA 1-8

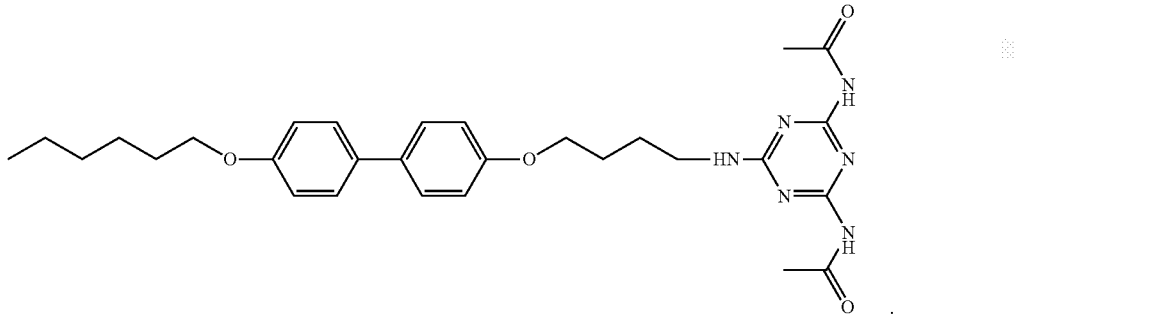

8. A liquid crystal display device, comprising:
a first electrode;
a second electrode facing the first electrode;
a liquid crystal layer comprising a liquid crystal compound, wherein the liquid crystal layer is disposed between the first electrode and the second electrode; and
a polymer of liquid crystal aligning agents of two or more of compounds represented by Formula 1-2, which is adsorbed on the surface of at least one of the first electrode and the second electrode to align the liquid crystal compound,
wherein the liquid crystal device does not include compounds represented by Formula 2:

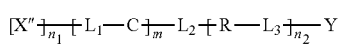

Formula 1-2 wherein in Formula 1-1,
X"—* is a polymerizing group selected from

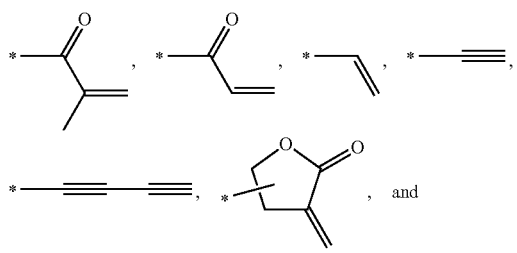

and

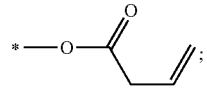

$-L_1-*$ is a single bond, $*-(CH_2)_{p1}-*$, $*-O(CH_2)_{p1}-*$, $*-O(CH_2)_{p1}O-*$, $*-O-*$,

$*-CH=CH-*$, $*-C\equiv C-*$ (wherein p1 is an integer of 1 to 10), or a combination thereof;
$*-L_2-*$ is a single bond, $*-(CH_2)_{p2}-*$, $*-O(CH_2)_{p2}-*$, $*-O-*$,

$*-CH=CH-*$, $*-C\equiv C-*$ (wherein p2 is an integer of 1 to 10), or a combination thereof;
$*-L_3-*$ is a single bond, $*-(CH_2)_{p3}-*$, $*-O(CH_2)_{p3}-*$, $*-O-*$,

$*-CH=CH-*$, $*-C\equiv C-*$ (wherein p3 is an integer of 1 to 10), or a combination thereof;
$*-L_1-*$, $*-L_2-*$, and $*-L_3-*$ are identical to or different from one another;

*—C—* is a substituted or unsubstituted cyclic linking group selected from substituted or unsubstituted

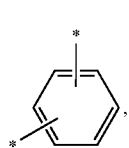

substituted or unsubstituted

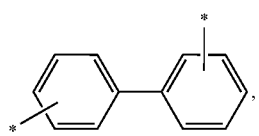

substituted or unsubstituted

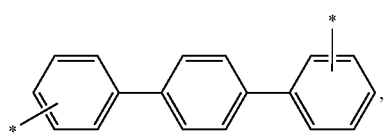

substituted or unsubstituted

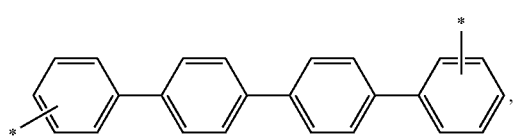

substituted or unsubstituted

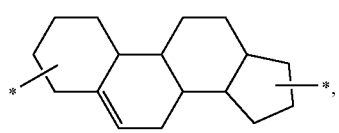

substituted or unsubstituted

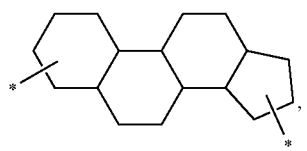

substituted or unsubstituted

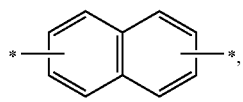

substituted or unsubstituted

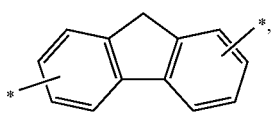

substituted or unsubstituted

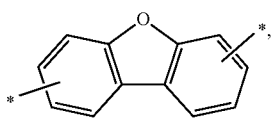

substituted or unsubstituted

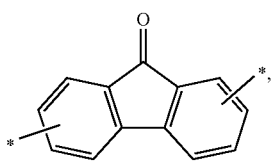

substituted or unsubstituted

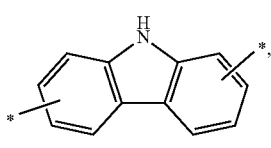

substituted or unsubstituted

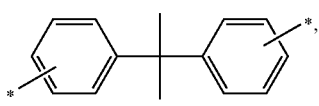

substituted or unsubstituted

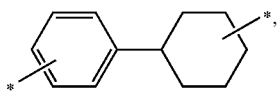

substituted or unsubstituted

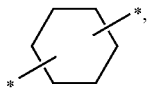

substituted or unsubstituted

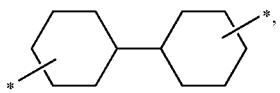

substituted or unsubstituted

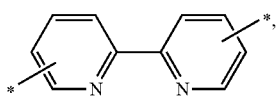

substituted or unsubstituted

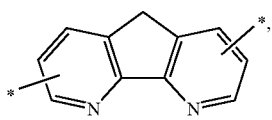

substituted or unsubstituted

substituted or unsubstituted

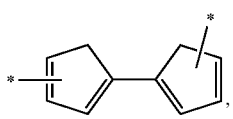

substituted or unsubstituted

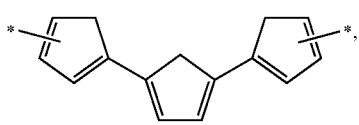

substituted or unsubstituted

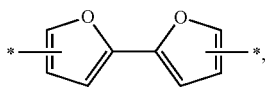

and substituted or unsubstituted

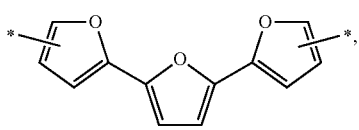

wherein at least one hydrogen in the substituted cyclic linking group is substituted with $C_{1-10}$-alkyl-*, F—*, Br—*, I—*, *—OH, *—NH$_2$, or (meth)acryloxy-$C_{1-10}$-alkyl-*;
*—R—* is *—(CH$_2$)$_q$—*, *—O(CH$_2$)$_q$—*, *—(CH$_2$)$_q$Arn-*, or *—O(CH$_2$)$_q$Arn-* (wherein Arn is a substituted or unsubstituted $C_{6-30}$ arylene, and q is an integer of 1 to 10); wherein at least one hydrogen in the substituted C610 arylene is substituted with $C_{1-10}$-alkyl-*, F—*, Br—*, I—*, *—OH, *—NH$_2$, or (meth)acryloxy-$C_{1-10}$-alkyl-*;

Y—* is

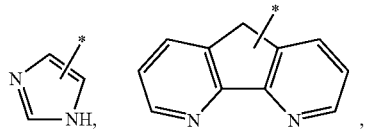

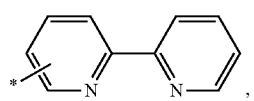

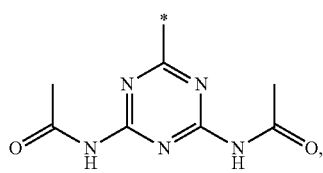

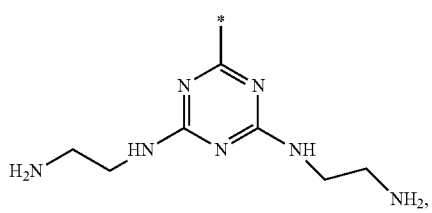

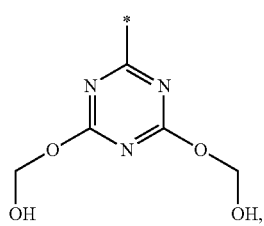

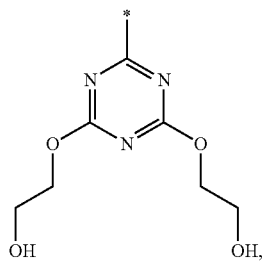

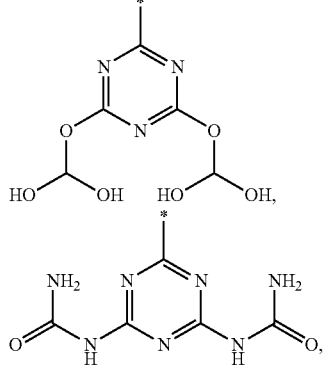

-continued

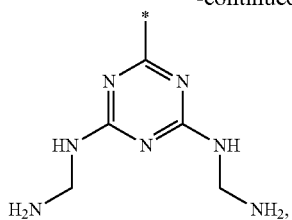

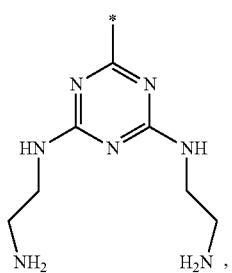

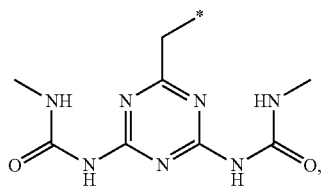

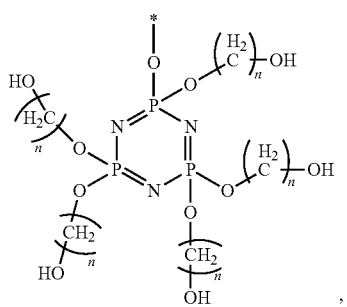

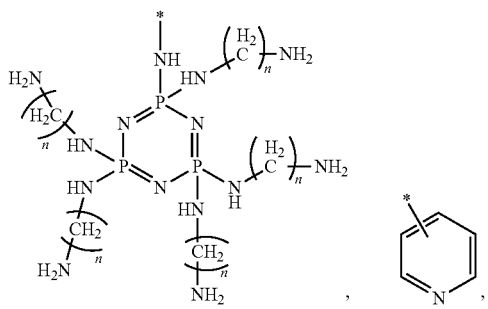

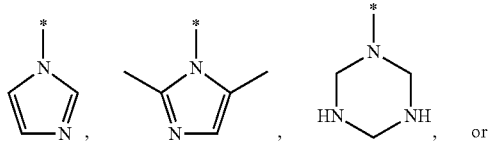

(wherein n is an integer of 0 to 5);

$n_1$ is an integer of 1 to 3, and $n_2$ and m are each independently 0 or 1,

P1-SP1-MG-SP2-P2    Formula 2 wherein in Formula 2,

P1-* and P2-* are each independently

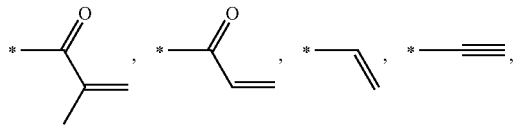

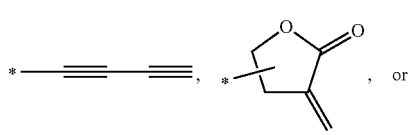

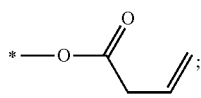

—SP1-* is

*—[L—Z—L—Ar]$_a$—L—*

(wherein a is an integer of 0 to 2) and *—SP2-* is

*—L—(Ar—L—Z—L)$_b$—*

(wherein b is an integer of 0 to 2), in each of which *-L-* is *—(CH$_2$)$_c$—*, *—O(CH$_2$)$_c$—*,

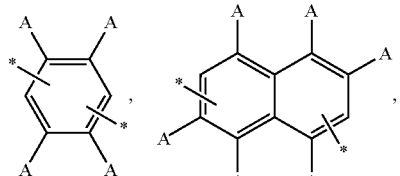

*—CH=CH—*, or *—C≡C—* (wherein c is an integer of 1 to 10), *—Z—* is *—(CH$_2$)$_d$—* (wherein d is an integer of 0 to 12), and *—Ar—* is

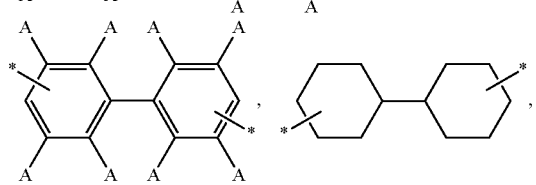

-continued
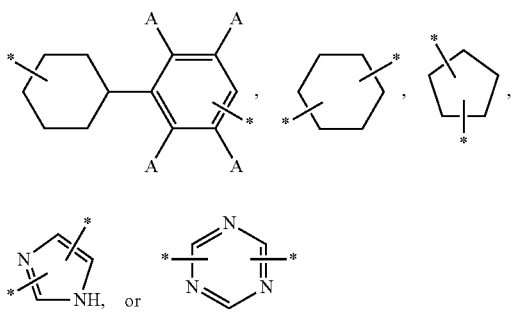
(wherein each A-* is H—*, $C_{1-10}$-alkyl-*, F—*, Br—*, I—*, *—I—*, *—OH, *—NH$_2$, or CN—*); and
*-MG-* is
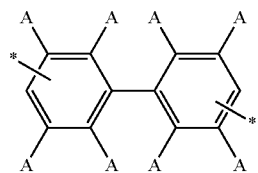
(wherein each A-* is H—*, $C_{1-10}$-alkyl-*, F—*, Br—*, I—*, *—OH, *—NH$_2$, or CN—*).
9. The liquid crystal display device of claim 8, wherein the liquid crystal aligning agent comprises at least compound represented by Formulae SA 2-1 to SA 2-14:
Chemical Formula SA 2-1
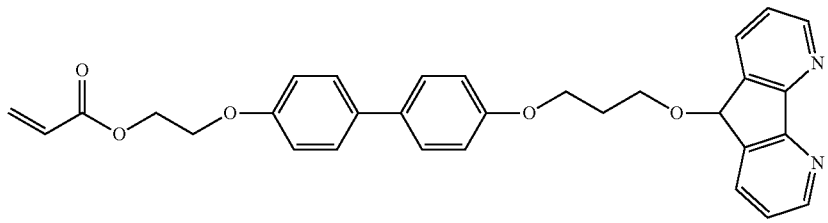
Chemical Formula SA 2-2
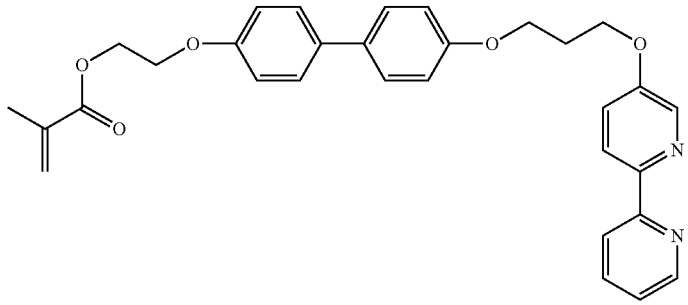
Chemical Formula SA 2-3
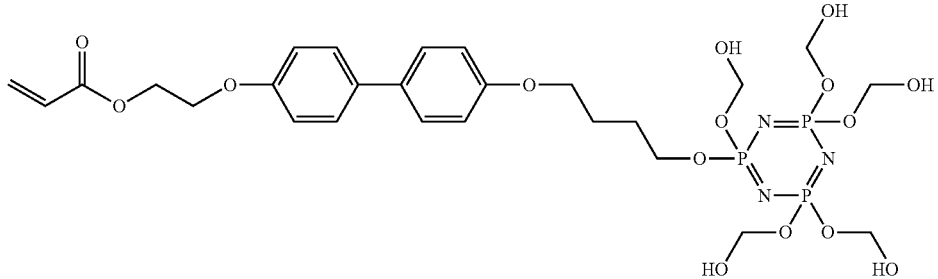
Chemical Formula SA 2-4
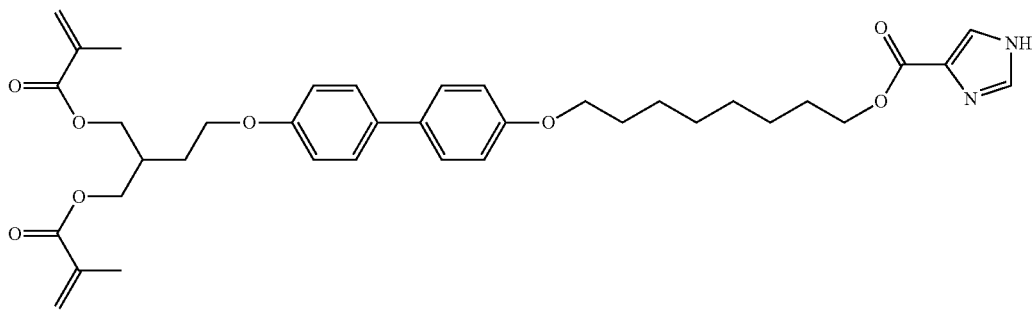

Chemical Formula SA 2-5
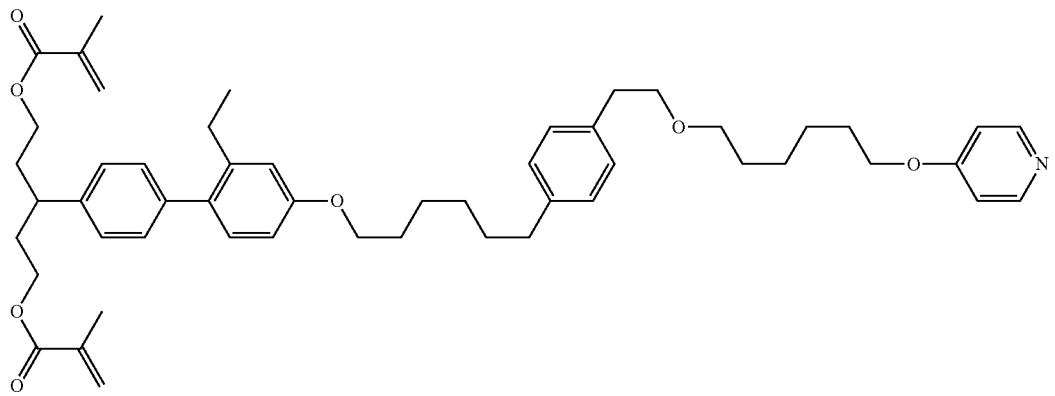
Chemical Formula SA 2-6
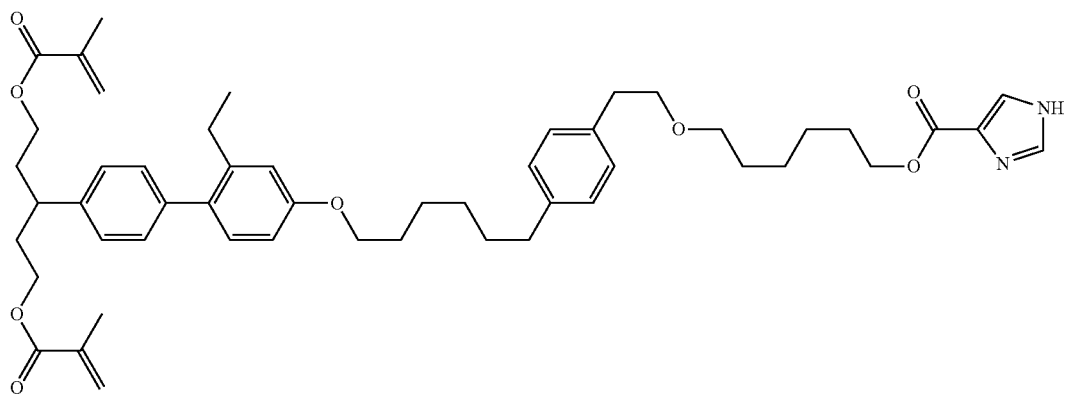
Chemical Formula SA 2-7
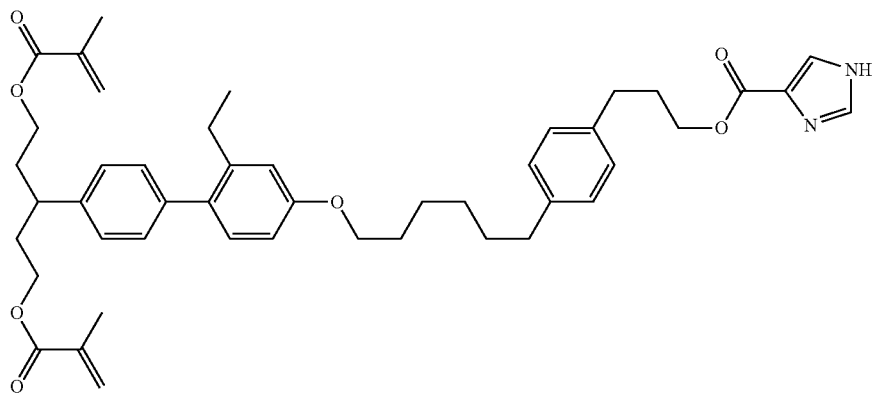
Chemical Formula SA 2-8
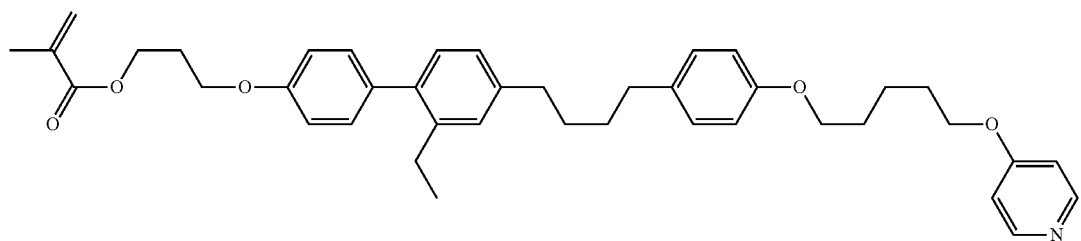

Chemical Formula SA 2-9
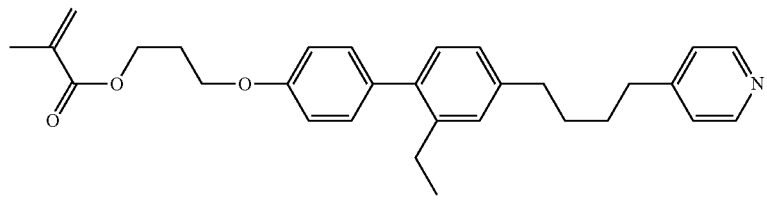
Chemical Formula SA 2-10
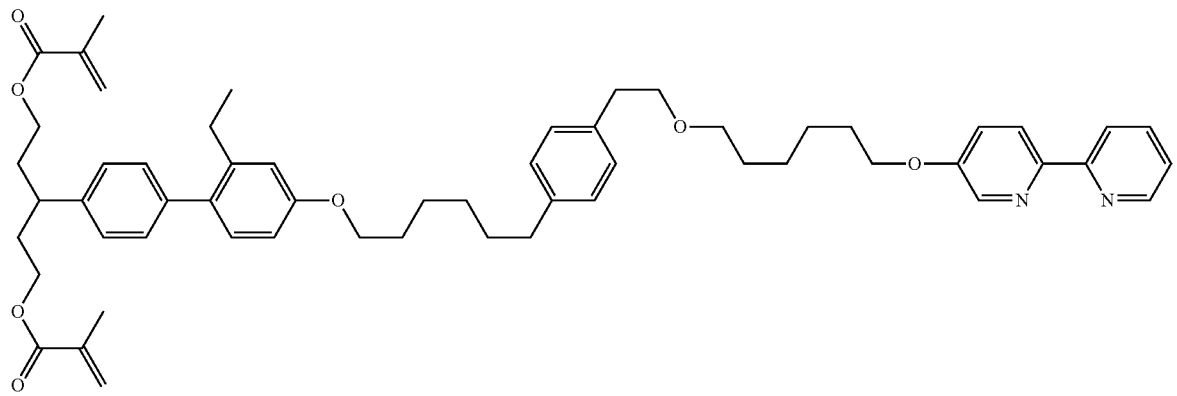
Chemical Formula SA 2-11
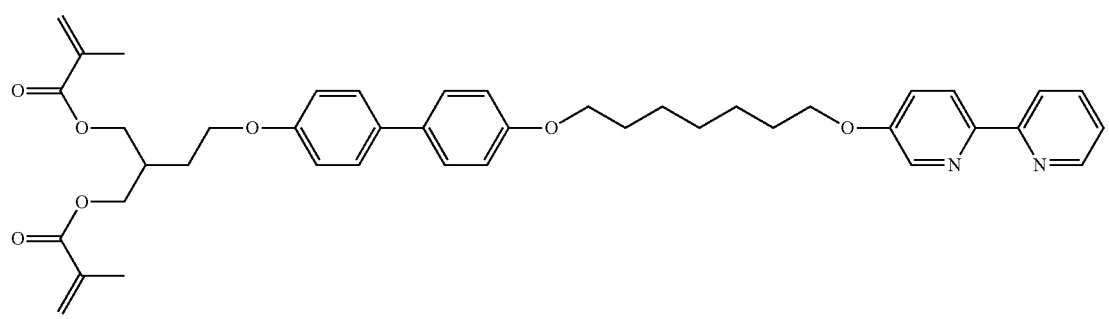
Compound Formula SA 2-12
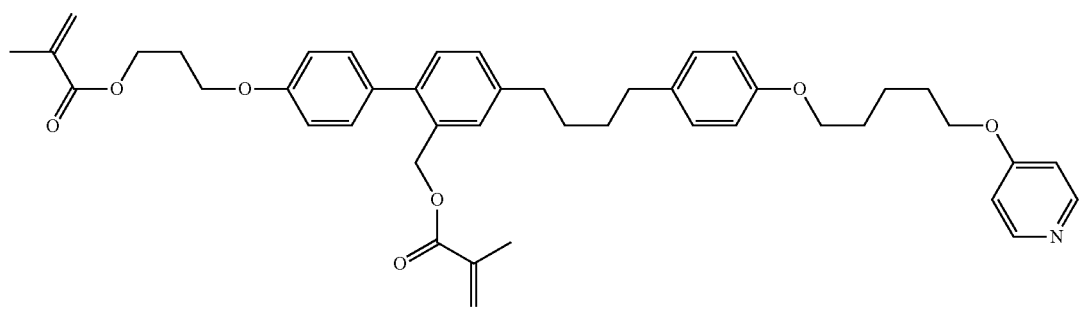
Chemical Formula SA 2-13
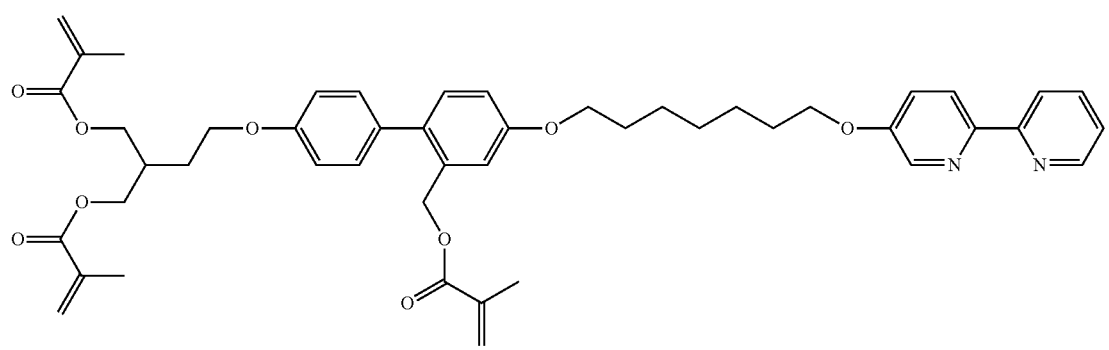

Chemical Formula SA 2-14

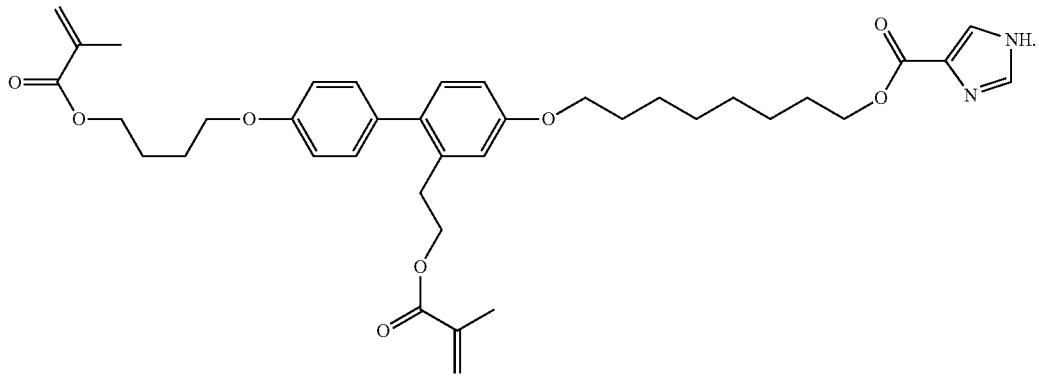

10. A method of manufacturing a liquid crystal display device, comprising:
  disposing the liquid crystal composition of claim 1 between a first electrode and a second electrode facing the first electrode to manufacture a liquid crystal cell; and
  irradiating the liquid crystal cell with ultraviolet rays when a voltage is applied to the liquid crystal cell.

11. The method of claim 10,
  wherein X—* is $C_{1-20}$-alkyl-*, and
  wherein the liquid crystal composition further comprises a reactive mesogen comprising at least one compound represented by Formula 2:

P1-SP1-MG-SP2-P2    Formula 2 wherein in Formula 2,
P1-* and P2-* are each independently

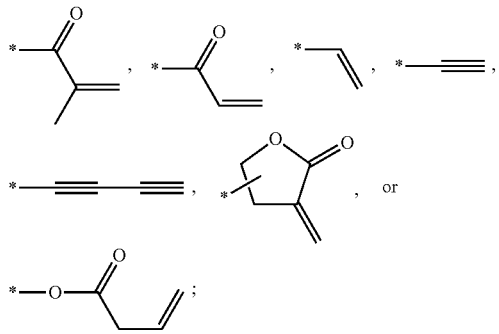

—SP1-* is

*—(L—Z—L—Ar)$_a$—L—*

(wherein a is an integer of 0 to 2) and *—SP2-* is

*—L—(Ar—L—Z—L)$_b$—*

(wherein b is an integer of 0 to 2), in each of which *-L-* is *—(CH$_2$)$_c$—*, *—O(CH$_2$)$_c$—*,

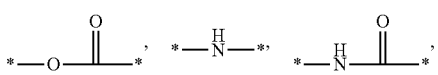

*—CH═CH—*, or *—C≡C—* (wherein c is an integer of 1 to 10), *—Z—* is *—(CH$_2$)$_d$—* (wherein d is an integer of 0 to 12), and *—Ar—* is

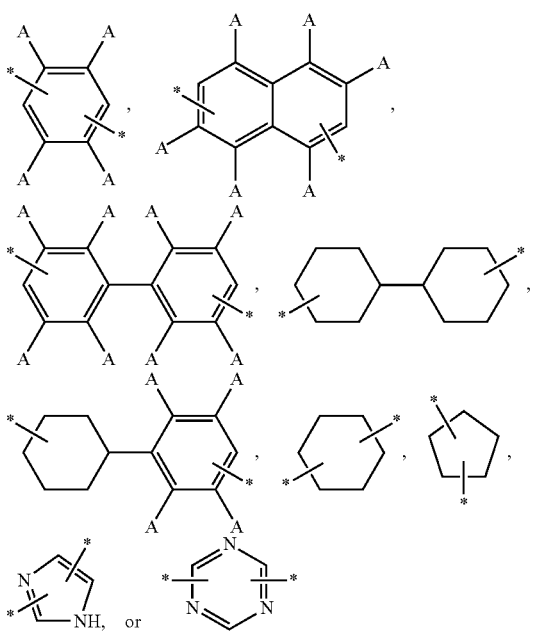

(wherein each A-* is H—*, $C_{1-10}$-alkyl-*, F—*, Br—*, I—*, *—OH, *—NH$_2$, or CN—*); and
*-MG-* is

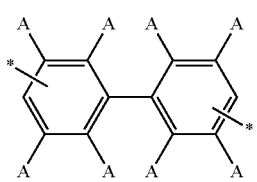

(wherein each A-* is H—*, $C_{1-10}$-alkyl-*, F—*, Br—*, I—*, *—OH, *—NH$_2$, or CN—*).

12. The method of claim 11,
wherein the liquid crystal aligning agent comprises at least compound represented by Formulae SA 1-1 to SA 1-8:
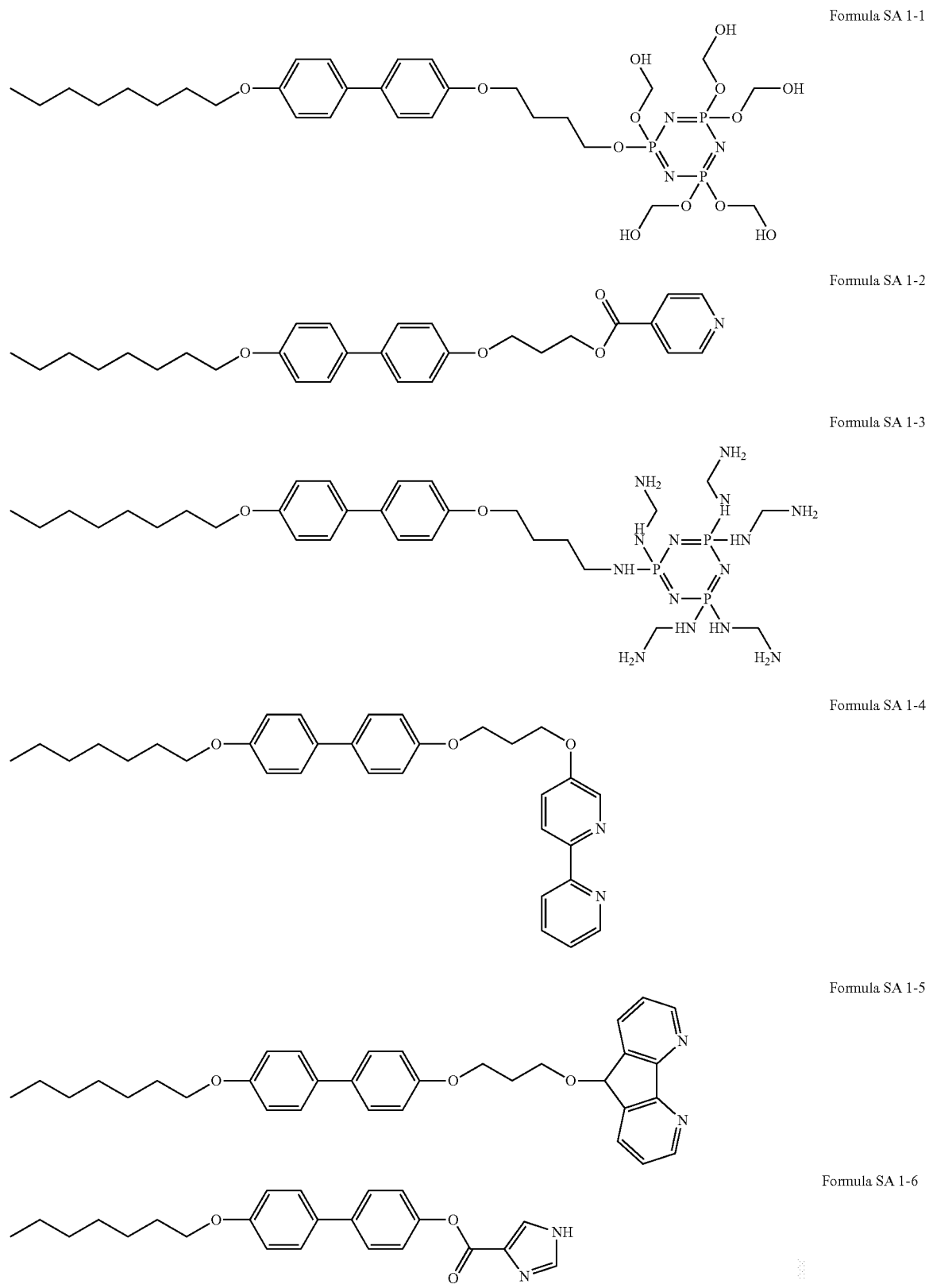

-continued

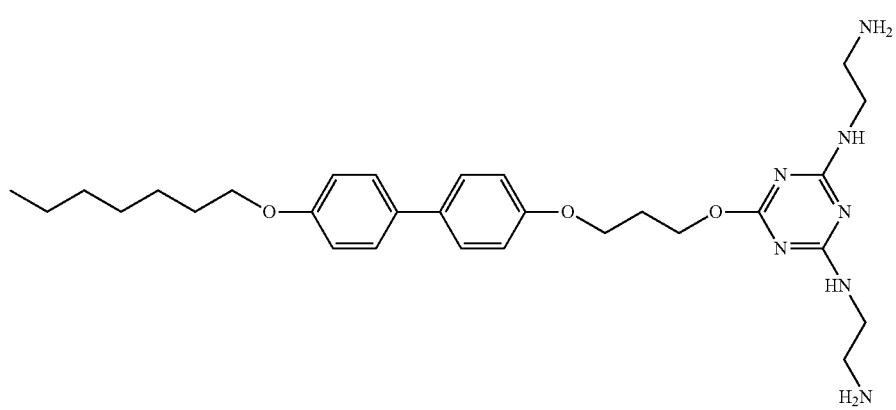

Formula SA 1-7

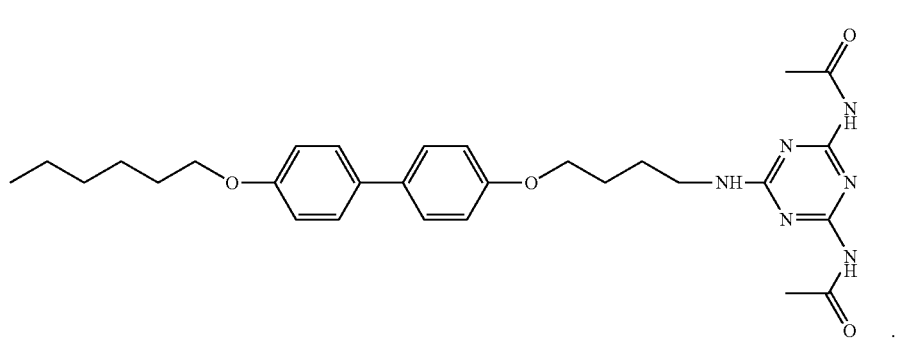

Formula SA 1-8

13. The method of claim 10,
wherein at least one of the liquid crystal aligning agent comprises the compound represented by Formula 1, wherein X—* is

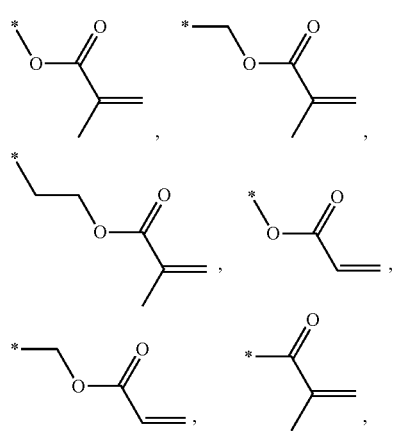

or and
wherein the liquid crystal composition does not include a reactive mesogen comprising at least one compound represented by Formula 2:

P1-SP1-MG-SP2-P2          Formula 2 wherein in Formula 2,
P1-* and P2-* are each independently

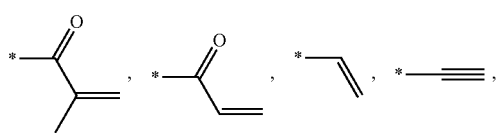

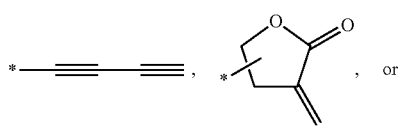

, or

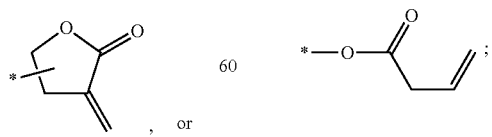

;

—SP1-* is

*—(L—Z—L—Ar)$_a$—L—*

(wherein a is an integer of 0 to 2) and *—SP2-* is

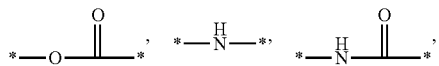

(wherein b is an integer of 0 to 2), in each of which *-L-* is *—(CH$_2$)$_c$—*, *—O(CH$_2$)$_c$—*,

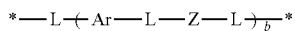

*—CH=CH—*, or *—C≡C—* (wherein c is an integer of 1 to 10), *—Z—* is *—(CH$_2$)$_d$—* (wherein d is an integer of 0 to 12), and *—Ar—* is

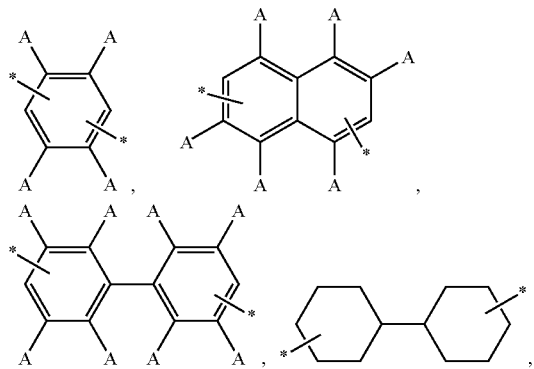

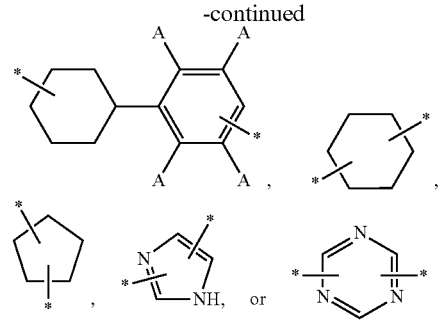

(wherein each A-* is H—*, C$_{1-10}$-alkyl-*, F—*, Br—*, I—*, *—OH, *—NH$_2$, or CN—*); and
-MG-* is

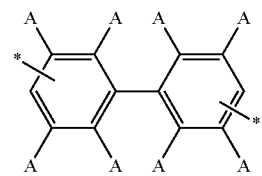

(wherein each A-* is H—*, C$_{1-10}$-alkyl-*, F—*, Br—*, *—OH, *—NH$_2$, or CN—*).

14. The method of claim 13,
wherein the liquid crystal aligning agent comprises at least one compound represented by Formulae SA 2-1 to SA 2-14:

Chemical Formula SA 2-1

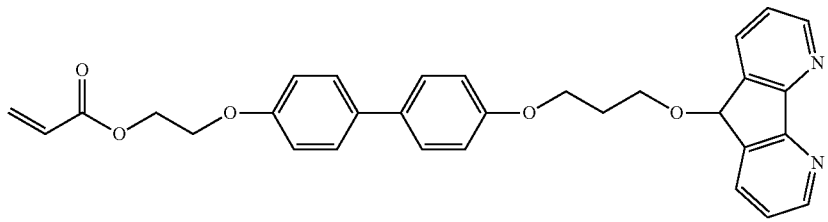

Chemical Formula SA 2-2

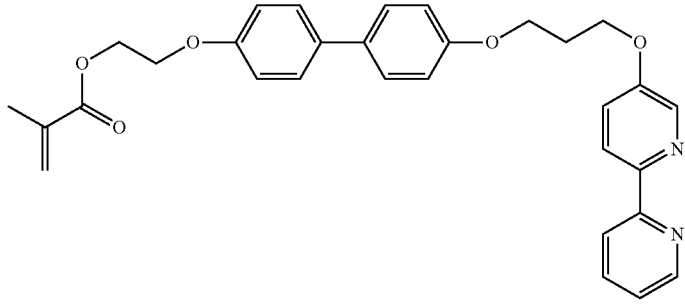

Chemical Formula SA 2-3

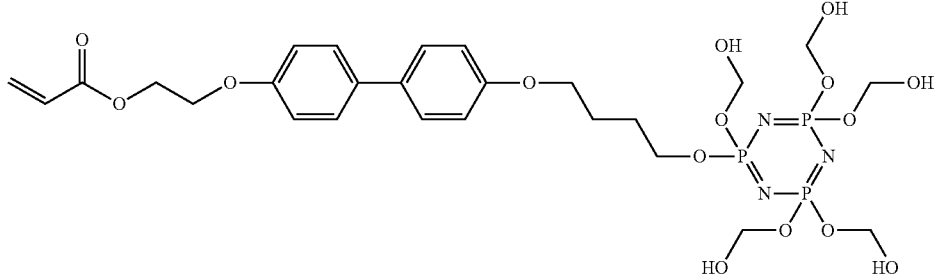

Chemical Formula SA 2-4
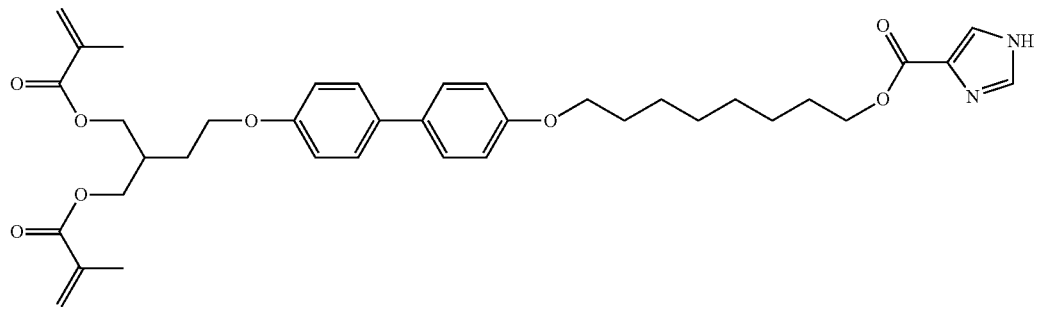
Chemical Formula SA 2-5
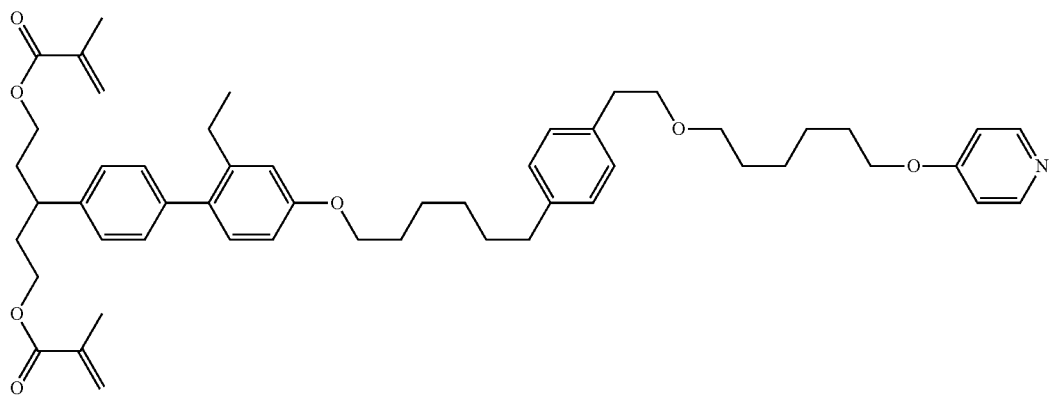
Chemical Formula SA 2-6
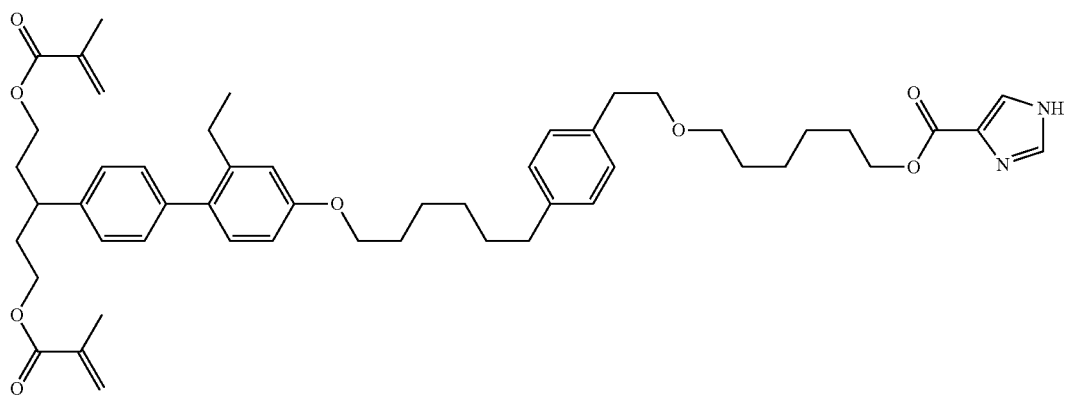
Chemical Formula SA 2-7
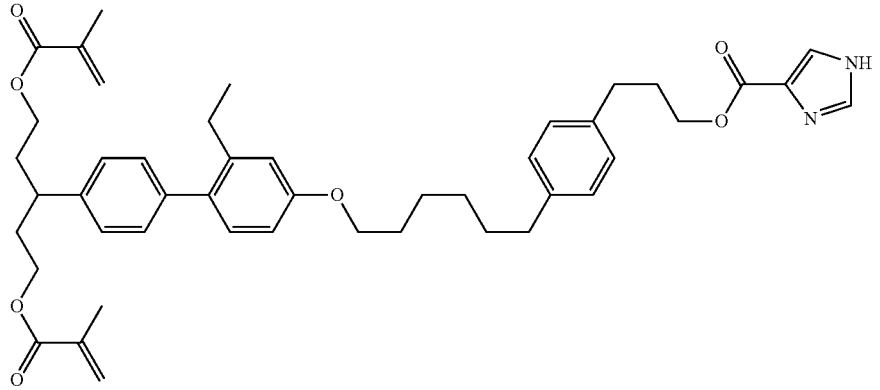

Chemical Formula SA 2-8
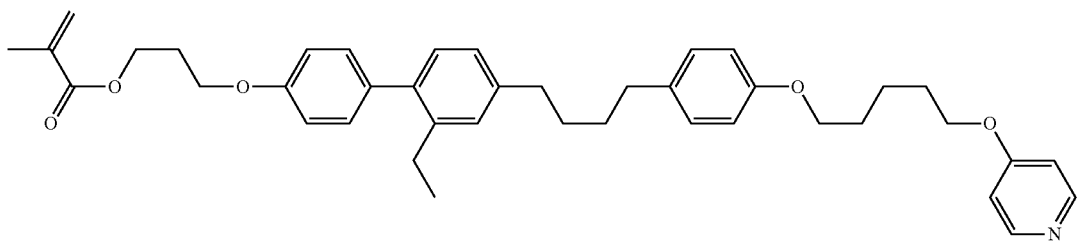
Chemical Formula SA 2-9
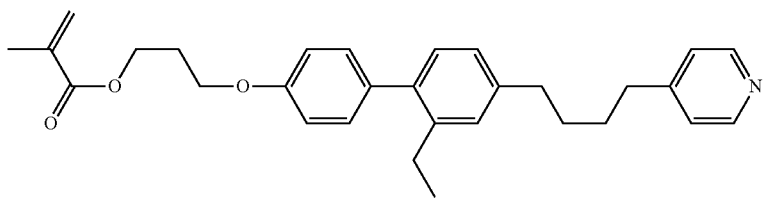
Chemical Formula SA 2-10
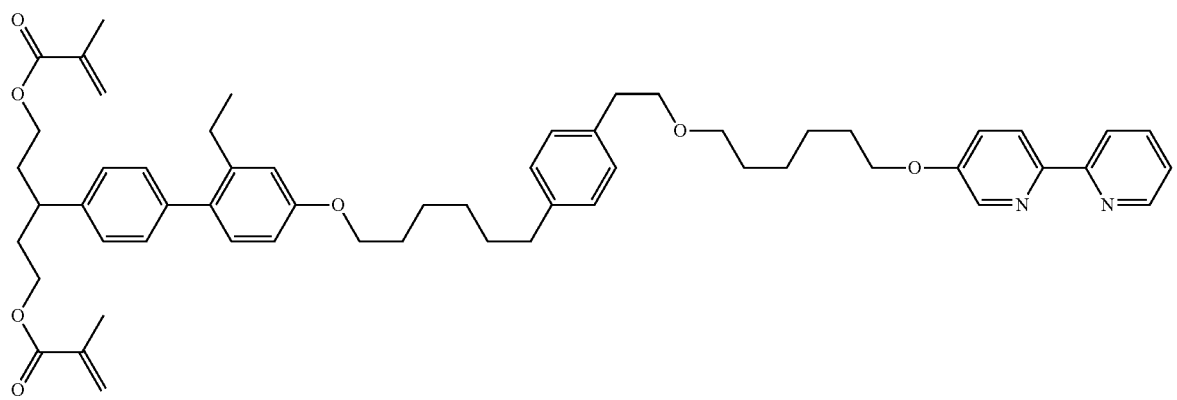
Chemical Formula SA 2-11
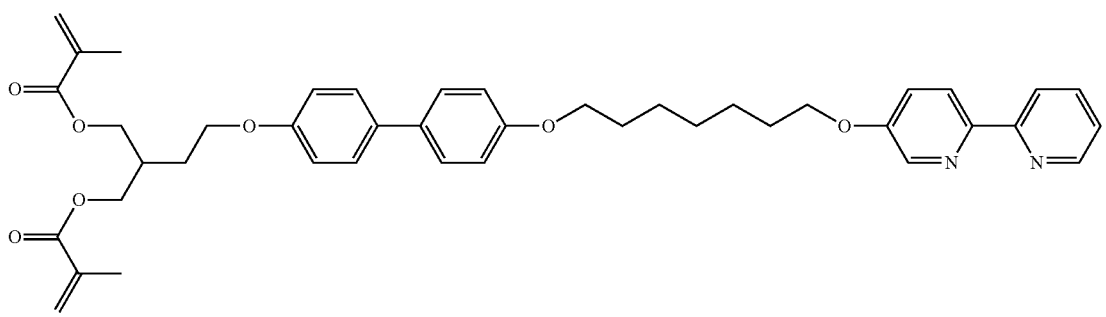
Compound Formula SA 2-12
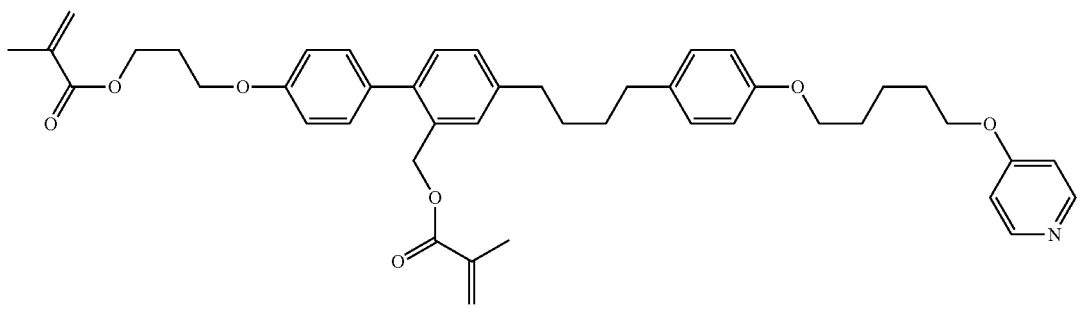

Chemical Formula SA 2-13
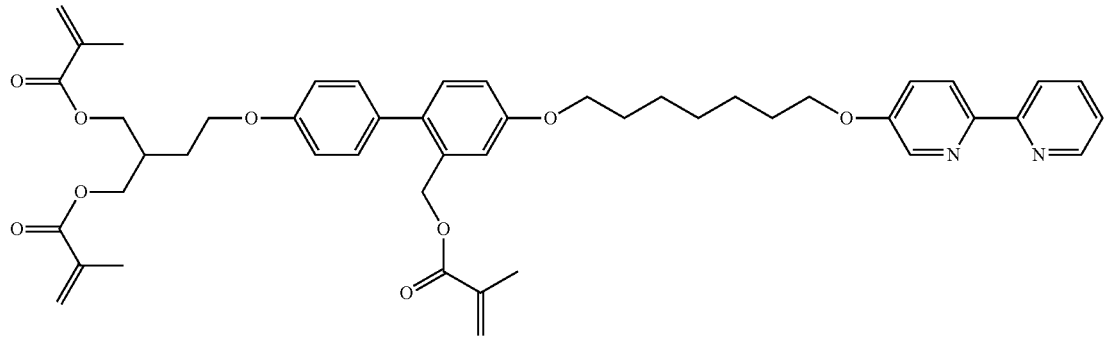
Chemical Formula SA 2-14
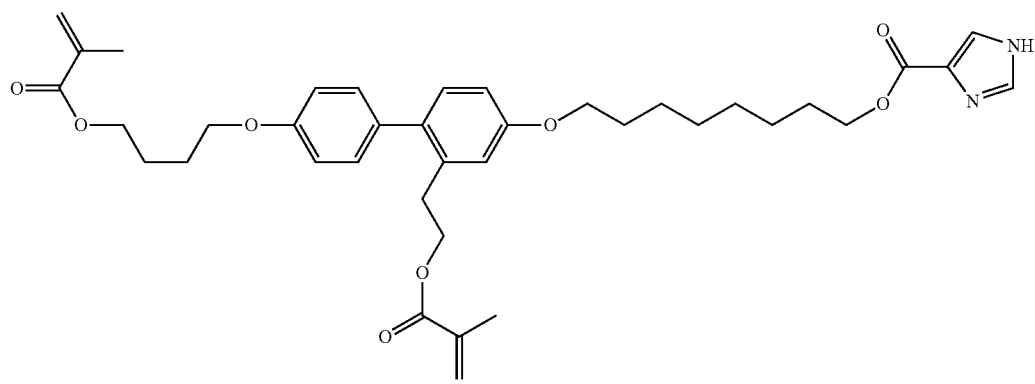
* * * * *